United States Patent
Katagiri et al.

(10) Patent No.: US 12,386,411 B2
(45) Date of Patent: Aug. 12, 2025

(54) CONTROL DEVICE AND DATA PROCESSING SYSTEM

(71) Applicant: SEMICONDUCTOR ENERGY LABORATORY CO., LTD., Atsugi (JP)

(72) Inventors: Haruki Katagiri, Kanagawa (JP); Kyoichi Mukao, Kanagawa (JP); Taiki Nonaka, Kanagawa (JP); Kazuhiko Fujita, Kanagawa (JP); Yuta Ishikawa, Tokyo (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 352 days.

(21) Appl. No.: 17/781,172

(22) PCT Filed: Nov. 25, 2020

(86) PCT No.: PCT/IB2020/061110
§ 371 (c)(1),
(2) Date: May 31, 2022

(87) PCT Pub. No.: WO2021/111248
PCT Pub. Date: Jun. 10, 2021

(65) Prior Publication Data
US 2023/0004207 A1    Jan. 5, 2023

(30) Foreign Application Priority Data

Dec. 6, 2019 (JP) ................................ 2019-221483
Mar. 6, 2020 (JP) ................................ 2020-038834

(51) Int. Cl.
*G06F 1/3237* (2019.01)
*G06F 1/3203* (2019.01)
(Continued)

(52) U.S. Cl.
CPC ............ *G06F 1/3237* (2013.01); *G06F 21/32* (2013.01); *G06V 40/1365* (2022.01);
(Continued)

(58) Field of Classification Search
CPC .... G06F 1/3203; G06F 1/3287; G06F 1/3237; G06F 9/4418; G06F 21/32; G06V 40/1365
(Continued)

(56) References Cited

U.S. PATENT DOCUMENTS 6,469,683 B1   10/2002   Suyama et al.
8,063,692 B2   11/2011   Okano
(Continued)

FOREIGN PATENT DOCUMENTS

DE   112015002911   3/2017
JP   09-297282 A    11/1997
(Continued)

OTHER PUBLICATIONS

International Search Report (Application No. PCT/IB2020/061110) Dated Mar. 2, 2021.
(Continued)

*Primary Examiner* — Ji H Bae
(74) *Attorney, Agent, or Firm* — NIXON PEABODY LLP; Jeffrey L. Costellia

(57) ABSTRACT

The power consumption of a control device or a data processing system is reduced. Safety is enhanced. An electronic device is operated in a simple way. A control device includes an arithmetic circuit, an input unit, and a power management unit. The input unit includes a sensor element. The power management unit has a function of controlling supply and shutdown of power to the arithmetic circuit. The power management unit has a function of supplying power to the arithmetic circuit in response to a detection signal
(Continued)

output from the sensor element. The sensor element includes one or more selected from an acceleration sensor, an angular velocity sensor, and a magnetic sensor. The arithmetic circuit includes a register. The register includes a first circuit and a second circuit. The register has a function of storing, in the second circuit, first data stored in the first circuit in a period during which the power management unit supplies power to the arithmetic circuit and retaining the first data, in a period during which the power management unit stops power supply to the arithmetic circuit. The arithmetic circuit has a function of generating second data with use of signal data output from the sensor element and the first data.

4 Claims, 31 Drawing Sheets

(51) Int. Cl.
   *G06F 1/3287* (2019.01)
   *G06F 9/4401* (2018.01)
   *G06F 21/32* (2013.01)
   *G06V 40/12* (2022.01)

(52) U.S. Cl.
   CPC .......... *G06F 1/3203* (2013.01); *G06F 1/3287* (2013.01); *G06F 9/4418* (2013.01)

(58) Field of Classification Search
   USPC ........................................ 713/322, 323, 324
   See application file for complete search history.

(56) References Cited

U.S. PATENT DOCUMENTS

| | | | |
|---|---|---|---|
| 9,285,609 | B1 | 3/2016 | Rost |
| 9,438,234 | B2 | 9/2016 | Maehashi et al. |
| 10,090,023 | B2 | 10/2018 | Ohmaru et al. |
| 11,054,650 | B2 | 7/2021 | Fujimaki et al. |
| 2011/0242268 | A1* | 10/2011 | Kim .................. H04N 21/6175 709/224 |
| 2011/0257920 | A1* | 10/2011 | Onda .................. G01C 21/165 702/94 |
| 2013/0179715 | A1* | 7/2013 | Sun ...................... G06F 1/3234 713/323 |
| 2013/0297874 | A1* | 11/2013 | Kurokawa ............ G06F 1/3287 711/118 |
| 2014/0103346 | A1 | 4/2014 | Yamazaki |
| 2014/0138675 | A1 | 5/2014 | Yamazaki |
| 2014/0291673 | A1 | 10/2014 | Yamazaki |
| 2015/0070962 | A1 | 3/2015 | Ohmaru et al. |
| 2015/0370313 | A1* | 12/2015 | Tamura ............... H01L 29/7869 713/323 |
| 2016/0149573 | A1 | 5/2016 | Maehashi et al. |
| 2018/0356534 | A1* | 12/2018 | Sugiyama ............... G01S 19/49 |
| 2020/0388319 | A1 | 12/2020 | Ishizu et al. |
| 2022/0203170 | A1* | 6/2022 | Nishizaka .......... A63B 24/0062 |
| 2022/0334632 | A1* | 10/2022 | Katagiri ................ G06F 1/3234 |

FOREIGN PATENT DOCUMENTS

| | | |
|---|---|---|
| JP | 2014-071517 A | 4/2014 |
| JP | 2014-192550 A | 10/2014 |
| JP | 2016-042352 A | 3/2016 |
| JP | 2018-206441 A | 12/2018 |
| JP | 2019-200834 A | 11/2019 |
| KR | 2017-0023813 A | 3/2017 |
| WO | WO-2009/078081 | 6/2009 |
| WO | WO-2015/193777 | 12/2015 |
| WO | WO-2021/038393 | 3/2021 |

OTHER PUBLICATIONS

Written Opinion (Application No. PCT/IB2020/061110) Dated Mar. 2, 2021.

Yamazaki.S et al., "Research, Development, and Application of Crystalline Oxide Semiconductor", SID Digest '12 : SID International Symposium Digest of Technical Papers, Jun. 5, 2012, vol. 43, No. 1, pp. 183-186.

Yamazaki.S et al., "Properties of crystalline In—Ga—Zn-oxide semiconductor and its transistor characteristics", Jpn. J. Appl. Phys. (Japanese Journal of Applied Physics) , Mar. 31, 2014, vol. 53, No. 4S, pp. 04ED18-1-04ED18-10.

* cited by examiner

FIG. 22A
| Amorphous | Crystalline | Crystal |
|---|---|---|
| •completely amorphous | •CAAC<br>•nc<br>•CAC<br><br>excluding single crystal and poly crystal | •single crystal<br>•poly crystal |
Intermediate state / New boundary region (Crystalline column highlighted)
FIG. 22B
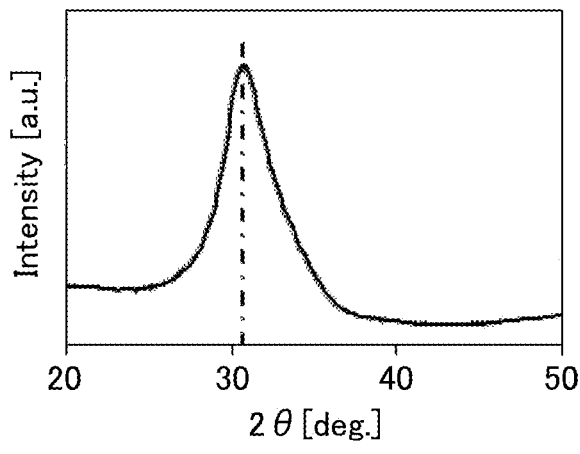
FIG. 22C
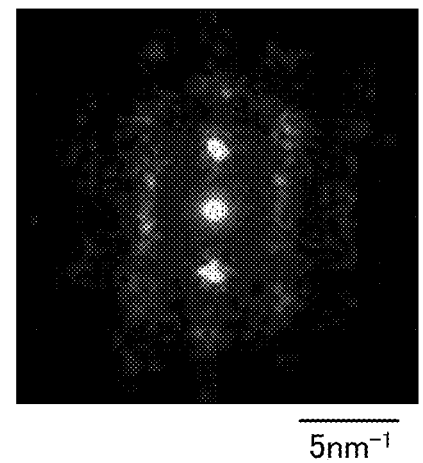

901  902  903  904

905  906

907

908

CONTROL DEVICE AND DATA PROCESSING SYSTEM

TECHNICAL FIELD

One embodiment of the present invention relates to a control device and a data processing system. Another embodiment of the present invention relates to a semiconductor device. Another embodiment of the present invention relates to a controller. Another embodiment of the present invention relates to a game controller. Another embodiment of the present invention relates to a game console.

Note that one embodiment of the present invention is not limited to the above technical field. The technical field of the invention disclosed in this specification and the like relates to an object, a method, or a manufacturing method. Another embodiment of the present invention relates to a process, a machine, manufacture, or a composition of matter.

In this specification and the like, a semiconductor device generally means a device that can function by utilizing semiconductor characteristics. Thus, a semiconductor element such as a transistor or a diode and a circuit including a semiconductor element are semiconductor devices. A display apparatus, a light-emitting apparatus, a lighting device, an electro-optical device, a communication device, an electronic device, and the like may include a semiconductor element or a semiconductor circuit. Therefore, a display apparatus, a light-emitting apparatus, a lighting device, an electro-optical device, an imaging device, a communication device, an electronic device, and the like are referred to as a semiconductor device in some cases. A control device of one embodiment of the present invention is referred to as a semiconductor device in some cases.

BACKGROUND ART

Information terminals that are easy to carry, typified by smartphones, tablet terminals, and the like, have come into widespread use. With the widespread use of information terminals, various communication standards have been established. For example, the use of an LTE-Advanced standard called the fourth-generation mobile communication system (4G) has started.

With the development of information technology such as IoT (Internet of Things), the amount of data handled in information terminals has been recently showing an increasing tendency. In addition, the transmission speed of electronic devices such as information terminals needs to be improved.

In order to be compatible with various kinds of information technology such as IoT, a new communication standard called the fifth-generation mobile communication system (5G) that achieves higher transmission speed, more simultaneous connections, and shorter delay time than 4G has been examined. Note that 5G uses communication frequencies of a 3.7 GHz band, a 4.5 GHz band, and a 28 GHz band.

A 5G compatible semiconductor device is manufactured using a semiconductor containing one kind of element such as Si as its main component or a compound semiconductor containing a plurality of kinds of elements such as Ga and As as its main components. Furthermore, an oxide semiconductor, which is one kind of metal oxide, has attracted attention.

A CAAC (c-axis aligned crystalline) structure and an nc (nanocrystalline) structure, which are neither single crystal nor amorphous, have been found in an oxide semiconductor (see Non-Patent Document 1 and Non-Patent Document 2). Non-Patent Document 1 and Non-Patent Document 2 disclose a technique for manufacturing a transistor using an oxide semiconductor having a CAAC structure.

As techniques for reducing power consumption of semiconductor devices, power gating (PG), clock gating (CG), and voltage scaling are known, for example. Patent Document 1 discloses that a technique for effectively reducing power consumption is employed among DVFS (Dynamic Voltage and Frequency Scaling) techniques and PG techniques, for example.

REFERENCE

Patent Document

[Patent Document 1] PCT International Publication No. 2009/078081

Non-Patent Document

[Non-Patent Document 1] S. Yamazaki et al., "SID Symposium Digest of Technical Papers", 2012, volume 43, issue 1, pp. 183-186
[Non-Patent Document 2] S. Yamazaki et al., "Japanese Journal of Applied Physics", 2014, volume 53, Number 4S, pp. 04ED18-1-04ED18-10

SUMMARY OF THE INVENTION

Problems to be Solved by the Invention

An object of one embodiment of the present invention is to provide a novel semiconductor device or an operation method of a novel semiconductor device. Another object of one embodiment of the present invention is to provide a novel control device or an operation method of a novel control device. Another object of one embodiment of the present invention is to provide a novel data processing unit or an operation method of a novel data processing unit. Another object of one embodiment of the present invention is to provide a novel data processing system or a method for operating the novel data processing system. Another object of one embodiment of the present invention is to reduce power consumption, for example, reduce power in a resting state. Another object of one embodiment of the present invention is to shorten time needed to perform processing for returning from a resting state to a normal state or reduce energy needed to perform the processing. Another object of one embodiment of the present invention is to reduce power consumption of a circuit that controls a sensor element. Another object of one embodiment of the present invention is to enhance safety of a subject monitored by a sensor element. Another object of one embodiment of the present invention is to provide a system that monitors a subject in a simple way. Another object of one embodiment of the present invention is to reduce power consumption of a data processing system including a display unit. Another object of one embodiment of the present invention is to reduce power consumption of a control device that supplies a signal to an electronic device. Another object of one embodiment of the present invention is to provide a system that operates an electronic device in a simple way.

Note that the description of a plurality of objects does not preclude the existence of each object. One embodiment of the present invention does not have to achieve all of these objects. Objects other than those listed above will be apparent from the description of the specification, the drawings, the claims, and the like, and such objects could be objects of one embodiment of the present invention.

Means for Solving the Problems

One embodiment of the present invention is a control device. Another embodiment of the present invention is a data processing unit. Another embodiment of the present invention is a data processing system including a control device and a data processing unit. The control device of one embodiment of the present invention can be used for a game controller, for example. The data processing system of one embodiment of the present invention can be used for a game console, for example.

Another embodiment of the present invention is a control device including an arithmetic circuit, an input unit, and a power management unit, in which the input unit includes a sensor element; the power management unit has a function of controlling supply and shutdown of power to the arithmetic circuit; the power management unit has a function of supplying power to the arithmetic circuit when a signal output from the sensor element satisfies a first condition; the sensor element includes one or more selected from an acceleration sensor, an angular velocity sensor, and a magnetic sensor; the arithmetic circuit includes a register; the register includes a first circuit and a second circuit; the register has a function of storing, in the second circuit, first data stored in the first circuit in a period during which the power management unit supplies power to the arithmetic circuit and retaining the first data, in a period during which the power management unit stops power supply to the arithmetic circuit; and the arithmetic circuit has a function of generating second data with use of signal data output from the sensor element and the first data.

Here, the case where the first condition is satisfied refers to the case where the value of the signal detected by the sensor element is determined to be a desired signal on the basis of the determination criteria, for example. Specifically, the case where the first condition is satisfied refers to the case where the value output from a sensor element 710 exceeds a predetermined threshold value, the case where the absolute value of the value output from the sensor element 710 exceeds a predetermined threshold value, the case where the value output from the sensor element 710 falls within a predetermined range, or the case where the value output from the sensor element 710 is out of a predetermined range, for example.

In the above structure, the second circuit preferably includes a transistor including an oxide semiconductor in a channel formation region.

In the above structure, the arithmetic circuit preferably has a function of generating position data, vibration intensity data, or image data based on the position data, on the basis of the second data.

In the above structure, it is preferable that a cache for an arithmetic operation be included, the cache include a second transistor including an oxide semiconductor in a channel formation region, the cache have a function of storing and retaining third data in a period during which the power management unit stops power supply to the arithmetic circuit, and the arithmetic circuit have a function of generating fourth data with use of the signal data output from the sensor element and the third data.

In the above structure, the arithmetic circuit preferably has a function of generating position data, vibration intensity data, or image data based on the position data, on the basis of the fourth data.

In the above structure, it is preferable to determine that the first condition is satisfied when the value of the signal output from the sensor element falls within a desired range or when the amount of change over time in the signal output from the sensor element falls within a desired range.

In the above structure, it is preferable that a second input unit be included, the second input unit include one or more selected from a hardware button, a keyboard, a pointing device, a touch sensor, an audio input device, an eye-gaze input device, an imaging device, and an illuminance sensor, the power management unit have a function of stopping power supply to the arithmetic circuit when the signal output from the sensor element included in the input unit does not satisfy the first condition and a signal output from the second input unit does not satisfy a second condition, and the control device determine that the second condition is satisfied when the value of the signal output from the second input unit falls within a desired range or when the amount of change over time in the signal output from the second input unit falls within a desired range.

In the above structure, it is preferable that a second input unit be included, the second input unit include a display unit including a region functioning as a touch sensor, the display unit have flexibility, the power management unit have a function of stopping power supply to the arithmetic circuit when a signal detected by the first input unit does not satisfy the first condition and a signal output from the second input unit does not satisfy a second condition, and the control device determine that the second condition is satisfied when the value of the signal output from the second input unit falls within a desired range or when the amount of change over time in the signal output from the second input unit falls within a desired range.

In the above structure, the display unit preferably includes a first flexible substrate, a second flexible substrate, and a plurality of light-emitting devices between the first flexible substrate and the second flexible substrate.

In the above structure, it is preferable that a second input unit be included, the second input unit include an imaging device, the imaging device have a function of capturing an image of a fingerprint or a palm print and performing authentication, the power management unit have a function of stopping power supply to the arithmetic circuit when a signal detected by the input unit does not satisfy the first condition and a signal output from the second input unit does not satisfy a second condition, and the control device determine that the second condition is satisfied when the value of the signal output from the second input unit falls within a desired range or when the amount of change over time in the signal output from the second input unit falls within a desired range.

Another embodiment of the present invention is a data processing system including a first housing, a second housing, an arithmetic circuit, an input unit, a power management unit, and a data processing unit, in which the input unit includes a sensor element; the arithmetic circuit, the input unit, and the power management unit are each at least partly positioned inside the first housing; the data processing unit is at least partly positioned inside the second housing; the power management unit has a function of controlling supply and shutdown of power to the arithmetic circuit; the power management unit has a function of supplying power to the arithmetic circuit when a signal output from the sensor element satisfies a first condition; the sensor element includes one or more selected from an acceleration sensor, an angular velocity sensor, and a magnetic sensor; the arithmetic circuit includes a register; the register has a function of storing, in the second circuit, first data stored in the first circuit in a period during which the power management unit supplies power to the arithmetic circuit and retaining the first data, in a period during which the power management unit stops power supply to the arithmetic circuit; the arithmetic circuit has a function of generating second data with use of signal data output from the sensor element and the first data; the arithmetic circuit includes a cache for an arithmetic operation; the cache has a function of storing and retaining third data in a period during which the power management unit stops power supply to the arithmetic circuit; the arithmetic circuit has a function of wirelessly transmitting the second data and the third data to the data processing unit; and the data processing unit has a function of generating image data with use of the second data and the third data.

In the above structure, it is preferable that a flexible display unit be included, the display unit be positioned along a surface of the first housing, and the display unit include a region functioning as a touch sensor.

In the above structure, the display unit preferably includes a first flexible substrate, a second flexible substrate, and a plurality of light-emitting devices between the first flexible substrate and the second flexible substrate.

In the above structure, it is preferable that the second data include a plurality of times and data on the respective times, an object be placed in the image data, and positions where the object is placed be generated using the data on the respective times.

In the above structure, it is preferable that a third housing be included, the third housing include a second display unit, and the second display unit have a function of displaying the image data.

In the above structure, the third housing is preferably detachable from the first housing.

Another embodiment of the present invention is a data processing system including a controller, a head-mounted display, and a data processing unit, in which the controller includes a first housing, an input unit, and a processing unit; the input unit includes a sensor element; the processing unit has a function of storing first data and retaining the first data in a first period during which power supply to the processing unit is stopped; the head-mounted display includes a display unit and a driver circuit; the processing unit has a function of generating second data with use of signal data output from the sensor element and the first data retained in the first period, in a second period during which power is supplied, after the first period; the data processing unit has a function of generating second image data with use of first image data and the second data; and the display unit has a function of displaying the second image data.

Another embodiment of the present invention is a data processing system including a controller, a head-mounted display, a light-emitting device, and a data processing unit, in which the controller includes a first housing, an input unit, and a processing unit; the input unit includes a sensor element; the processing unit has a function of storing first data and retaining the first data in a first period during which power supply to the processing unit is stopped; the head-mounted display includes a display unit and an imaging device; the processing unit has a function of generating second data with use of signal data output from the sensor element and the first data retained in the first period, in a second period during which power is supplied, after the first period; the imaging device has a function of capturing second image data including electromagnetic waves from the light-emitting device; the data processing unit has a function of generating third image data with use of first image data, the second data, and the second image data; and the display unit has a function of displaying the third image data.

Another embodiment of the present invention is a control device including a processing unit, an input unit, a power management unit, and a light-emitting device, in which the input unit includes a sensor element; the power management unit has a function of controlling supply and shutdown of power to the processing unit; the power management unit has a function of supplying power to the processing unit and the light-emitting device when a signal output from the sensor element satisfies a first condition; the sensor element includes one or more selected from an acceleration sensor, an angular velocity sensor, and a magnetic sensor; the processing unit has a function of retaining first data stored in the processing unit in a first period during which the power management unit supplies power to the processing unit, in a second period during which the power management unit stops power supply to the processing unit; and the processing unit has a function of generating second data with use of the signal data output from the sensor element and the first data retained in the second period, in a third period during which power is supplied after the second period.

Another embodiment of the present invention is a data processing system including a sensor element, a processing unit, a display unit, and a data processing unit, in which the processing unit has a function of storing first data and retaining the first data in a first period during which power supply to the processing unit is stopped; the processing unit has a function of generating second data with use of signal data output from the sensor element and the first data retained in the first period, in a second period during which power is supplied, after the first period; the data processing unit has a function of generating second image data with use of first image data and the second data; and the display unit has a function of displaying the second image data.

In the above structure, it is preferable that a first housing be included and one or both of the sensor element and the processing unit be positioned inside the first housing.

In the above structure, it is preferable that a driver circuit be included, and the driver circuit have a function of supplying image data to the display unit.

Another embodiment of the present invention is a data processing system including a sensor element, a processing unit, a display unit, an imaging device, a light-emitting device, and a data processing unit, in which the processing unit has a function of storing first data and retaining the first data in a first period during which power supply to the processing unit is stopped; the processing unit has a function of generating second data with use of signal data output from the sensor element and the first data retained in the first period, in a second period during which power is supplied; the imaging device has a function of capturing second image data including electromagnetic waves from the light-emitting device; the data processing unit has a function of generating third image data with use of first image data, the second data, and the second image data; and the display unit has a function of displaying the third image data.

In the above structure, one or more selected from the sensor element, the light-emitting device, and the imaging device are preferably positioned inside the first housing.

In the above structure, it is preferable that a driver circuit be included, and the driver circuit have a function of supplying image data to the display unit.

In the above structure, it is preferable that a first lens and a second lens be included, the display unit include a first region that displays a first image and a second region that displays a second image, and the data processing system have a function of displaying a three-dimensional image utilizing a parallax between the first image passing through the first lens and the second image passing through the second lens.

For example, a user of the data processing system views the first image through the first lens and the second image through the second lens, whereby a parallax effect allows the user to view a three-dimensional image.

Effect of the Invention

One embodiment of the present invention can provide a novel semiconductor device or an operation method of a novel semiconductor device. One embodiment of the present invention can reduce power consumption, for example, reduce power in a resting state. One embodiment of the present invention can shorten time needed to perform processing for returning from a resting state to a normal state or reduce energy needed to perform the processing. One embodiment of the present invention can reduce power consumption of a circuit that controls a sensor element. One embodiment of the present invention can enhance safety of a subject monitored by a sensor element. One embodiment of the present invention can provide a system that monitors a subject in a simple way. One embodiment of the present invention can reduce power consumption of a data processing system including a display unit. One embodiment of the present invention can reduce power consumption of a control device that supplies a signal to an electronic device. One embodiment of the present invention can provide a system that operates an electronic device in a simple way.

Note that the description of these effects does not preclude the existence of other effects. One embodiment of the present invention does not have to have all the effects described as examples. In one embodiment of the present invention, other objects, effects, and novel features are apparent from the description of this specification and the drawings.

BRIEF DESCRIPTION OF THE DRAWINGS

FIG. 22A is a table showing classifications of crystal structures of IGZO. FIG. 22B is a graph showing an XRD spectrum of a CAAC-IGZO film. FIG. 22C is an image showing a nanobeam electron diffraction pattern of a CAAC-IGZO film.

MODE FOR CARRYING OUT THE INVENTION

Figure 1:
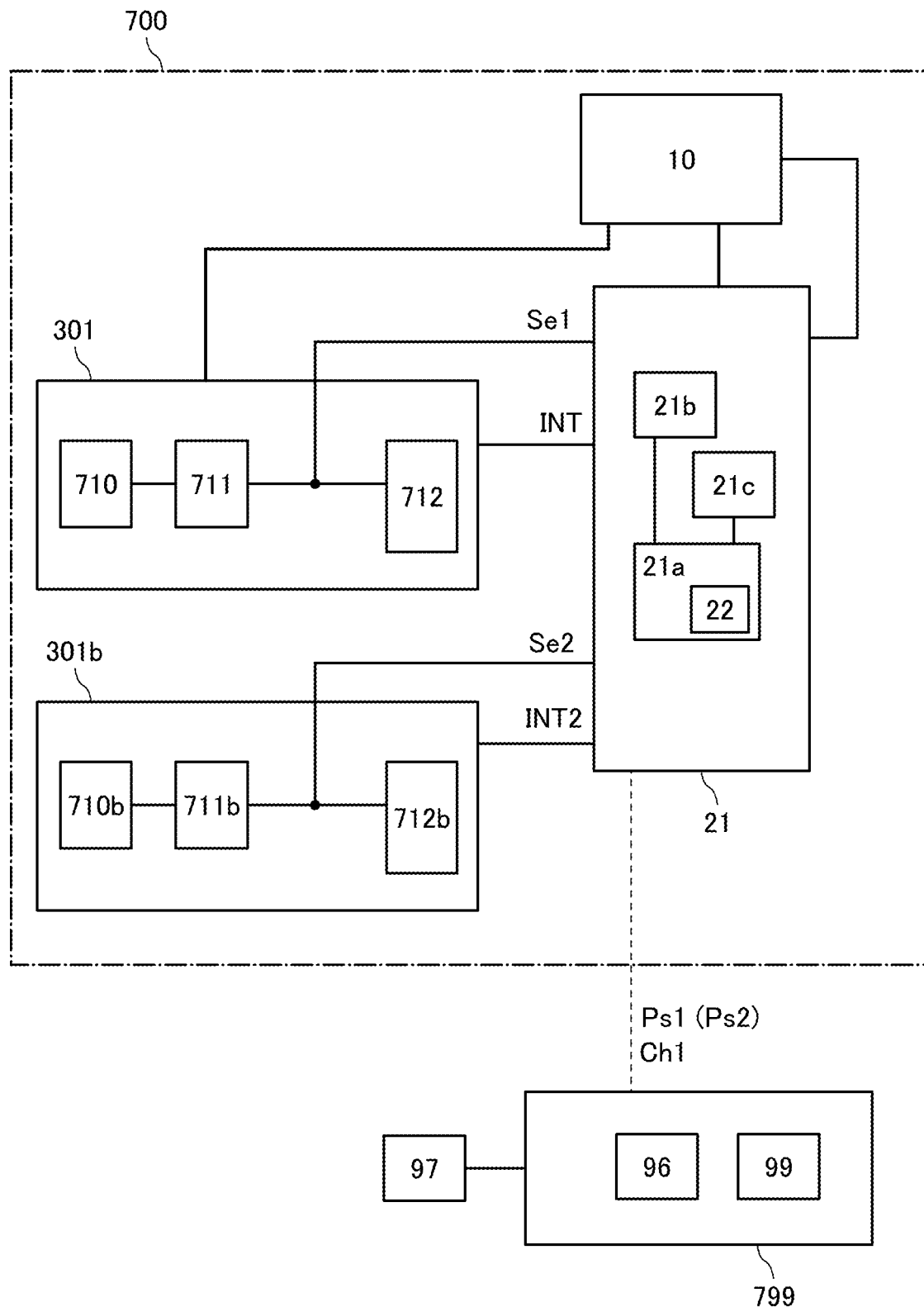
FIG. 1 is a diagram illustrating one embodiment of the present invention.

Embodiments are described in detail with reference to the drawings. However, the present invention is not limited to the following description, and it is readily appreciated by those skilled in the art that modes and details can be modified in various ways without departing from the spirit and the scope of the present invention. Thus, the present invention should not be construed as being limited to the description in the following embodiments. Note that in the structures of the invention described below, the same portions or portions having similar functions are denoted by the same reference numerals in different drawings, and description thereof is not repeated.

In addition, the position, size, range, and the like of each component illustrated in the drawings and the like do not represent the actual position, size, range, and the like in some cases for easy understanding of the invention. Therefore, the disclosed invention is not necessarily limited to the position, size, range, or the like disclosed in drawings and the like. For example, in an actual manufacturing process, a resist mask or the like might be unintentionally reduced in size by treatment such as etching, which might not be reflected in the drawings for easy understanding.

Furthermore, in a top view (also referred to as a "plan view"), a perspective view, or the like, the description of some components might be omitted for easy understanding of the drawings.

In addition, in this specification and the like, the terms "electrode" and "wiring" do not functionally limit these components. For example, an "electrode" is used as part of a "wiring" in some cases, and vice versa. Furthermore, the term "electrode" or "wiring" also includes the case where a plurality of "electrodes" or "wirings" are formed in an integrated manner, for example.

In this specification and the like, a "terminal" in an electric circuit refers to a portion that inputs or outputs a current, inputs or outputs a voltage, or receives or transmits a signal. Accordingly, part of a wiring or an electrode functions as a terminal in some cases.

Note that the term "over" or "under" in this specification and the like does not necessarily mean that a component is placed directly over and in contact with or directly under and in contact with another component. For example, the expression "electrode B over insulating layer A" does not necessarily mean that the electrode B is formed on and in direct contact with the insulating layer A, and does not exclude the case where another component is provided between the insulating layer A and the electrode B.

In addition, functions of a source and a drain are interchanged with each other depending on operation conditions and the like, for example, when a transistor of different polarity is employed or when the current direction is changed in a circuit operation; therefore, it is difficult to define which is the source or the drain. Thus, the terms "source" and "drain" can be interchangeably used in this specification.

In this specification and the like, the expression "electrically connected" includes the case where components are directly connected to each other and the case where components are connected through an "object having any electric function". Here, there is no particular limitation on the "object having any electric function" as long as electric signals can be transmitted and received between components that are connected through the object. Thus, even when the expression "electrically connected" is used, there is a case where no physical connection portion is made and a wiring is just extended in an actual circuit.

Furthermore, in this specification and the like, "parallel" indicates a state where two straight lines are placed at an angle of greater than or equal to −10° and less than or equal to 10°, for example. Accordingly, the case where the angle is greater than or equal to −5° and less than or equal to 5° is also included. Moreover, "perpendicular" and "orthogonal" indicate a state where two straight lines are placed at an angle of greater than or equal to 80° and less than or equal to 100°, for example. Accordingly, the case where the angle is greater than or equal to 85° and less than or equal to 95° is also included.

In this specification and the like, the terms "identical", "same", "equal", "uniform", and the like used in describing calculation values and measurement values allow for a margin of error of ±20% unless otherwise specified.

In addition, a voltage refers to a potential difference between a certain potential and a reference potential (e.g., a ground potential or a source potential) in many cases. Therefore, the terms "voltage" and "potential" can be replaced with each other in many cases. In this specification and the like, the terms "voltage" and "potential" can be replaced with each other unless otherwise specified.

Note that a "semiconductor" has characteristics of an "insulator" when conductivity is sufficiently low, for example. Thus, a "semiconductor" can be replaced with an "insulator". In that case, a "semiconductor" and an "insulator" cannot be strictly distinguished from each other because a border therebetween is not clear. Accordingly, a "semiconductor" and an "insulator" described in this specification can be replaced with each other in some cases.

Furthermore, a "semiconductor" has characteristics of a "conductor" when conductivity is sufficiently high, for example. Thus, a "semiconductor" can be replaced with a "conductor". In that case, a "semiconductor" and a "conductor" cannot be strictly distinguished from each other because a border therebetween is not clear. Accordingly, a "semiconductor" and a "conductor" in this specification can be replaced with each other in some cases.

Note that ordinal numbers such as "first" and "second" in this specification and the like are used in order to avoid confusion among components and do not denote the priority or the order such as the order of steps or the stacking order. A term without an ordinal number in this specification and the like might be provided with an ordinal number in the scope of claims in order to avoid confusion among components. Furthermore, a term with an ordinal number in this specification and the like might be provided with a different ordinal number in the scope of claims. Furthermore, even when a term is provided with an ordinal number in this specification and the like, the ordinal number might be omitted in the scope of claims and the like.

Note that in this specification and the like, an "on state" of a transistor refers to a state in which a source and a drain of the transistor are electrically short-circuited (also referred to as a "conduction state"). Furthermore, an "off state" of the transistor refers to a state in which the source and the drain of the transistor are electrically disconnected (also referred to as a "non-conduction state").

In addition, in this specification and the like, an "on-state current" sometimes refers to a current that flows between a source and a drain when a transistor is in an on state. Furthermore, an "off-state current" sometimes refers to a current that flows between a source and a drain when a transistor is in an off state.

In this specification and the like, a high power supply potential VDD (hereinafter, also simply referred to as "VDD", "H potential", or "H") is a power supply potential higher than a low power supply potential VSS (hereinafter, also simply referred to as "VSS", "L potential", or "L"). VSS refers to a power supply potential at a potential lower than VDD. A ground potential (hereinafter, also simply referred to as "GND" or "GND potential") can be used as VDD or VSS. For example, in the case where VDD is a ground potential, VSS is a potential lower than the ground potential, and in the case where VSS is a ground potential, VDD is a potential higher than the ground potential.

In addition, in this specification and the like, a gate refers to part or the whole of a gate electrode and a gate wiring. A gate wiring refers to a wiring for electrically connecting at least one gate electrode of a transistor to another electrode or another wiring.

Furthermore, in this specification and the like, a source refers to part or the whole of a source region, a source electrode, or a source wiring. A source region refers to a region in a semiconductor layer, where the resistivity is lower than or equal to a given value. A source electrode refers to part of a conductive layer that is connected to a source region. A source wiring refers to a wiring for electrically connecting at least one source electrode of a transistor to another electrode or another wiring.

Moreover, in this specification and the like, a drain refers to part or the whole of a drain region, a drain electrode, or a drain wiring. A drain region refers to a region in a semiconductor layer, where the resistivity is lower than or equal to a given value. A drain electrode refers to part of a conductive layer that is connected to a drain region. A drain wiring refers to a wiring for electrically connecting at least one drain electrode of a transistor to another electrode or another wiring.

In the drawings and the like, for easy understanding of the potentials of a wiring, an electrode and the like, "H" representing an H potential or "L" representing an L potential is sometimes written near the wiring, the electrode, and the like. In addition, enclosed "H" or "L" is sometimes written near a wiring, an electrode, and the like whose potential changes. Moreover, a symbol "x" is sometimes written on a transistor in an off state.

Note that a terminal may refer to a group of a plurality of terminals. Each terminal included in a group of a plurality of terminals is supplied with an independent signal, for example, and each terminal is electrically connected to one or more wirings.

A transistor includes three terminals (nodes) called a gate, a source, and a drain. The gate is a terminal that functions as a control terminal for controlling the conduction state of the transistor. Depending on the type of the transistor and the levels of potentials supplied to respective terminals (nodes), one of a pair of input/output terminals (nodes) functioning as a source and a drain serves as a source and the other serves as a drain. In general, in an n-channel transistor, a node to which a lower potential is supplied is called a source, and a node to which a higher potential is supplied is called a drain. Conversely, in a p-channel transistor, a node to which a lower potential is supplied is called a drain, and a node to which a higher potential is supplied is called a source. In this specification, two terminals (nodes) other than a gate are referred to as a first terminal (node) and a second terminal (node) in some cases.

In this specification, for easy understanding of a circuit structure and its operation, description is sometimes made on the case where one of two input/output terminals (nodes) of a transistor is fixed as a source and the other is fixed as a drain. It is needless to say that, depending on a driving method, the magnitude relationship between potentials applied to three terminals of the transistor might be changed, and the source and the drain might be interchanged with each other. Thus, in one embodiment of the present invention, the distinction between the source and the drain of the transistor is not limited to that described in this specification and the drawings.

Note that in this specification and the like, it might be possible for those skilled in the art to constitute one embodiment of the invention even when portions to which all the terminals of an active element (e.g., a transistor or a diode), a passive element (e.g., a capacitor or a resistor), or the like are connected are not specified. In other words, one embodiment of the invention can be clear even when connection portions are not specified. Furthermore, in the case where an embodiment in which a connection portion is specified is disclosed in this specification and the like, it can sometimes be determined that one embodiment of the invention in which a connection portion is not specified is disclosed in this specification and the like. In particular, in the case where the number of portions to which the terminal is connected is more than one, it is not necessary to specify the portions to which the terminal is connected. Therefore, it might be possible to constitute one embodiment of the invention by specifying only portions to which some of terminals of an active element (e.g., a transistor or a diode), a passive element (e.g., a capacitor or a resistor), or the like are connected.

Note that in this specification and the like, it might be possible for those skilled in the art to specify the invention when at least the connection portion of a circuit is specified. Alternatively, it might be possible for those skilled in the art to specify the invention when at least a function of a circuit is specified. In other words, when a function is specified, one embodiment of the invention can be clear. Furthermore, it can be determined that one embodiment of the present invention whose function is specified is disclosed in this specification and the like. Therefore, when a connection portion of a circuit is specified, the circuit is disclosed as one embodiment of the invention even when a function is not specified, and one embodiment of the invention can be constituted. Alternatively, when a function of a circuit is specified, the circuit is disclosed as one embodiment of the invention even when a connection portion is not specified, and one embodiment of the invention can be constituted.

Embodiment 1

A control device 700 of one embodiment of the present invention includes a processing unit 21, an input unit 301, and a power supply circuit 10. The structures of a processing unit 20 illustrated in FIG. 5 and the processing unit 21 illustrated in FIG. 8 can be used for the processing unit 21 illustrated in FIG. 1 and the like.

The processing unit 21 included in the control device 700 has a function of generating data and transmitting the generated data to a data processing unit 799.

The processing unit 21 includes an arithmetic circuit 21a and a power management unit 21b.

As the arithmetic circuit 21a, a processor core described later can be used. Alternatively, for example, a structure including the processor core described later can be used for the arithmetic circuit 21a.

The arithmetic circuit 21a includes a register 22. The register of one embodiment of the present invention includes a storage circuit 31 illustrated in FIG. 5 and the like and described later. The storage circuit 31 described later includes a circuit MemC1 and a circuit BKC1, for example. The circuit MemC1 has, for example, a function of retaining data generated by the arithmetic circuit 21a, and the circuit BKC1 can function as a backup circuit of the circuit MemC1 and can retain data for a long time even when power supply is stopped or supply of a clock signal is stopped. In the state where power supply is stopped, the circuit BKC1 can retain data for preferably 1 minute or longer, further preferably 1 hour or longer, still further preferably 10 hours or longer, for example.

As the power management unit 21*b*, a power management unit (PMU) 60 described later or the like can be used. The power management unit 21*b* has a function of controlling supply and shutdown of power to the arithmetic circuit 21*a*. Specifically, the power management unit 21*b* has a function of controlling supply and stop of supply of a power supply potential from the power supply circuit 10 to the arithmetic circuit 21*a*, for example.

The power supply circuit 10 has a function of supplying power to the processing unit 21 and the input unit 301. Specifically, the power supply circuit 10 has a function of supplying a power supply potential VDD to the processing unit 21 and the input unit 301. The power supply circuit 10 may change the value of the power supply potential VDD and then supply the changed power supply potential VDD to the processing unit 21 and the input unit 301.

The power supply circuit 10 preferably has a function of appropriately changing a voltage supplied from a secondary battery and supplying the changed voltage to another circuit, for example.

In the case of being driven by power supplied from a secondary battery, the control device 700 preferably has a function of receiving power by wireless power feeding and supplying the received power to the secondary battery.

The processing unit 21 may include a storage device 21*c*. The storage device 21*c* can store parameters used for an arithmetic operation of the processing unit 21. Alternatively, the storage device 21*c* can store parameters used for the operation of the control device. The storage device 21*c* may function as a cache. For the storage device 21*c*, the structure of a NOSRAM or a DOSRAM described later can be used. Alternatively, the structure of a cache 40 or the like described later can be used for the storage device 21*c*. In the state where power supply is stopped, the storage device 21*c* can retain data for preferably 1 minute or longer, further preferably 1 hour or longer, still further preferably 10 hours or longer, for example.

The input unit 301 includes the sensor element 710, a sensing unit 711, and a determination circuit 712.

The control device of one embodiment of the present invention has a function of acquiring position data with the use of one or more selected from an acceleration sensor, an angular velocity sensor, and a magnetic sensor. Alternatively, the control device of one embodiment of the present invention has a function of acquiring data for generating position data with the use of one or more selected from an acceleration sensor, an angular velocity sensor, and a magnetic sensor.

The position data refers to data on the position of an object. For example, the position data refers to data on the position of a user of the control device.

Alternatively, the position data refers to data on a position in a virtual space, which is generated using a measurement value of the sensor element included in the control device, for example. Specifically, the position data refers to data on the position of an object, which is placed in video data representing a virtual space used for a game, for example.

Furthermore, the control device of one embodiment of the present invention may have a function of acquiring posture data in addition to position data with the use of one or more selected from an acceleration sensor, an angular velocity sensor, and a magnetic sensor. Here, the posture data refers to data on the orientation of an object, for example. The control device of one embodiment of the present invention may have a function of acquiring data for generating posture data in addition to the position data with the use of one or more selected from an acceleration sensor, an angular velocity sensor, and a magnetic sensor.

The control device of one embodiment of the present invention may have a function of acquiring vibration data with the use of one or more selected from an acceleration sensor, an angular velocity sensor, and a magnetic sensor. The control device of one embodiment of the present invention may have a function of acquiring data for generating vibration data with the use of one or more selected from an acceleration sensor, an angular velocity sensor, and a magnetic sensor.

The sensor element 710 included in the input unit 301 preferably includes one or more selected from an acceleration sensor, an angular velocity sensor, and a magnetic sensor.

The sensing unit 711 has a function of supplying a signal detected by the sensor element 710 to the determination circuit 712 and the like. The sensing unit 711 may perform processing such as amplification or compression on a signal supplied from the sensor element 710 and then supply the processed signal to circuits. The sensing unit 711 may have a function of converting an analog signal into a digital signal.

The determination circuit 712 has a function of performing determination about the signal supplied from the sensor element 710 through the sensing unit 711 (hereinafter, a signal Se1). When determining that the sensor element 710 has detected a desired signal, the determination circuit 712 supplies a signal INT, which is a signal for requesting interrupt processing, to the processing unit 21, for example.

Here, the determination circuit 712 analyzes the value of the detected signal on the basis of the determination criteria and determines whether a desired signal has been detected. Specifically, the case where a desired signal has been detected refers to the case where the value output from the sensor element 710 exceeds a predetermined threshold value, the case where the absolute value of the value output from the sensor element 710 exceeds a predetermined threshold value, the case where the value output from the sensor element 710 falls within a predetermined range, or the case where the value output from the sensor element 710 is out of a predetermined range, for example.

When the determination circuit 712 determines that a desired signal has not been detected by the sensor element 710, specifically, when the value of a signal detected by the sensor element 710 is lower than or equal to the lower sensing limit or lower than or equal to a set sensing level, for example, the determination circuit 712 does not supply the signal INT. In the processing unit 21, for example, the arithmetic circuit 21*a* and the like may be in a resting state in a period during which the signal INT is not supplied. Here, supplying the signal INT includes supplying a high potential signal as a signal. In addition, not supplying the signal INT includes supplying a low potential signal as a signal. The high potential signal and the low potential signal may be interchanged.

When the signal INT is supplied from the determination circuit 712, the processing unit 21 returns from the resting state to a normal state and starts processing. For the processing, for example, the arithmetic circuit 21*a* receives the signal Se1, and performs an arithmetic operation on the signal Se1 with the use of parameters stored in the register 22, to generate data. The generated data is referred to as data Ps1.

The processing unit 21 can go to a resting state or return to a normal state in a short time. By executing a saving sequence in the processing unit 21 to perform the power gating of the arithmetic circuit 21a and the like, the arithmetic circuit 21a and the like can be brought into a resting state. After the supply of the power supply potential to the arithmetic circuit 21a and the like is restarted, an operation such as restoring the data stored in the circuit BKC1 included in the storage circuit 31 to the circuit MemC1 is performed, whereby the arithmetic circuit 21a and the like in the processing unit 21 can be returned from the resting state to a normal state.

The processing unit of one embodiment of the present invention can shorten time needed to return to a normal state from a resting state.

The arithmetic circuit included in the processing unit of one embodiment of the present invention can shorten time needed to return to a normal state from a resting state.

The data Ps1 generated in the processing unit 21 is transmitted to the data processing unit 799. The transmission may be performed by wireless communication. Alternatively, the processing unit 21 and the data processing unit 799 may be electrically connected to each other, and the data Ps1 may be supplied as a signal to the data processing unit 799 through a wiring.

As wireless communication, communication via an antenna can be performed, for example. As wireless communication via an antenna, the communication can be performed in such a manner that each electronic device is connected to a computer network such as the Internet, which is the infrastructure of the World Wide Web (WWW), an intranet, an extranet, a PAN (Personal Area Network), a LAN (Local Area Network), a CAN (Campus Area Network), a MAN (Metropolitan Area Network), a WAN (Wide Area Network), or a GAN (Global Area Network), for example. In the case of performing wireless communication, it is possible to use, as a communication protocol or a communication technology, a communications standard such as LTE (Long Term Evolution), GSM (Global System for Mobile Communication: registered trademark), EDGE (Enhanced Data Rates for GSM Evolution), CDMA 2000 (Code Division Multiple Access 2000), or W-CDMA (registered trademark), or a communications standard developed by IEEE such as Wi-Fi (registered trademark), Bluetooth (registered trademark), or ZigBee (registered trademark).

Infrared communication may be employed as wireless communication.

In the case of performing wireless communication, the processing unit 21 preferably includes a communication circuit. The communication circuit has a function of modulating a signal, a function of demodulating a signal, and the like, for example. The communication circuit is preferably electrically connected to an antenna.

The data processing unit 799 preferably has a function of generating image data. One or more objects are placed in the image data. The data processing unit 799 has a function of generating the position data, the posture data, or the like of an object placed in the image data, using the data Ps1.

The image data is an image used for a game, for example. The object is a player object, for example.

Alternatively, the image data is an image used for a navigation system, for example. The object is a vehicle, for example.

The storage device 21c can retain a parameter used for an arithmetic operation by the arithmetic circuit 21a. The storage device 21c may retain the initial value of the position data. The storage device 21c may retain a parameter used when the data processing unit 799 generates the position data or the like. In the case where a plurality of control devices 700 communicate with the data processing unit 799, the storage devices 21c may retain specific IDs of the respective control devices 700.

The processing unit 21 may transmit data retained in the storage device 21c (hereinafter, data Ch1) in addition to the data Ps1 to the data processing unit 799. The data processing unit 799 can generate position data, posture data, or the like, using the data Ps1 and the data Ch1.

The acceleration sensor can detect translational acceleration components, for example. The angular velocity sensor can detect rotational acceleration components, for example.

In the case where the control device 700 includes two constitutional parts, for example, the magnetic sensor can detect a change in the relative positions of the constitutional parts. For example, a first constitutional part of the control device 700 is operated with one of user's hands, and a second constitutional part is operated with the other hand. For example, the first constitutional part is worn on a first area of the body, and the second constitutional part is worn on a second area of the body. Alternatively, the second constitutional part may be stationary.

The control device 700 may include an input unit 301b in addition to the input unit 301. The input unit 301b includes a sensor element 710b, a sensing unit 711b, and a determination circuit 712b.

The sensor element 710b includes one or more selected from a hardware button, a keyboard, a pointing device, a touch sensor, an audio input device, an eye-gaze input device, an imaging device, and an illuminance sensor. The sensor element 710b may include a distance determination sensor using light irradiation. The distance determination sensor may include a MEMS (micro electro mechanical systems) mirror. In the case where the control device 700 includes two constitutional parts, for example, the distance determination sensor can detect a change in the relative positions of the constitutional parts. For example, a first constitutional part of the control device 700 is operated with one of user's hands, and a second constitutional part is operated with the other hand. For example, the first constitutional part is worn on a first area of the body, and the second constitutional part is worn on a second area of the body. Alternatively, the second constitutional part may be stationary.

As an example of the case where the control device 700 is used as a game controller, it is conceivable that an action pattern of a player object is supplied as a signal to the data processing unit. In the case where action patterns are made to correspond to respective hardware buttons, when the number of hardware buttons that can be provided on the controller is small, the number of types of patterns is limited to the small number of buttons.

In view of the above, various combinations of sensor elements included in the input unit 301 and the input unit 301b, such as pressing some hardware buttons at the same time or performing an operation set by a combination of a hardware button and a change in the tilt of the controller, are made to correspond to respective action patterns, so that the number of types of action patterns that can be transmitted to the data processing unit can be increased.

Data on the action patterns corresponding to such combinations is stored in the storage device 21c included in the processing unit 21, whereby the frequency of transmission and reception of data between the control device 700 and the data processing unit 799 can be reduced, improving the ease of playing the game, in some cases. Data on the action patterns corresponding to the combinations may be freely created by a user, and the storage device 21c can store data specific to the control device.

The input unit 301b may include a display unit. The display unit preferably includes a region functioning as a touch sensor as the sensor element 710b. The display unit may display information on the object corresponding to the control device 700. For example, the display unit may display information on the position of the object, information on time such as play time or drive time of the object, information on data to be transmitted from the control device 700 to the data processing unit 799, information on the specific ID of the control device 700, or the like. The display unit may display image data generated by the data processing unit 799, e.g., an image 17A described later.

For example, the display unit includes, as a display device, at least one of an EL (electroluminescence) device (an EL device including an organic substance and an inorganic substance, an organic EL device, or an inorganic EL device), an LED chip (a white LED chip, a red LED chip, a green LED chip, a blue LED chip, or the like), a transistor (a transistor that emits light depending on a current), a plasma display panel (PDP), an electron emitter, a display device including a carbon nanotube, a liquid crystal device, electronic ink, an electrowetting element, an electrophoretic element, a display device using MEMS (microelectromechanical systems) (for example, a grating light valve (GLV), a digital micromirror device (DMD), a DMS (digital micro shutter), MIRASOL (registered trademark), an IMOD (interferometric modulation) element, a MEMS shutter display device, an optical-interference-type MEMS display device, or a piezoelectric ceramic display), and quantum dots. Other than the above, the display device, the display apparatus, the light-emitting device, or the light-emitting apparatus may include display media whose contrast, luminance, reflectivity, transmittance, or the like changes by electrical or magnetic effect. Examples of display apparatuses using EL devices include an EL display. Examples of display apparatuses using electron emitters include a field emission display (FED), an SED-type flat panel display (SED: Surface-conduction Electron-emitter Display), and the like. Examples of display apparatuses using liquid crystal devices include a liquid crystal display (a transmissive liquid crystal display, a transflective liquid crystal display, a reflective liquid crystal display, a direct-view liquid crystal display, or a projection liquid crystal display) and the like. Examples of display apparatuses using electronic ink, Electronic Liquid Powder (registered trademark), or an electrophoretic element include electronic paper and the like. Examples of display apparatuses containing quantum dots in each pixel include a quantum dot display. Quantum dots may be provided not as display devices but as part of a backlight. The use of quantum dots enables display with high color purity.

The display unit may have flexibility. The flexible display unit includes, for example, a display device provided over a first substrate having flexibility.

The display unit may function as an imaging device. An image of a palm print, a fingerprint, or the like is captured by touching the display unit with the palm or the finger, whereby personal authentication can be performed. Furthermore, when a backlight which emits near-infrared light or a sensing light source which emits near-infrared light in the display unit is used, an image of a finger vein, a palm vein, or the like can be captured.

The sensing unit 711b has a function of supplying a signal detected by the sensor element 710b to the determination circuit 712b and the like. The sensing unit 711b may perform processing such as amplification or compression on a signal supplied from the sensor element 710b and then supply the processed signal to circuits. The sensing unit 711b may have a function of converting an analog signal into a digital signal.

The determination circuit 712b has a function of performing determination about the signal supplied from the sensor element 710b through the sensing unit 711b (hereinafter, a signal Se2). When determining that the sensor element 710b has detected a desired signal, the determination circuit 712b supplies a signal INT, which is a signal for requesting interrupt processing, to the processing unit 21, for example.

When determining that a desired signal has not been detected by the sensor element 710b, the determination circuit 712b does not supply the signal INT2. In the processing unit 21, for example, the arithmetic circuit 21a and the like may be in a resting state in a period during which the signal INT and the signal INT2 are not supplied.

The control device 700 may include a light-emitting unit.

When supplied with the signal INT or the signal INT2 from the determination circuit 712, the processing unit 21 returns from the resting state to a normal state and starts processing.

When supplied with both the signal INT and the signal INT2, for the processing, the processing unit 21 receives the signal Se1 and the signal Se2 and performs an arithmetic operation using the signal Se1 and the signal Se2 to generate data, for example. The generated data is referred to as data Ps2.

The data processing unit 799 includes a processing unit 99. The processing unit 99 includes an arithmetic circuit and the like. The processing unit 99 may have a structure including a power management unit and an arithmetic circuit using a transistor including an oxide semiconductor in a channel formation region. The use of the structure allows the processing unit to return from the resting state to a normal state at extremely high speed. Furthermore, the use of the structure can reduce the power consumption of the processing unit 99.

The data processing unit 799 includes a sensor element 96. The sensor element 96 includes one or more selected from a hardware button, a keyboard, a pointing device, a touch sensor, an audio input device, an eye-gaze input device, an imaging device, and an illuminance sensor. The data processing unit 799 may generate position data, posture data, or the like in addition to the data Ps1, Ch1, and the like with the use of a signal detected by the sensor element 96.

For example, an imaging device may be used as the sensor element 96 to capture an image of the control device 700 and its surrounding environment, and position data, posture data, or the like may be generated using the captured image. When an image of the control device 700 is captured, for example, making the light-emitting unit of the control device 700 emit light facilitates analysis of the position of the control device 700, or the like.

A display unit 97 is preferably connected to the data processing unit 799. Examples of a method for connecting the data processing unit 799 and the display unit 97 include wired electrical connection and connection through wireless signal transmission. The display unit 97 may be connected to the control device 700.

The display unit 97 preferably display image data generated by the data processing unit 799. For example, the image 17A described later is preferably displayed on the display unit 97.

Operation Example

An example in which the data processing unit 799 generates image data using a detection signal supplied to the sensor element included in the control device 700 is described below with reference to a flow chart shown in FIG. 3B, and the like.

The data processing unit 799 generates an image of a virtual space used for a game. A user gives an instruction regarding the operation of a player object 23A in the image 17A representing a virtual space by using the control device 700.

Figure 2B:
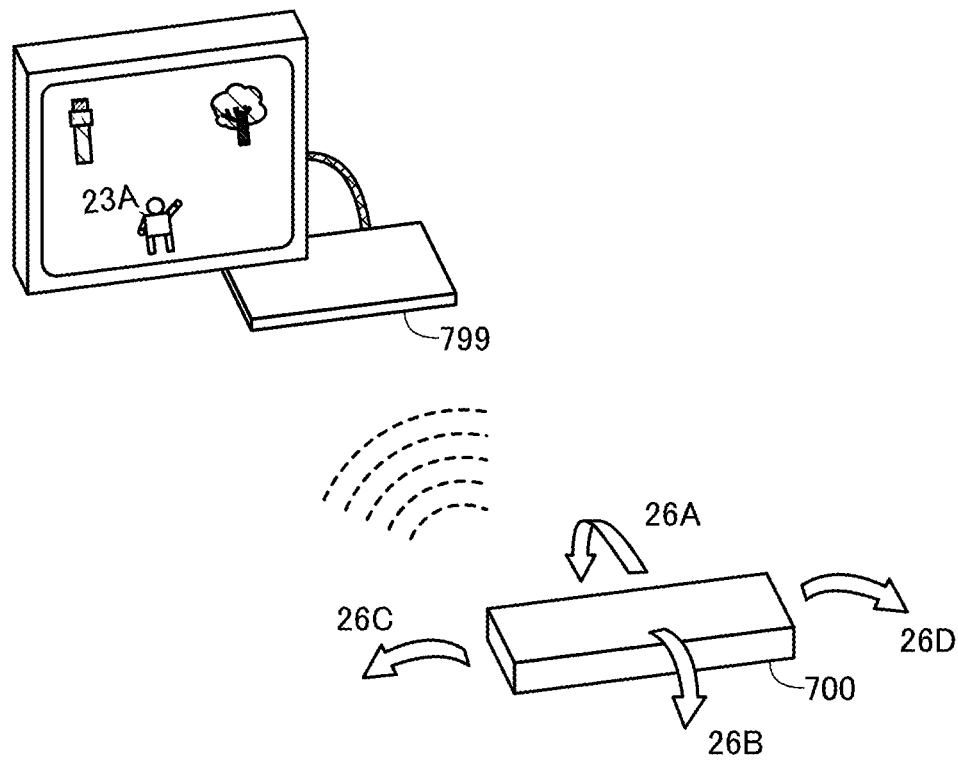
FIG. 2B is a diagram illustrating one embodiment of the present invention.
Figure 3A:
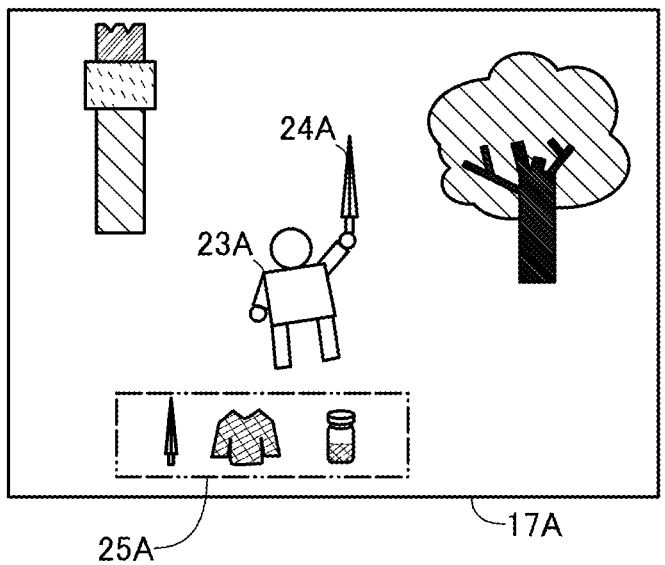
FIG. 3A is a diagram illustrating one embodiment of the present invention.
Figure 3B:
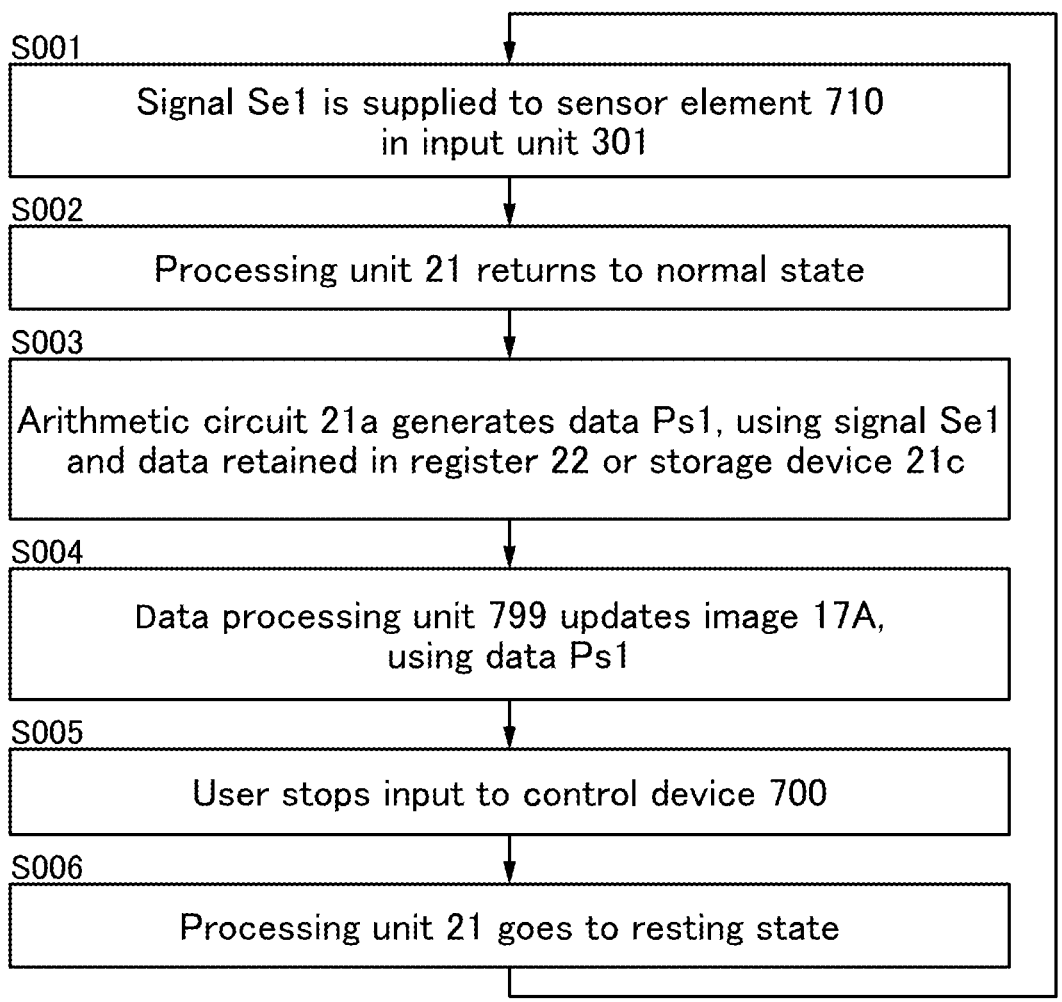
FIG. 3B is a diagram showing an operation example using a structure of one embodiment of the present invention.

Here, the user changes the tilt of the control device 700, so that a detection signal (signal Se1) is supplied to the sensor element 710 included in the input unit 301 (see Step S001 in FIG. 3B). By tilting the control device 700 in a direction 26A shown in FIG. 2B, that is, backward, forward movement of the player object 23A is ordered. The tilt angle corresponds to the moving speed of the player object. By tilting the control device 700 in a direction 26B, that is, forward, backward movement of the player object is ordered. By tilting the control device 700 in a direction 26C, that is, leftward, left rotation of the player object is ordered, and by tilting the control device 700 in a direction 26D, that is, rightward, right rotation of the player object is ordered.

The operation of the control device 700 by the user is detected by the sensor element 710. Here, in the case of being in a resting state, the processing unit 21 returns to a normal state (Step S002 in FIG. 3B). The processing unit 21 performs an arithmetic operation in the arithmetic circuit 21a with the use of the signal Se1, which is a detection signal of the sensor element 710, a parameter retained in the register 22, or a parameter retained in the storage device 21c to generate the data Ps1 (Step S003 in FIG. 3B). The data Ps1 is transmitted to the data processing unit 799 as needed. Here, the signal Se1 may be acquired a plurality of times at regular intervals and the average value may be calculated using the acquired plurality of pieces of data. In that case, after the plurality of pieces of data are stored in the storage device 21c, the stored data can be read out to perform calculation.

The data processing unit 799 receives the data Ps1 transmitted as needed, calculates the moving distance of the player object with the use of the data Ps1, and updates the position and equipment of the player object in the image 17A as needed (see Step S004).

Figure 2A:
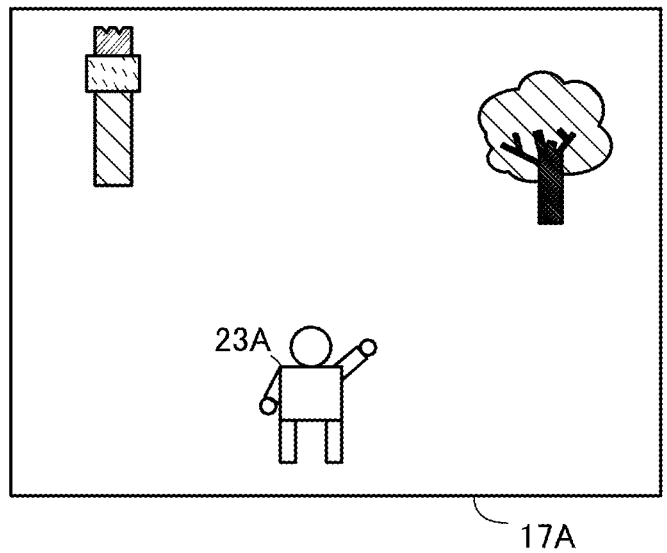
FIG. 2A is a diagram illustrating one embodiment of the present invention.

FIG. 3A shows an image in which the player object 23A is made to move in response to an instruction regarding the image 17A in FIG. 2A given by the control device 700. In FIG. 3A, the player object 23A is bearing equipment 24A. As the equipment 24A, desired one or more items selected from an equipment list 25A, for example. In the lower part of the image 17A in FIG. 3A, the equipment list 25A is shown. Examples of items in the equipment list include a weapon, a protector, and an item having a desired effect in a game. The equipment 24A can be borne by an instruction given using the input unit 301 or the input unit 301b, for example. Specifically, for example, a sensor element such as a hardware button or an audio input device is provided in the input unit 301b so that an instruction can be given. Information on the equipment 24A borne by the player object 23A is preferably stored as data in the storage device 21c.

To suspend the game, the user stops inputting an instruction using the control device 700 (see Step S005 in FIG. 3(B)). When the input of an instruction is stopped, detection by the sensor elements is stopped in the input unit 301 and the input unit 301b of the control device 700. Alternatively, the level of a signal to be detected becomes low. At this time, the determination circuit 712 determines that a desired signal has not been detected and does not supply the signal INT to the processing unit 21.

Receiving neither the signal INT nor the signal INT2, the processing unit 21 goes to a resting state (see Step S006 in FIG. 3B). Specifically, supply of power to the arithmetic circuit 21a, the storage device 21c, and the like included in the processing unit 21 is stopped, reducing power consumption of the control device 700.

To restart the game, the user inputs an instruction using the control device 700 again. The determination circuit 712 supplies the signal INT to the processing unit 21. Alternatively, the determination circuit 712b supplies the signal INT2 to the processing unit 21. The processing unit 21 returns from the resting state to a normal state.

In the processing unit of one embodiment of the present invention, on resumption of power supply, data is promptly read from the circuit BKC1 into the circuit MemC1 in the register 22 of the arithmetic circuit 21a so that an arithmetic operation can be restarted. Thus, time required to return from the resting state to a normal state can be shortened, resulting in a reduction in startup time when the user restarts the game. Parameters when the game is suspended are stored in the storage device 21c or the register 22 of the arithmetic circuit 21a and are transmitted to the data processing unit 799 when the game is restarted, whereby the amount of processing for the restart of the game in the data processing unit 799 can be reduced, in some cases.

Figure 4A:
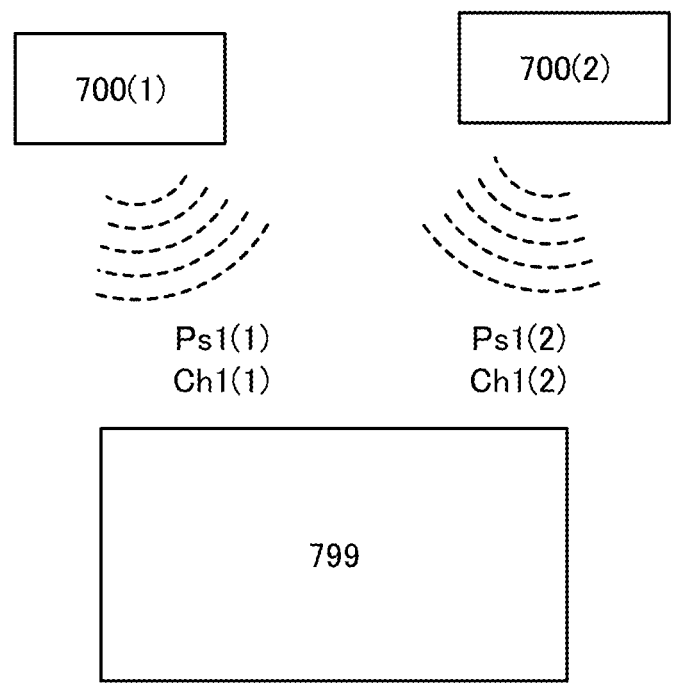
FIG. 4A is a diagram illustrating one embodiment of the present invention.

The plurality of control devices 700 may communicate with the data processing unit 799. FIG. 4A illustrates an example in which two control devices 700 (hereinafter, a control device 700(1) and a control device 700(2)) communicate with the data processing unit 799. The data Ps1 and the data Ch1 supplied from the control device 700(1) to the data processing unit 799 are referred to as data Ps1(1) and data Ch1(1), respectively. The data Ps1 and the data Ch1 supplied from the control device 700(2) to the data processing unit 799 are referred to as data Ps1(2) and data CH1(2), respectively. Data Ch(1) may contain the specific ID of the control device 700(1), and data Ch(2) may contain the specific ID of the control device 700(2).

Figure 4B:
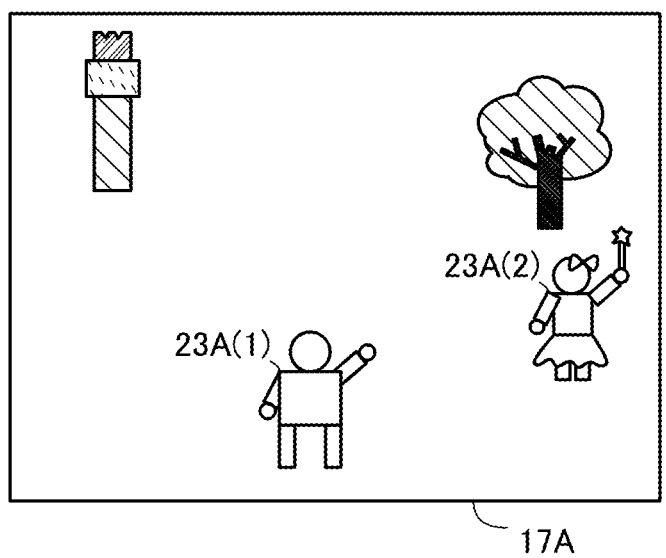
FIG. 4B is a diagram illustrating one embodiment of the present invention.

FIG. 4B shows the player object 23A placed on the basis of the data Ps1(1) and the data Ch1(1) (hereinafter referred to as a player object 23A(1)) and the player object 23A placed on the basis of the data Ps1(2) and the data CH1(2) (hereinafter referred to as a player object 23A(2)) in the image 17A.

<Structure Example 1 of Processing Unit>

A processing unit capable of power gating, a power management mechanism thereof, and the like are described below.

Figure 5A:
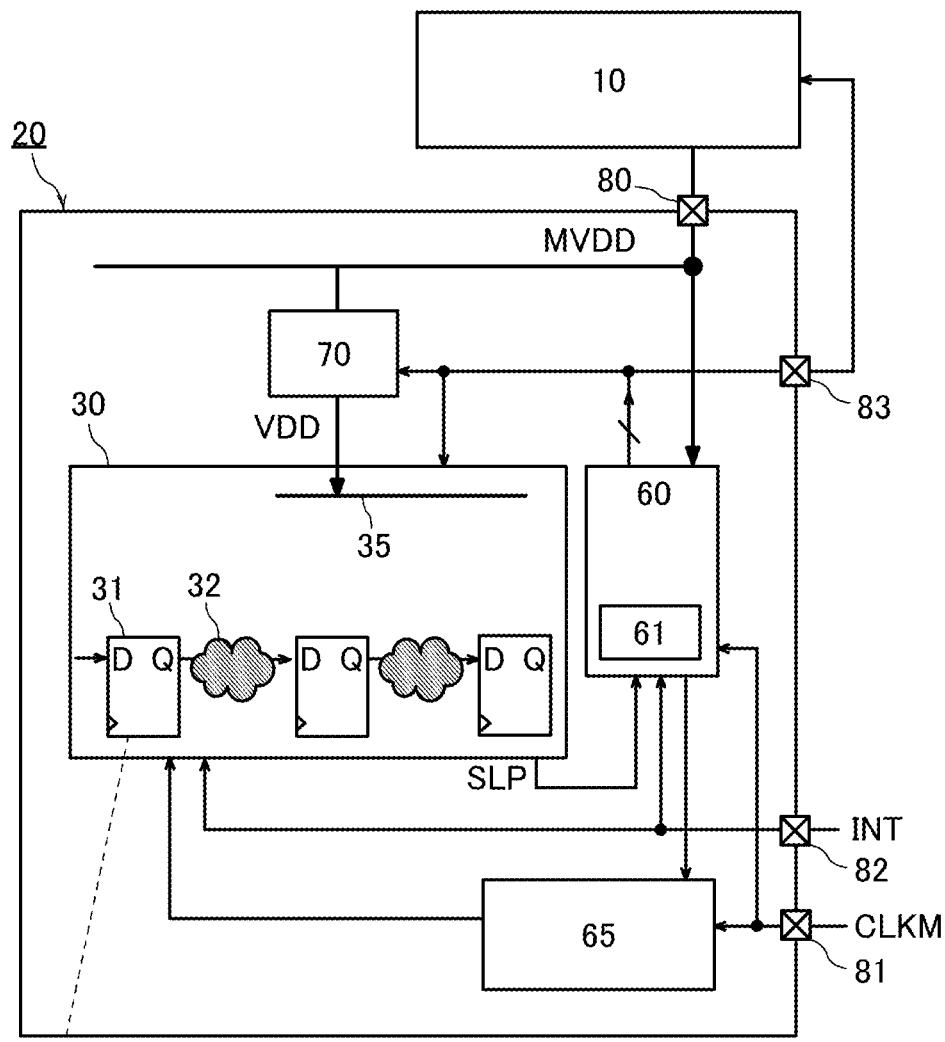
FIG. 5A and FIG. 5B are block diagrams illustrating structure examples of a semiconductor device.

A semiconductor device and power management thereof are described with reference to FIG. 5. The semiconductor device illustrated in FIG. 5A includes the power supply circuit 10 and the processing unit (PU) 20. The PU 20 is a circuit having a function of executing an instruction. The PU 20 includes a plurality of functional circuits integrated over one chip. The PU 20 includes a processor core 30, a power management unit (PMU) 60, a clock control circuit 65, a power switch (PSW) 70, and a terminal 80 to a terminal 83. FIG. 5A illustrates an example in which the power supply circuit 10 and the PU 20 are provided over different chips. The terminal 80 is a terminal to which a power supply potential MVDD is input from the power supply circuit 10. The terminal 81 is a terminal to which a reference clock signal CLKM is input from the outside. The terminal 82 is a terminal to which the signal INT is input from the outside. The signal INT is an interrupt signal for requesting interrupt processing. The signal INT is input to the PU 20 and the PMU 60. The terminal 83 is a terminal to which a control signal generated in the PMU 60 is output, and is electrically connected to the power supply circuit 10.

In the semiconductor device of one embodiment of the present invention, the number of bits processed in an arithmetic circuit and the like of the processing unit can be 8 bits, 16 bits, 32 bits, 64 bits, or the like.

<Processor Core 30 and Storage Circuit 31>

The processor core 30 is a circuit capable of processing an instruction and can be referred to as an arithmetic processing circuit. The processor core 30 includes a storage circuit 31, a plurality of combinational circuits 32, and the like, and a variety of functional circuits are formed using these circuits. For example, the storage circuit 31 is included in a register.

Figure 5B:
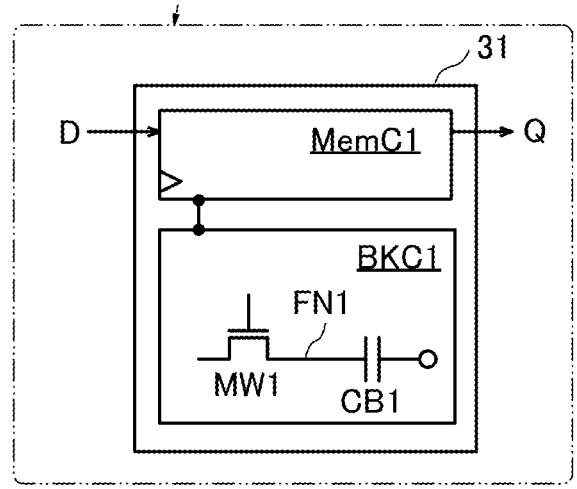

As illustrated in FIG. 5B, the storage circuit 31 includes a circuit MemC1 and a circuit BKC1. The circuit MemC1 has a function of retaining data generated in the processor core 30, and can be formed using a flip-flop circuit (FF) or a latch circuit, for example. The circuit BKC1 can function as a backup circuit of the circuit MemC1, and can retain data for a long time even when power supply is stopped or supply of a clock signal is stopped. The use of the storage circuit 31 enables power gating of the processor core 30. This is because the state of the processor core 30 at the time of power-off can be retained by saving data of the circuit MemC1 to the circuit BKC1 in the storage circuit 31 before power-off. When the power supply is restarted, data retained in the circuit BKC1 is written to the circuit MemC1; thus, the state of the processor core 30 at the time of power-off can be restored. Consequently, the PU 20 can perform normal processing immediately after the power supply is restarted.

The circuit BKC1 includes at least a retention circuit including one transistor (MW1) and one capacitor (CB1). The retention circuit illustrated in FIG. 5B has a circuit structure similar to a 1T1C (one transistor and one capacitor) memory cell structure of a standard DRAM (dynamic random access memory), and can perform write and read operations as in the standard DRAM. By control of the conduction state of the transistor MW1, charging and discharging of the capacitor CB1 are controlled. When the transistor MW1 is turned off, a node FN1 is brought into an electrically floating state. Fluctuation in the potential of the node FN1 can be inhibited by a significant reduction in the drain current of the transistor MW1 in an off state (off-state current); thus, the data retention time of the circuit BKC1 can be made longer. The data retention time of the circuit BKC1 is determined by the leakage current of the transistor MW1, the capacitance of the capacitor CB1, and the like. The use of the transistor MW1 having an extremely low off-state current eliminates the necessity of refreshing the circuit BKC1 while the PU 20 operates. Thus, the circuit BKC1 can be used as a nonvolatile storage circuit.

A transistor including an oxide semiconductor (OS), which is one kind of metal oxide, in a semiconductor layer where a channel is formed (such a transistor is also referred to as an "OS transistor" or "OS-FET") is preferably used as the transistor MW1. An oxide semiconductor has a band gap of 2 eV or more and thus has an extremely low off-state current. In an OS transistor, a normalized off-state current per micrometer of channel width at a source-drain voltage of 10 V can be less than or equal to $10 \times 10^{-21}$ A (10 zA (zeptoamperes)). When the transistor MW1 is an OS transistor, the circuit BKC1 can substantially function as a nonvolatile storage circuit while the PU 20 operates. OS transistors are described in Embodiment 2.

An oxide semiconductor film used for a semiconductor layer where a channel is formed may be formed of a single oxide semiconductor film or stacked oxide semiconductor films. An oxide semiconductor included in the semiconductor layer where a channel is formed is preferably an oxide containing one or more elements selected from In, Ga, Sn, and Zn. As such an oxide, an In—Sn—Ga—Zn oxide, an In—Ga—Zn oxide, an In—Sn—Zn oxide, an In—Al—Zn oxide, a Sn—Ga—Zn oxide, an Al—Ga—Zn oxide, a Sn—Al—Zn oxide, an In—Zn oxide, a Sn—Zn oxide, an Al—Zn oxide, a Zn—Mg oxide, a Sn—Mg oxide, an In—Mg oxide, an In—Ga oxide, an In oxide, a Sn oxide, a Zn oxide, or the like can be used.

Data is written with voltage in the circuit BKC1; thus, the write power of the circuit BKC1 can be lower than that of an MRAM (magnetoresistive RAM) in which writing is performed with current. Furthermore, unlike in a flash memory, the number of data rewriting times is not limited because data is retained by the load capacitance of the node FN1.

In the circuit BKC1, energy required for data writing corresponds to energy required for charging and discharging of charge in the capacitor CB1. By contrast, in a storage circuit including a two-terminal memory element such as an MRAM, energy required for data writing corresponds to energy consumed when current flows to the memory element. In the MRAM, energy required for data writing is high because current continuously flows during a data writing period. As compared with such an MRAM, the circuit BKC1 can reduce energy consumed by data writing. Thus, as compared with a storage circuit in which a backup circuit is formed using an MRAM, the storage circuit 31 can frequently perform voltage scaling and power gating for reducing consumed energy, which leads to a reduction in the power consumption of the PU 20.

<Power Management>

The PMU 60 has a function of controlling a power gating operation, a clock gating operation, a voltage scaling operation, and the like. Specifically, the PMU 60 has a function of controlling the power supply circuit 10, a function of controlling the storage circuit 31, a function of controlling the clock control circuit 65, and a function of controlling the PSW 70. Thus, the PMU 60 has a function of generating control signals for controlling these circuits (the power supply circuit 10, the storage circuit 31, the clock control circuit 65, and the PSW 70). The PMU 60 includes a circuit 61. The circuit 61 has a function of measuring time. The PMU 60 has a function of performing power management on the basis of data on time obtained by the circuit 61.

The PSW 70 has a function of controlling supply of a power supply potential MVDD to the PU 20 in response to a control signal of the PMU 60. Here, a power supply potential supplied to the PU 20 through the PSW 70 is referred to as the power supply potential VDD. The processor core 30 may include a plurality of power domains. In that case, supply of power to the plurality of power domains may be controlled independently by the PSW 70. In addition, the processor core 30 may include a power domain that does not require power gating. In that case, a power supply potential may be supplied to this power domain without through the PSW 70.

The clock control circuit 65 has a function of generating and outputting a gated clock signal by input of the reference clock signal CLKM. The clock control circuit 65 has a function of stopping supply of a clock signal to the processor core 30 in response to a control signal of the PMU 60. The power supply circuit 10 has a function of changing the magnitude of the power supply potential VDD in response to a control signal of the PMU 60.

A signal SLP output from the processor core 30 to the PMU 60 is a trigger signal for transferring the processor core 30 to a resting state. When the signal SLP is input to the PMU 60, the PMU 60 generates a control signal for transition to a resting state and outputs the control signal to a functional circuit to be controlled. The power supply circuit 10 makes the power supply potential MVDD lower than that in a normal operation in response to a control signal of the PMU 60. After the processor core 30 is in the resting state for a certain period of time, the PMU 60 controls the PSW 70 and stops power supply to the processor core 30. When the processor core 30 is transferred from a normal state to the resting state, the PMU 60 performs a voltage scaling operation for lowering the power supply potential VDD of the processor core 30. When the period of the resting state exceeds the set time, the PMU 60 performs a power gating operation for stopping supply of the power supply potential VDD to the processor core 30 in order to further reduce the power consumption of the processor core 30. Power management of the semiconductor device illustrated in FIG. 5 is described below with reference to FIG. 6 and FIG. 7.

FIG. 6 schematically shows changes in the potential of a power supply line. The power supply potential VDD is supplied to a power supply line 35 through the PSW 70. The horizontal axis in each diagram shows the time elapsing between transition from the normal state to the resting state, and t0, t1, and the like each represent time. FIG. 6A shows an example in which only power gating is executed in the resting state, and FIG. 6B shows an example in which only voltage scaling is executed in the resting state. FIG. 6C and FIG. 6D each show an example in which voltage scaling and power gating are executed. In the normal state, the magnitude of the power supply potential MVDD supplied from the power supply circuit 10 is VH1.

In the following description, the power mode of the PU 20 is divided into three modes: a power-on mode, a power-off mode, and a low-power mode. The power-on mode is a mode in which the power supply potential VDD that enables normal processing is supplied to the PU 20. The power-off mode is a mode in which the supply of VDD is stopped by the PSW 70. The low-power mode is a mode in which the power supply potential VDD lower than that in the power-on mode is supplied.

Figure 6A:
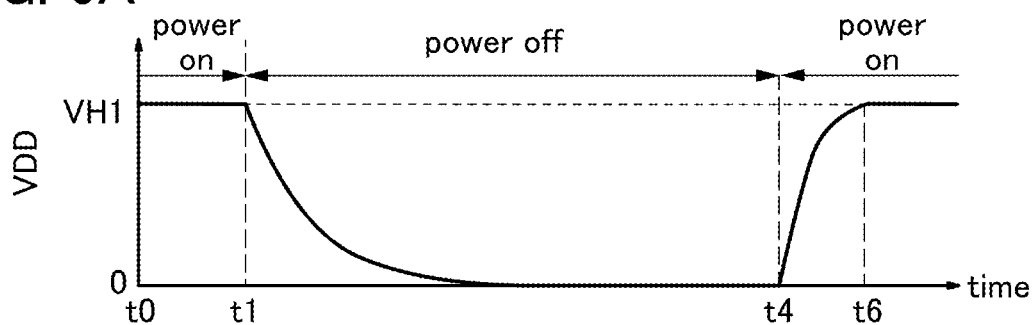
FIG. 6A to FIG. 6D are diagrams showing power management operation examples of a semiconductor device.
Figure 7:
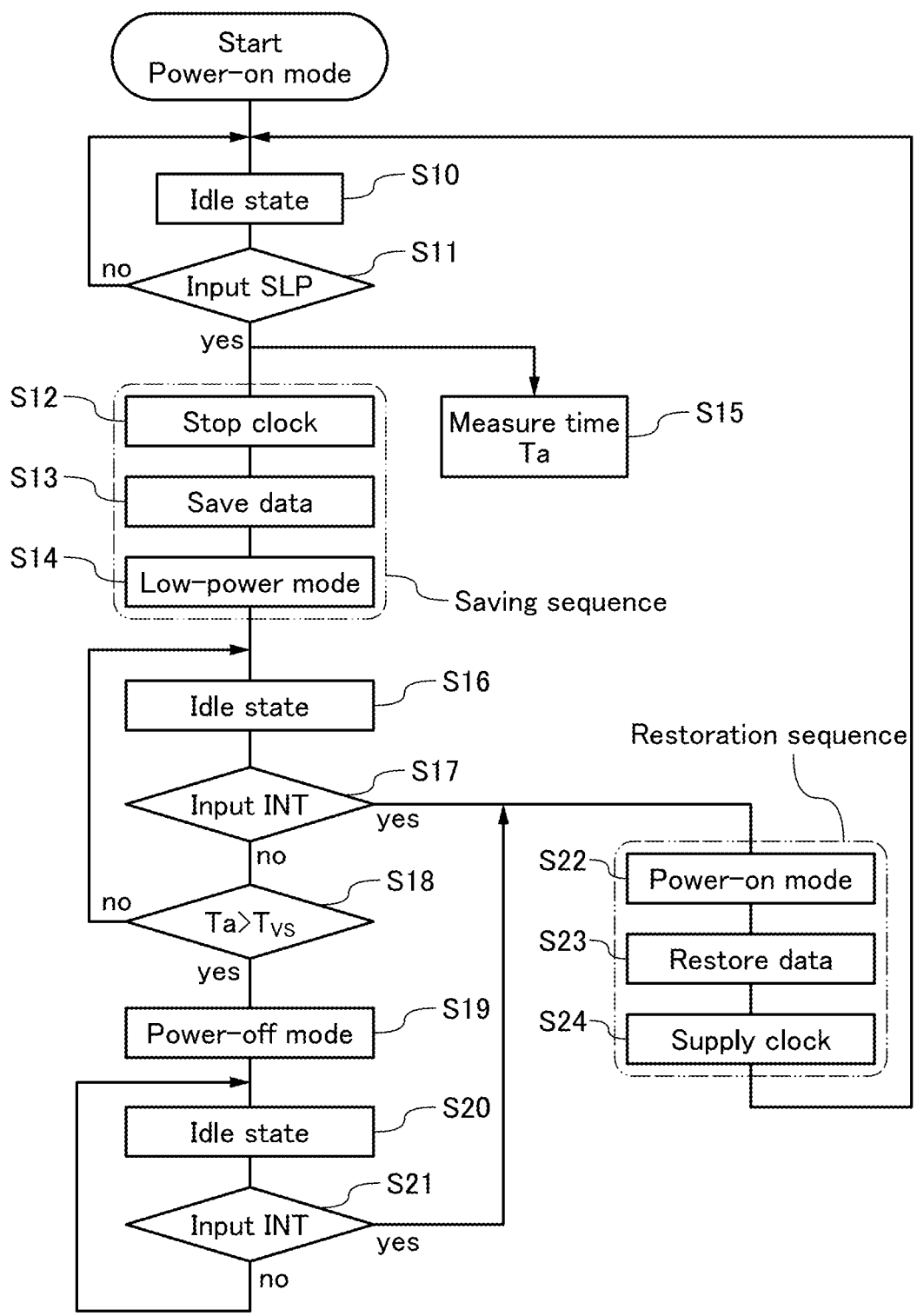
FIG. 7 is a flow chart showing a power management operation example of a semiconductor device.

The example in FIG. 6A is described. At the time t0, processing for transition to the resting state is started in the processor core 30. For example, backup of the storage circuit 31 is performed. The PMU 60 controls the PSW 70 and stops supply of power to the processor core 30 at the time t1. A power supply line 35 is self-discharged and its potential is decreased to 0 V. Consequently, leakage current of the processor core 30 in the resting state can be significantly lowered, so that power consumption in the resting state (hereinafter, referred to as standby power in some cases) can be reduced. In the case where the processor core 30 returns to the normal state in response to an interrupt request or the like from the outside, the PMU 60 controls the PSW 70 and restarts the supply of VDD. Here, at time t4, the supply of VDD is restarted. The potential of the power supply line 35 increases and becomes VH1 at time t6.

Figure 6B:
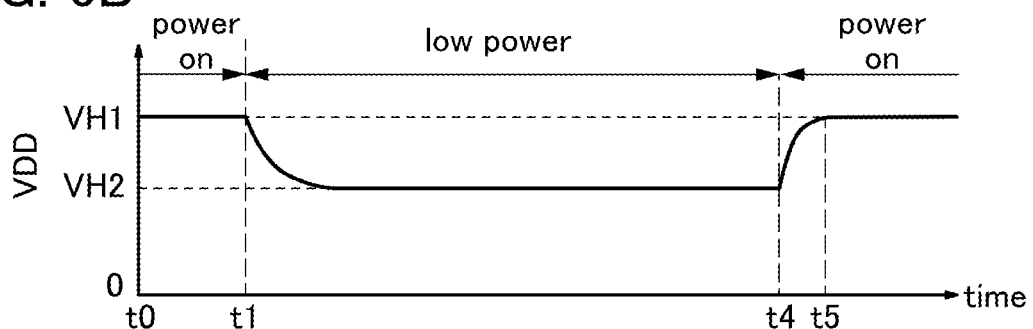

In the case of the example in FIG. 6B, voltage scaling is performed; thus, at the time t1, the PMU 60 controls the power supply circuit 10 and lowers the power supply potential MVDD to VH2. The potential of the power supply line 35 eventually becomes VH2. At the time t4, when the power supply potential MVDD returns from VH2 to VH1, the potential of the power supply line 35 increases and becomes VH1 at time t5.

In the case of the example in FIG. 6A, time taken for the return from the resting state to the normal state (overhead time) is time taken to increase the potential of the power supply line 35 from 0 V to VH1, and an energy overhead required for the return is energy required to charge the load capacitance of the power supply line 35 from 0 V to VH1. When the period of the power-off mode (t1 to t4) is sufficiently long, power gating is effective in reducing standby power of the PU 20. By contrast, when the period (t1 to t4) is short, power required for the return to the normal state is higher than power reduced by power-off; therefore, the effect of power gating cannot be obtained.

Figure 6C:
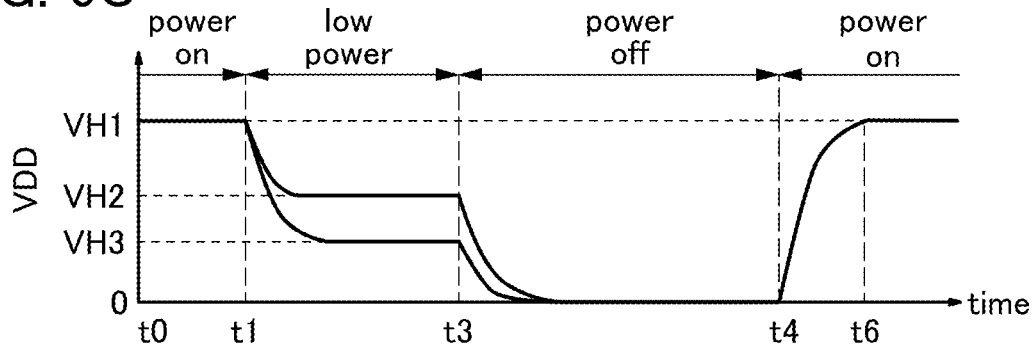
Figure 6D:
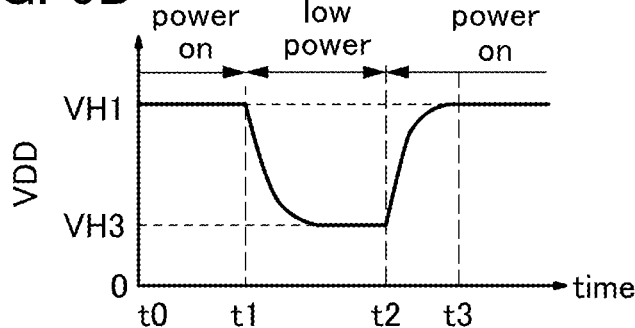

In the example of voltage scaling shown in FIG. 6B, the potential of the power supply line 35 is VH2 in the resting state; thus, the amount of standby power reduction is smaller than that in the example of power gating in FIG. 6A. In the example of FIG. 6B, fluctuation in the potential of the power supply line 35 is small; therefore, time taken for the return to the normal state is shorter and energy required for the return is lower than those in the example of FIG. 6A. Accordingly, the semiconductor device illustrated in FIG. 5 can perform power management in which power gating and voltage scaling are combined to efficiently reduce the standby power of the PU 20. FIG. 6C and FIG. 6D each show a power management example.

As shown in FIG. 6C, first, a voltage scaling operation is performed in the resting state and the mode is transferred from the power-on mode to the low-power mode. As in FIG. 6B, at the time t1, the PMU 60 controls the power supply circuit 10 and lowers the power supply potential MVDD to VH2; thus, the potential of the power supply line 35 eventually becomes VH2. After a certain period of time from transition to the low-power mode (t1 to t3), the PMU 60 controls the PSW 70 and transfers the mode to the power-off mode. In the period (t3 to t4), power reduced by powering off the PU 20 by power gating, which includes power consumed by returning to the normal state, is higher than power reduced by supplying VH2 to the PU 20.

For example, the potential VH2 is a power supply potential high enough to retain data in the circuit MemC1 of the storage circuit 31, and a potential VH3 is a potential at which data of the circuit MemC1 is lost. In the PU 20 of FIG. 5A, the circuit BKC1 can retain data even while power supply is stopped. When data of the storage circuit 31 is saved to the circuit BKC1 in the period (t0 to t1), VDD can be lowered to the potential VH3 at which data of the circuit MemC1 is lost in the low-power mode. Thus, the standby power of the PU 20 can be further reduced.

The PMU 60 has a function of returning the PU 20 to the normal state in response to an interrupt request or the like. The PMU 60 controls the power supply circuit 10 to increase the magnitude of MVDD to VH1 and controls the PSW 70 to restart the supply of VDD from the PU 20. After the time t4, the power-on mode continues. In the case where the potential of the power supply line 35 is stabilized at the time t6, the PU 20 can perform a normal operation after the time t6.

FIG. 6D shows an example in which an interrupt request for the return to a normal operation is input before the time t3. After the time t2, the power-on mode continues. At the time t2, the PMU 60 controls the power supply circuit 10 to change the magnitude of MVDD to the potential VH1 in the power-on mode. At the time t3, the potential of the power supply line 35 increases to VH1.

As shown in FIG. 6C and FIG. 6D, time required to restore the potential of the power supply line 35 to VH1 in the resting state is longer when the mode returns from the power-off mode to the power-on mode than when the mode returns from the low-power mode to the power-on mode. Thus, the PMU 60 has a function of adjusting timing of returning the processor core 30 from the resting state to the normal state depending on the power mode. Accordingly, the processor core 30 can return from the resting state to the normal state in the minimum time.

In the resting state, transition time from the low-power mode to the power-off mode can be measured by the circuit 61 provided in the PMU 60. When the signal SLP is input from the PU 20, the PMU 60 starts time measurement in the circuit 61. After a certain period of time from transition to the low-power mode, the PMU 60 is transferred to the power-off mode. The PSW 70 is turned off by a control signal of the PMU 60, and the supply of VDD is stopped. In this manner, the PMU 60 can be transferred from the low-power mode to the power-off mode in response to an interrupt request based on measurement data of the circuit 61. A power management operation example of the PMU 60 is described below with reference to FIG. 7.

At the initiation stage, the PU 20 performs a normal operation. The power mode is a power-on mode and the PMU 60 is in an idle state (Step S10). The PMU 60 is in the idle state until the signal SLP is input, and a saving sequence is executed with input of the signal SLP as a trigger (Step S11). In the saving sequence example of FIG. 7, first, the PMU 60 outputs a control signal to the clock control circuit 65 and stops output of a clock signal (Step S12). Next, a control signal for data saving is output to the storage circuit 31 (Step S13). In the storage circuit 31, data retained in the circuit MemC1 is saved to the circuit BKC1 in response to a control signal of the PMU 60. Finally, the PMU 60 controls the power supply circuit 10 to lower MVDD. Through these operations, the power mode is transferred to the low-power mode (Step S14). When the signal SLP is input, the PMU 60 controls the circuit 61 included therein and measures time Ta in the low-power mode (Step S15). Timing of operating the circuit 61 may be any timing as long as the saving sequence is executed; for example, the circuit 61 may operate when the signal SLP is input, when a control signal is output to the clock control circuit 65, when data saving is started, when data saving is terminated, or when a control signal is output to the power supply circuit 10.

After the saving sequence is executed, the PMU 60 is set in an idle state (Step S16), and monitors input of the signal INT and the time Ta that is measurement time of the clock control circuit 65. When the signal INT is input, the sequence is transferred to a restoration sequence (Step S17). Whether the time Ta exceeds set time $T_{vs}$ is determined (Step S18). When the time Ta exceeds the time $T_{vs}$, the PMU 60 controls the power mode such that it transfers to the power-off mode (Step S19). When the time Ta does not exceed the time $T_{vs}$, the PMU 60 remains in the idle state (Step S16). The time $T_{vs}$ is set such that the standby power of the processor core 30 in the power-off mode can be lower than that in the low-power mode.

In Step S19, the PMU 60 outputs, to the PSW 70, a control signal for stopping supply of power to the processor core 30. After the mode is transferred to the power-off mode, the PMU 60 is set in the idle state again (Step S20), and input of the signal INT is monitored (Step S21). When the signal INT is input, the PMU 60 executes the restoration sequence.

In the restoration sequence, first, the PMU 60 is transferred from the power-off mode to the power-on mode (Step S22). The PMU 60 controls the power supply circuit 10 to output a power supply potential in a normal operation. In addition, the PMU 60 controls the PSW 70 to restart the supply of VDD to the processor core 30. Next, a control signal is output to the storage circuit 31 and data of the storage circuit 31 is restored (Step S23). In the storage circuit 31, data retained in the circuit BKC1 is restored to the circuit MemC1 in response to a control signal of the PMU 60. The PMU 60 outputs a control signal for outputting a clock signal to the clock control circuit 65 (Step S24). The clock control circuit 65 restarts the output of a clock signal in response to a control signal of the PMU 60.

As compared with the case where the restoration sequence is executed in accordance with determination in Step S21, the potential of the power supply line 35 can be quickly stabilized in the case where the restoration sequence is executed in accordance with determination in Step S17 because the power mode returns from the low-power mode to the power-on mode. Thus, in the PMU 60, timing of executing Step S23 when the restoration sequence is executed in accordance with Step S17 is faster than that when the restoration sequence is executed in accordance with Step S21. Consequently, time taken to return the processor core 30 from the resting state to the normal state can be shortened.

As described above, in power management of the semiconductor device illustrated in FIG. 5, when the PU 20 is set in the resting state, first, time and energy overheads due to the return from the resting state to the normal state are suppressed while leakage current is reduced by lowering a power supply potential supplied to the processor core 30 with a voltage scaling operation. When the PU 20 is in the resting state for a certain period of time, a power gating operation is performed to reduce the leakage current of the processor core 30 as much as possible. Thus, the power consumption of the PU 20 in the resting state can be reduced without a decrease in the processing performance of the PU 20.

<<Structure Example 2 of Processing Unit>>

Figure 8A:
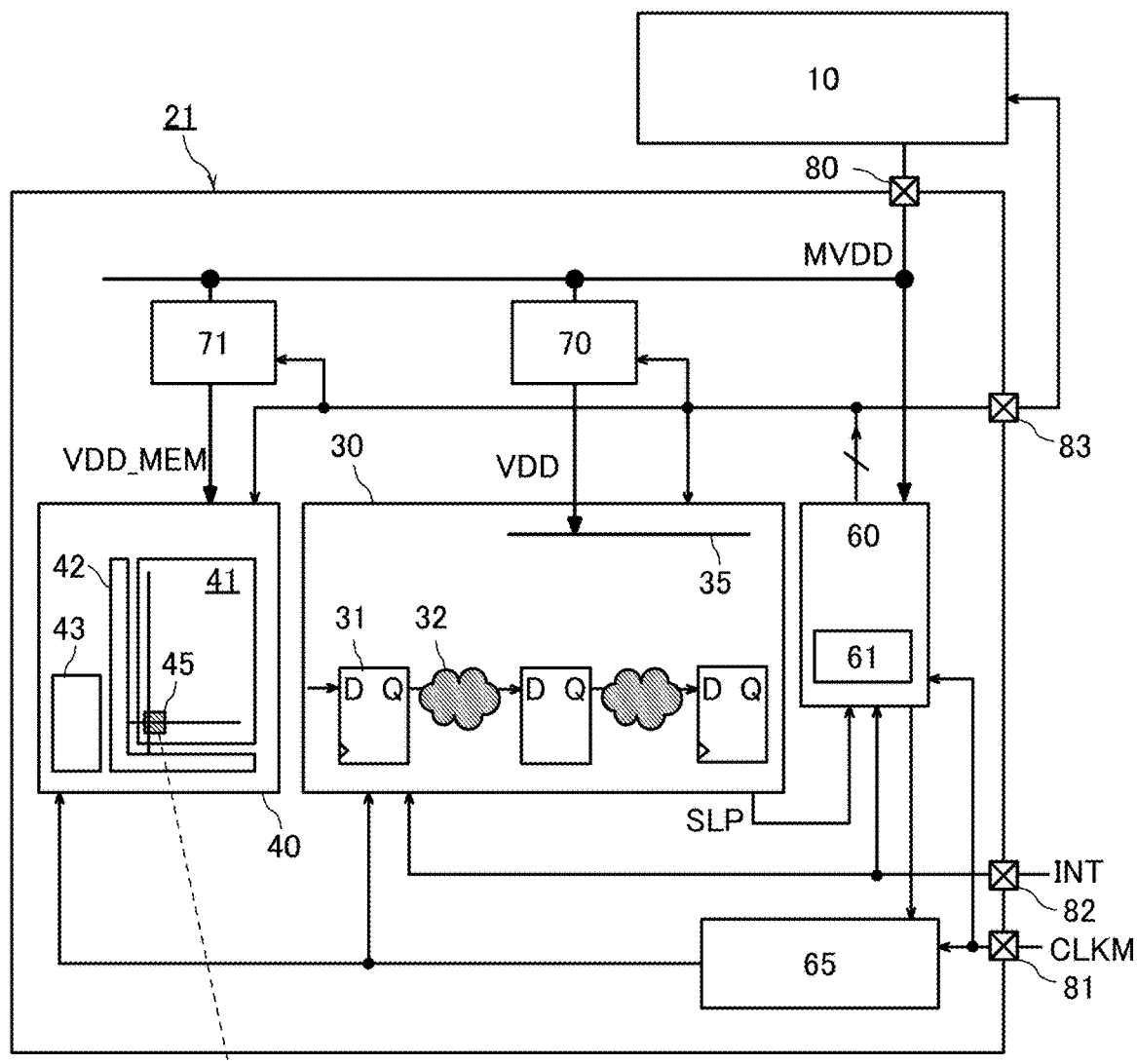
FIG. 8A and FIG. 8B are block diagrams showing structure examples of a semiconductor device.

FIG. 8A illustrates a modification example of the processing unit in FIG. 5A. The processing unit (PU) 21 illustrated in FIG. 8A has a structure obtained by addition of a cache 40 and a power switch (PSW) 71 to the PU 20. The cache 40 can perform power gating and voltage scaling like the PU 20, and the power mode of the cache 40 changes along with the power mode of the PU 21. The PSW 71 controls supply of the power supply potential MVDD to the cache 40 and is controlled by the PMU 60. Here, a power supply potential input to the cache 40 through the PSW 71 is VDD_MEM. A control signal from the PMU 60 and a gated clock signal from the clock control circuit 65 are input to the cache 40, like the processor core 30.

<Cache 40>

The cache 40 is a storage device having a function of temporarily storing frequently used data. The cache 40 includes a memory array 41, a peripheral circuit 42, and a control circuit 43. The memory array 41 includes a plurality of memory cells 45. The control circuit 43 controls the operation of the cache 40 in response to a request from the processor core 30. For example, a writing operation and a reading operation of the memory array 41 are controlled. The peripheral circuit 42 has a function of generating a signal for driving the memory array 41 in response to a control signal from the control circuit 43. The memory array 41 includes the memory cells 45 for retaining data.

Figure 8B:
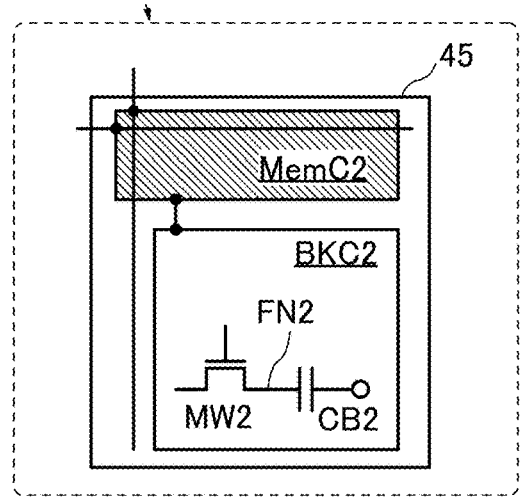

As shown in FIG. 8B, the memory cells 45 each include a circuit MemC2 and a circuit BKC2. The circuit MemC2 is a memory cell to be accessed in a normal operation. For example, an SRAM (static random access memory) cell is used. The circuit BKC2 can function as a backup circuit of the circuit MemC2, and can retain data for a long time even while power supply is stopped or supply of a clock signal is stopped. When such memory cells 45 are provided, power gating of the cache 40 can be performed. Before the power supply is stopped, data of the circuit MemC2 is saved to BKC2 in each of the memory cells 45. After the power supply is restarted, data retained in the circuit BKC2 is restored to the circuit MemC2, so that the PU 21 can quickly return to the state before the power supply is stopped.

Like the circuit BKC1 in FIG. 5B, the circuit BKC2 in each of the memory cells 45 includes at least a retention circuit including one transistor (MW2) and one capacitor (CB2). In other words, the circuit BKC2 also includes a retention circuit having a structure similar to that of a 1T1C memory cell of a standard DRAM. The transistor MW2 has an extremely low off-state current. Like the transistor MW1, an OS transistor is used as the transistor MW2. Such a structure can suppress fluctuation in the potential of a node FN2 that is electrically floating also in the circuit BKC2; thus, the circuit BKC2 can retain data for a long time. The data retention time of the circuit BKC2 is determined by the leakage current of the transistor MW2, the capacitance of the capacitor CB2, and the like. When the transistor MW2 has an extremely low off-state current, the circuit BKC2 can be used as a nonvolatile storage circuit that does not need a refresh operation.

As in the PU 20, the PMU 60 performs power management (see FIG. 7) in the PU 21 illustrated in FIG. 8A. In Step S13 in FIG. 7, a data saving operation of the storage circuit 31 and the cache 40 is performed. In Step S19, the PSW 70 and the PSW 71 are controlled to stop supply of power to the processor core 30 and the cache 40. In Step S22, the PSW 70 and the PSW 71 are controlled to restart the supply of power to the processor core 30 and the cache 40. In Step S23, a data restoration operation of the storage circuit 31 and the cache 40 is performed.

Thus, like the semiconductor device illustrated in FIG. 5, the semiconductor device illustrated in FIG. 8 can reduce power in the resting state of the PU 21 without a decrease in processing performance of the PU 21 by power management in which voltage scaling and power gating are combined.

<<Processor Core Structure Example>>

Figure 9:
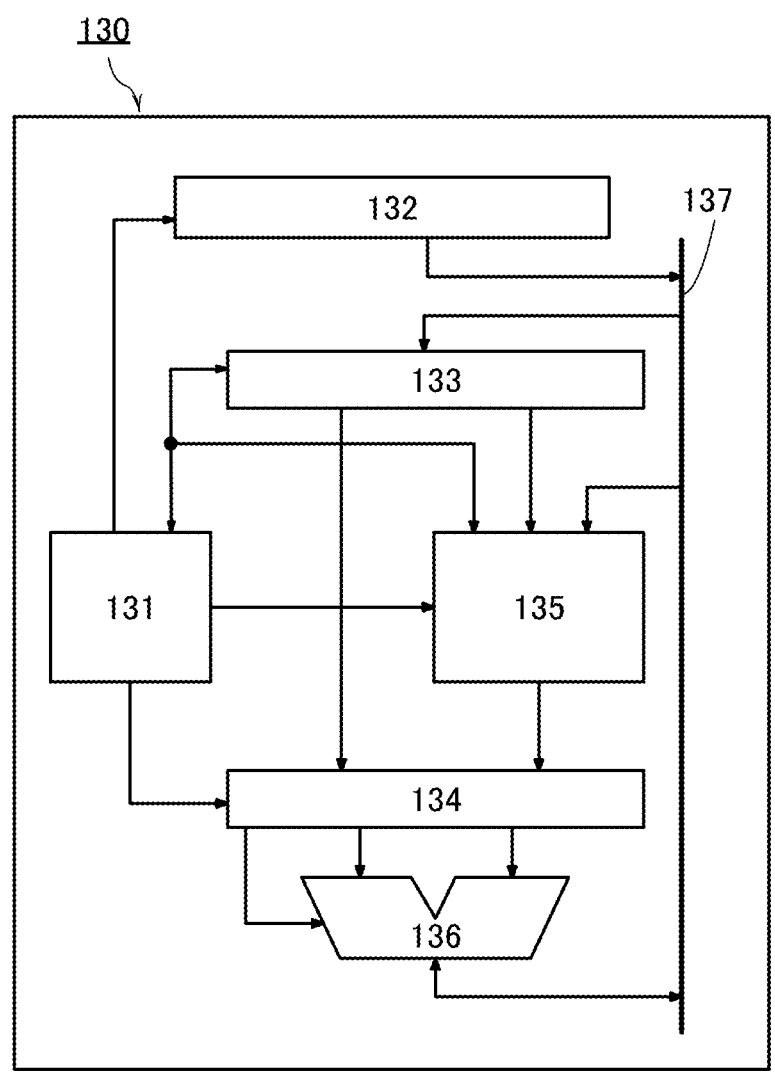
FIG. 9 is a block diagram illustrating a structure example of a processor core.

FIG. 9 shows a processor core structure example. A processor core 130 shown in FIG. 9 includes a control device 131, a program counter 132, a pipeline register 133, a pipeline register 134, a register file 135, an arithmetic logic unit (ALU) 136, and a data bus 137. Data is transmitted between the processor core 130 and a peripheral circuit such as a PMU or a cache through the data bus 137.

The control device 131 has a function of decoding and executing instructions contained in a program such as input applications by controlling the overall operations of the program counter 132, the pipeline register 133, the pipeline register 134, the register file 135, the ALU 136, and the data bus 137. The ALU 136 has a function of performing a variety of arithmetic operations such as four arithmetic operations and logic operations. The program counter 132 is a register having a function of storing the address of an instruction to be executed next.

The pipeline register 133 has a function of temporarily storing instruction data. The register file 135 includes a plurality of registers including a general-purpose register and can store data read out from a main memory, data obtained as a result of arithmetic operations in the ALU 136, or the like. The pipeline register 134 has a function of temporarily storing data used for arithmetic operations in the ALU 136, data obtained as a result of arithmetic operations in the ALU 136, or the like.

The storage circuit 31 in FIG. 5B is used as the register included in the processor core 130.

<Storage Circuit Structure Example>

Figure 10:
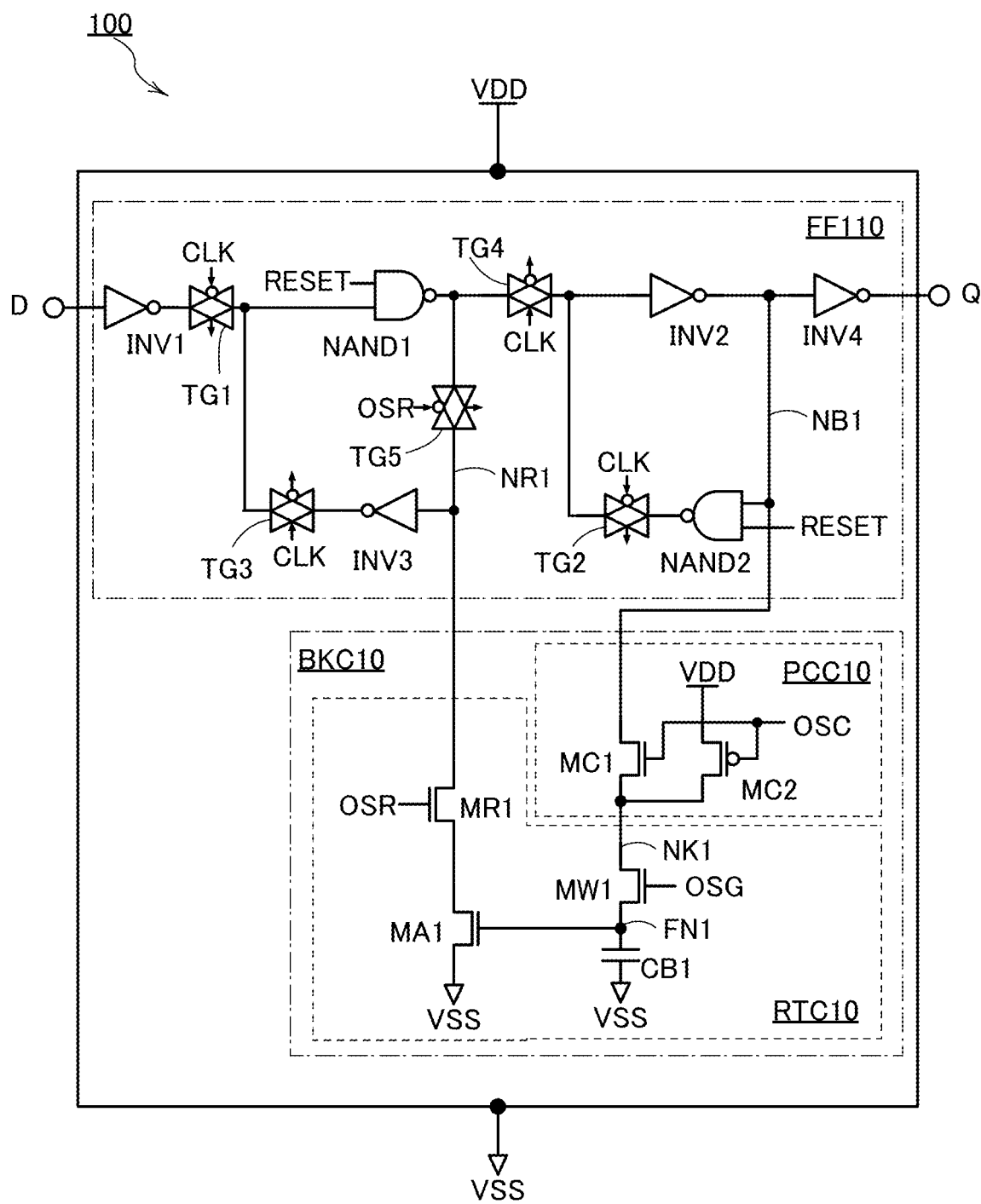
FIG. 10 is a circuit diagram illustrating a structure example of a storage circuit.

A specific structure example of the storage circuit 31 illustrated in FIG. 5B is described. FIG. 10 is a circuit diagram illustrating a storage circuit structure example. A storage circuit 100 illustrated in FIG. 10 functions as a flip-flop circuit.

A standard flip-flop circuit (FF) can be used as the circuit MemC1, and for example, a master slave FF can be used. Such a structure example is illustrated in FIG. 10. An FF 110 includes transmission gates (TG1, TG2, TG3, TG4, and TG5), inverter circuits (INV1, INV2, INV3, and INV4), and NAND circuits (NAND1 and NAND2). A signal RESET and a signal OSR are control signals output from the PMU 60. The signal OSR and an inverted signal thereof are input to TG5. A clock signal CLK and an inverted signal thereof are input to TG1 to TG4. One clocked inverter circuit may be provided instead of TG1 and INV1. One clocked NAND circuit may be provided instead of TG2 and NAND2. A clocked inverter circuit may be provided instead of TG3 and INV3. TG5 functions as a switch that controls conduction between an output node of NAND1 and a node NR1. A node NB1 is electrically connected to an input node of a circuit BKC10, and the node NR1 is electrically connected to an output node of the circuit BKC10.

The circuit BKC10 illustrated in FIG. 10 functions as a backup circuit of the FF 110. The circuit BKC10 includes a circuit RTC10 and a circuit PCC10. Signals (OSG, OSC, and OSR) input to the circuit BKC10 are control signals output from the PMU 60. A power supply potential VSS is a low power supply potential and, for example, may be a ground potential (GND) or 0 V. As in the circuit BKC1, the power supply potential VSS and the power supply potential VDD are input to the FF 110. In the storage circuit 100, supply of VDD is controlled by the PMU 60.

The circuit RTC10 includes the transistor MW1, a transistor MA1, a transistor MR1, the node FN1, and a node NK1. The circuit RTC10 has a function of retaining data, and here, includes a 3T gain-cell storage circuit. The transistor MW1 is an OS transistor serving as a write transistor. The transistor MR1 is a read transistor, and the transistor MA1 functions as an amplifier transistor and a read transistor. The node FN1 retains data. The node NK1 is a data input node. The node NR1 is a data output node of the circuit RTC10.

FIG. 10 illustrates a structure example in which the circuit BKC10 reads out data of a slave latch circuit in the FF 110 in a saving operation and restores the retained data to a master latch circuit in a restoration operation. Data to be saved may be data of the master latch circuit. In addition, data may be restored to the slave latch circuit. In that case, TG5 is provided in the slave latch circuit.

The transistor MR1 and the transistor MA1 in the circuit RTC10 may be either n-channel transistors or p-channel transistors, and the levels of the potential of the signal OSR and a power supply potential supplied to the transistor MA1 may be changed depending on the conductivity types of the transistor MR1 and the transistor MA1. In addition, a logic circuit of the FF 110 may be set as appropriate. For example, in the case where the transistor MR1 and the transistor MA1 are p-channel transistors, NAND1 and INV3 are replaced with each other in the master latch circuit and INV2 and NAND2 are replaced with each other in the slave latch circuit. Furthermore, VDD is input to the transistor MA1 instead of VSS.

Data is written with voltage in the circuit BKC10; thus, the write power of the circuit BKC10 can be lower than that of an MRAM in which writing is performed with current. Furthermore, unlike in a flash memory, the number of data rewriting times is not limited because data is retained by the load capacitance of the node FN1.

In the circuit RTC10, energy required for data writing corresponds to energy required for charging and discharging of charge in the capacitor CB1. By contrast, in a storage circuit including a two-terminal memory element such as an MRAM, energy required for data writing corresponds to energy consumed when current flows to the memory element. Thus, as compared with an MRAM or the like in which current continuously flows during a data writing period, the circuit BKC10 can reduce energy consumed by data saving. Accordingly, as compared with the case of providing an MRAM, BET (break even time) can be shortened in the case of providing the circuit BKC10 as a backup circuit. Consequently, opportunities of performing power gating by which energy consumption can be reduced are increased, so that the power consumption of the semiconductor device can be reduced.

The circuit PCC10 includes a transistor MC1 and a transistor MC2. The circuit PCC10 has a function of precharging the node FN1. The circuit PCC10 is not necessarily provided. As described later, the data saving time of the circuit BKC10 can be shortened by provision of the circuit PCC10.

<Operation Example of Storage Circuit>

Figure 11:
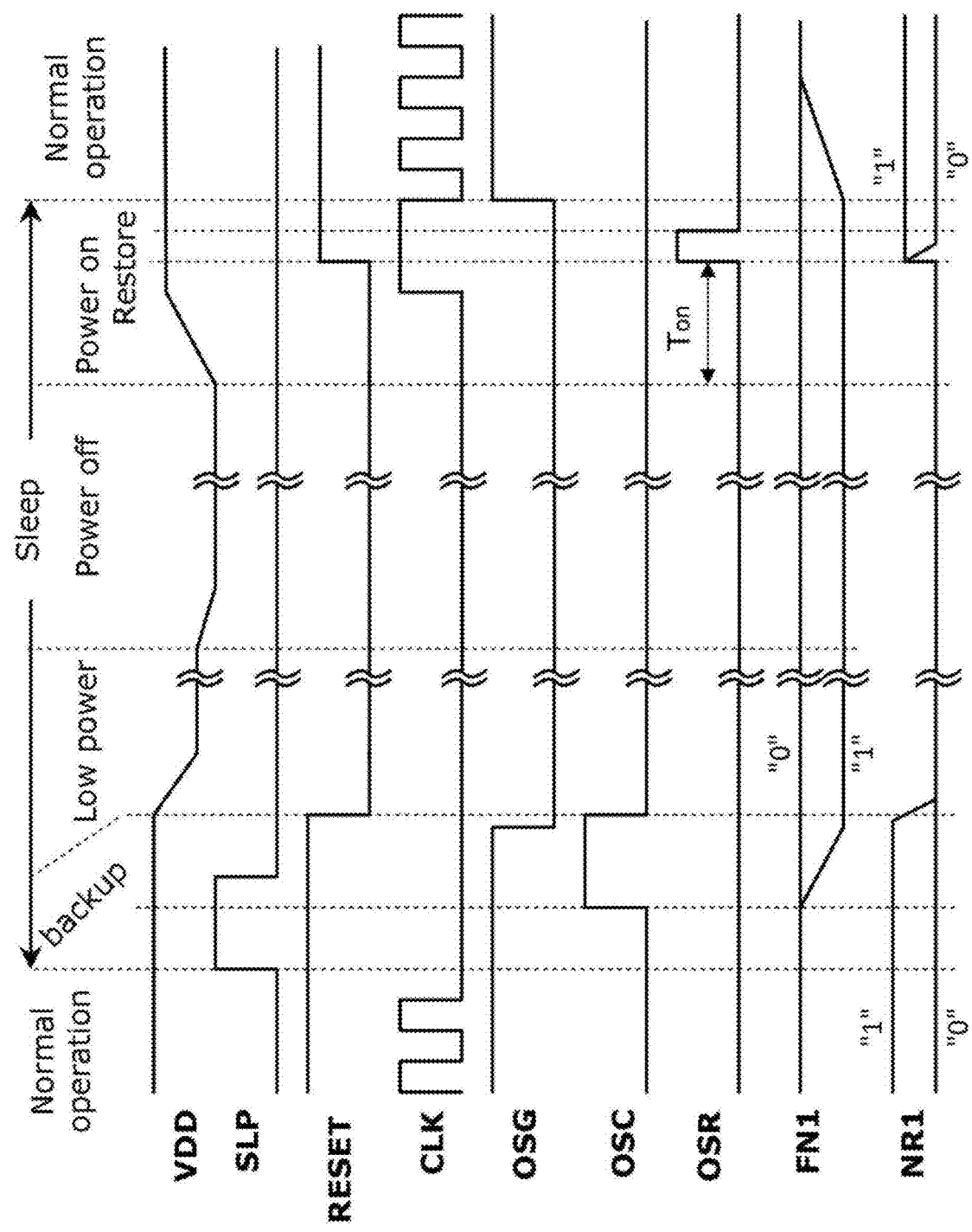
FIG. 11 is a timing chart showing an operation example of a storage circuit.

FIG. 11 is a timing chart showing an operation example of the storage circuit 100, and shows changes in waveforms of control signals (the signal SLP, the signal RESET, the clock signal CLK, the signal OSG, the signal OSR, and the signal OSC) and changes in the potentials of the power supply potential VDD, the node FN1, and the node NR1.

[Normal Operation]

A period of "normal operation" is described. The power supply potential VDD and the clock signal CLK are supplied to the storage circuit 100. The FF 110 functions as a sequential circuit. The signal RESET is kept at a high level; thus, NAND1 and NAND2 function as inverter circuits. In the circuit BKC1, the transistor MC1 is in an off state and the transistor MC2 and the transistor MW1 are in an on state, so that the potential of the node FN1 is precharged to a high level.

[Data Saving]

Next, a period of "backup" is described. First, supply of the clock signal CLK is stopped. Thus, data rewriting of the node NB1 is stopped. In the example of FIG. 11, the potential level of the node NB1 is at a low level ("0") when the potential of the node NR1 is at a high level ("1"), and the potential level of the node NB1 is at a high level ("1") when the potential of the node NR1 is at a low level ("0"). While the signal OSC is at a high level, data of the node NB1 is saved to the node FN1. Specifically, since the transistor MC1 and the transistor MW1 are in an on state, the node FN1 is electrically connected to the node NB1. When the signal OSG is set at a low level to turn off the transistor MW1, the node FN1 is brought into an electrically floating state and the circuit BKC10 retains data. The potential of the node FN1 is at a high level when the node NR1 is at a low level ("0"), and the potential of the node FN1 is at a low level when the node NR1 is at a high level ("1").

Data saving is terminated by setting the signal OSG at a low level; thus, a voltage scaling operation of the PU 20 can be performed immediately after the signal OSG is set at a low level. In addition, since the node FN1 is precharged to a high level by the transistor MC2 in the normal operation, charge transfer of the node FN1 is not needed in a data saving operation in which the node FN1 is set at a high level. Thus, the circuit BKC10 can complete a saving operation in a short time.

In the data saving operation, the clock signal CLK is inactive. Although the potential of the clock signal CLK is at a low level in the example of FIG. 11, the potential of the clock signal CLK may be at a high level.

[Voltage Scaling in Low-Power Mode]

Next, a period of "low power" is described. The PMU 60 performs a voltage scaling operation along with the signal OSC falling. Thus, the storage circuit 100 is transferred to the low-power mode.

[Power Gating in Power-Off Mode]

Next, a period of "power off" is described. After a certain period of time from transition to the low-power mode, the PMU 60 performs a power gating operation and the storage circuit 100 is transferred to the power-off mode.

[Power-On Mode]

Next, a period of "power on" is described. The PMU 60 returns the storage circuit 100 to the power-on mode in response to an interrupt request. In the example of FIG. 11, when the potential of a power supply line for supplying VDD is stabilized, the clock signal CLK is set at a high level.

[Data Restoration]

While the signal OSR is at a high level, a data restoration operation is performed. When the signal RESET is set at a high level, the potential of the node NR1 is precharged to a high level ("1"). When the signal OSR is set at a high level, TG5 has high impedance and the transistor MR1 is turned on. The conduction state of the transistor MA1 is determined by the potential of the node FN1. When the node FN1 is at a high level, the transistor MA1 is in a conduction state; thus, the potential of the node NR1 is decreased to a low level ("0"). When the node FN1 is at a low level, the potential of the node NR1 is kept at a high level. In other words, the FF 110 returns to the state before transition to the resting state.

As described above, rising of the signal RESET and the signal OSR enables high-level data to be restored to the node NR1. Thus, the returning operation period of the storage circuit 100 can be shortened.

FIG. 11 shows an example in which the mode is transferred from the power-off mode to the power-on mode. In the case where the mode is transferred from the low-power mode to the power-on mode, a period $T_{on}$ to stabilization of the potential of the power supply line for supplying VDD is shortened. In that case, rising of the signal OSR is preferably made faster than that when the mode is transferred from the power-off mode. The periods of "backup", "Low power", "Power off", and "Power on" may be referred to as a period of "Sleep".

[Normal Operation]

Next, a period of "normal operation" is described. By restarting the supply of the clock signal CLK, the storage circuit 100 returns to a state in which a normal operation can be performed. When the signal OSG is set at a high level, the node FN1 is precharged to a high level by the circuit PCC10.

<<Cache>>

An example in which the cache 40 is formed using an SRAM is described below.

<Memory Cell Structure Example>

Figure 12:
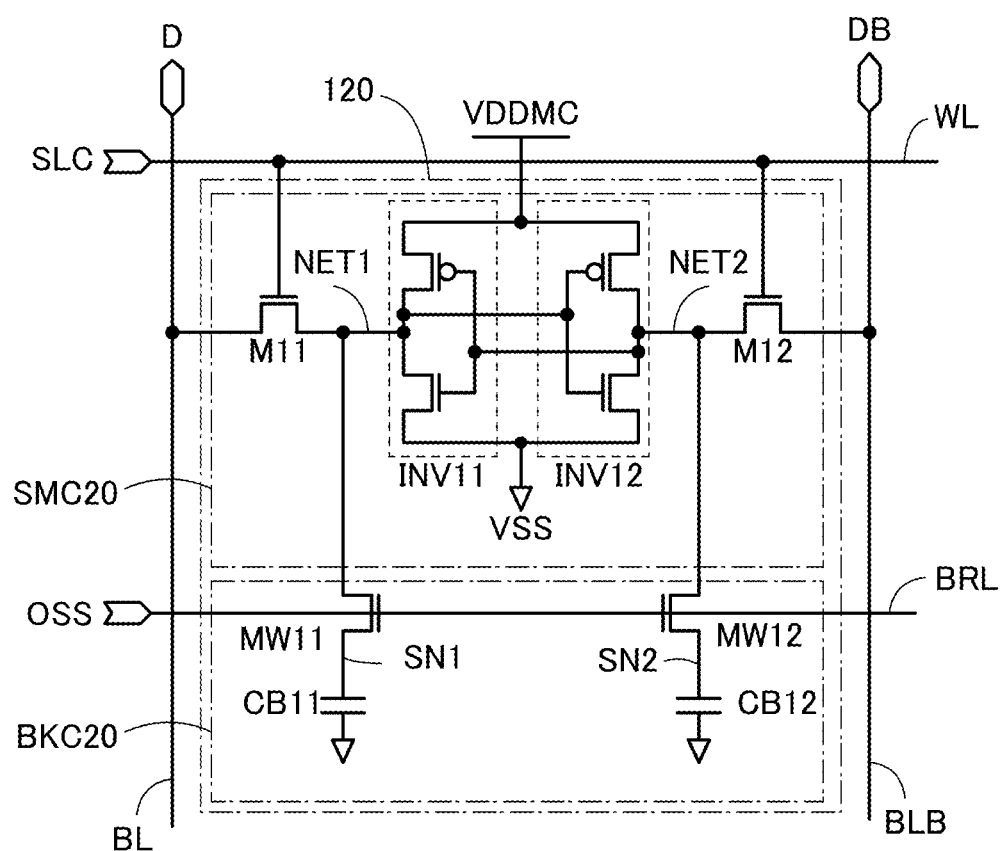
FIG. 12 is a circuit diagram showing a structure example of a cache memory cell.

FIG. 12 illustrates a cache memory cell structure example. A memory cell 120 illustrated in FIG. 12 includes a circuit SMC20 and a circuit BKC20. The circuit SMC20 has a circuit structure similar to that of a standard SRAM memory cell. The circuit SMC20 illustrated in FIG. 12 includes an inverter circuit INV11, an inverter circuit INV12, a transistor M11, and a transistor M12.

The circuit BKC20 functions as a backup circuit of the circuit SMC20. The circuit BKC20 includes a transistor MW11, a transistor MW12, a capacitor CB11, and a capacitor CB12. The transistors MW11 and MW12 are OS transistors. The circuit SMC20 includes two 1T1C retention circuits, and a node SN1 and a node SN2 each retain data. A retention circuit formed using the transistor MW11 and the capacitor CB11 has a function of backing up data of a node NET1. A retention circuit formed using the transistor MW12 and the capacitor CB12 has a function of backing up data of a node NET2.

Power supply potentials VDDMC and VSS are supplied to the memory cell 120. The memory cell 120 is electrically connected to wirings (WL, BL, BLB, and BRL). A signal SLC is input to the wiring WL. A data signal D and a data signal DB are input to the wiring BL and the wiring BLB at the time of data writing. Data is read out by detection of the potentials of the wiring BL and the wiring BLB. A signal OSS is input to the wiring BRL. The signal OSS is input from the PMU 60.

<Operation Example of Memory Cell>

Figure 13:
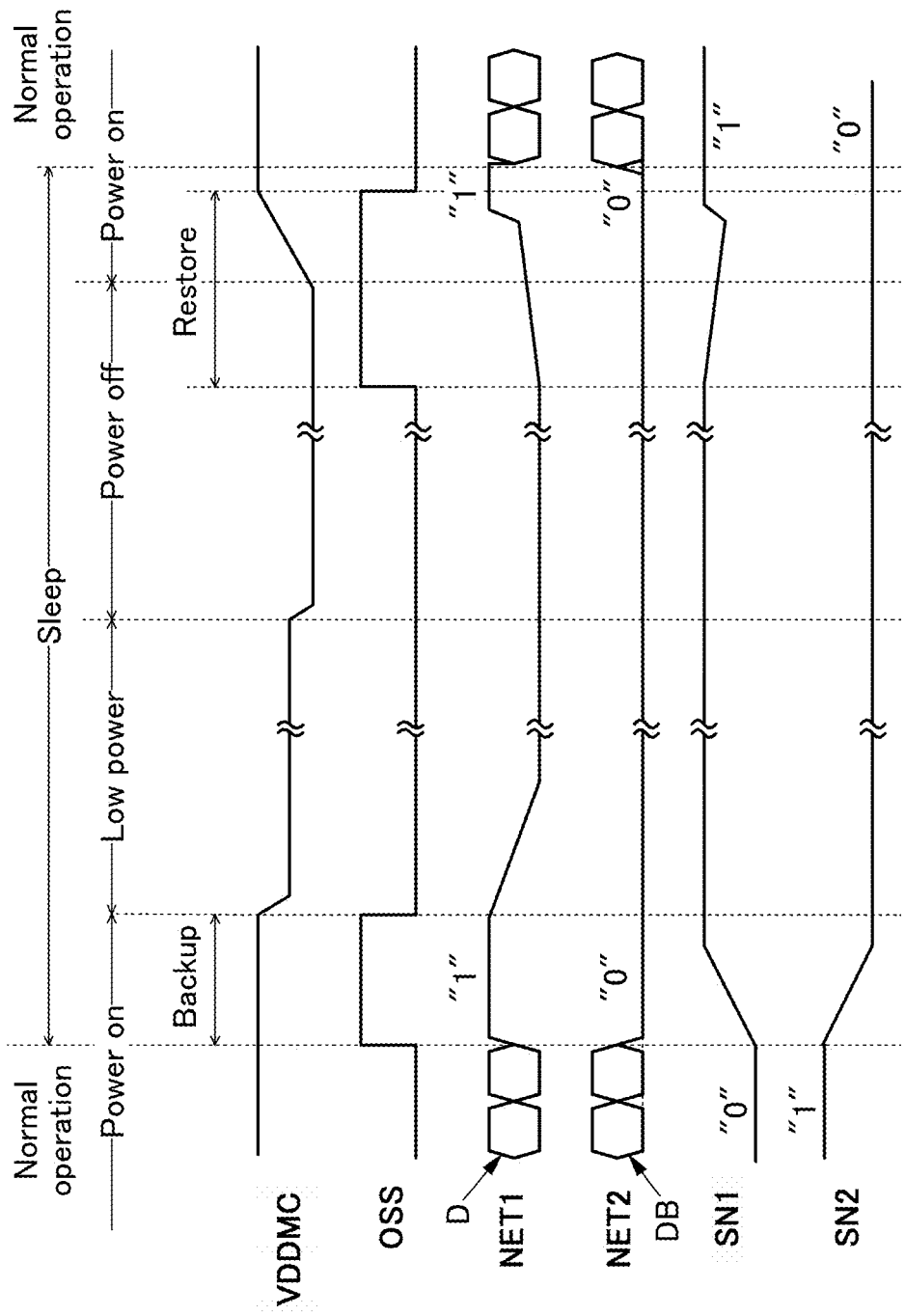
FIG. 13 is a timing chart showing an operation example of a memory cell.

An operation example of the memory cell 120 is described. FIG. 13 is an example of a timing chart for the memory cell 120.

[Normal Operation]

An access request is input to the circuit SMC20, and data is written and read out. In the circuit BKC20, the signal OSS is at a low level; thus, the node SN1 and the node SN2 are electrically floating and data is retained. In the example of FIG. 13, the potential of the node SN1 is at a low level ("0") and the potential of the node SN2, which is the other node, is at a high level ("1").

[Data Saving]

When the signal OSS is set at a high level, the transistors MW11 and MW12 are turned on and the nodes SN1 and SN2 have the same potential levels as the nodes NET1 and NET2. In the example of FIG. 13, the potentials of the nodes SN1 and SN2 are set at a high level and a low level, respectively. The signal OSS is set at a low level and the circuit BKC20 retains data, so that a data saving operation is terminated.

[Voltage Scaling in Low-Power Mode]

The PMU 60 performs a voltage scaling operation along with the signal OSS falling. Thus, the cache 40 is transferred to the low-power mode.

[Power Gating in Power-Off Mode]

After a certain period of time from transition to the low-power mode, the PMU 60 performs a power gating operation and the cache 40 is transferred to the power-off mode.

[Data Restoration in Power-On Mode]

The PMU 60 returns the cache 40 to a normal state in response to an interrupt request. The signal OSS is set at a high level to restore data retained in the circuit BKC20 to the circuit SMC20. While the signal OSS is at a high level, the PMU 60 performs a voltage scaling operation and a power gating operation and returns the storage circuit 100 to the power-on mode. In the example of FIG. 13, when the potential of the power supply line for supplying VDD is stabilized, the clock signal CLK is set at a high level. When the potential of a power supply line for supplying VDDMC is stabilized, the signal OSS is set at a low level to terminate a data restoration operation. The nodes SN1 and SN2 return to the states immediately before the resting states.

[Normal Operation]

When the supply of VDDMC is restarted, the circuit SMC20 returns to a normal mode in which a normal operation can be performed.

As described above, with the use of an OS transistor, a backup circuit capable of retaining data for a long time even when power supply is stopped can be formed. This backup circuit enables power gating of a processor core and a cache. In addition, when power management in which voltage scaling is combined with power gating is performed in a resting state, energy and time overheads due to the return from the resting state to a normal state can be reduced. Thus, power can be reduced efficiently without a decrease in the processing performance of a processing unit.

<Example of Memory>

A memory using the OS transistor of one embodiment of the present invention is described below.

A power storage device included in one embodiment of the present invention preferably includes a memory. As the memory, a memory device using an OS transistor can be used. For example, a NOSRAM (registered trademark) or a DOSRAM (registered trademark) which are described below can be used.

A NOSRAM is a gain cell DRAM in which a write transistor of a memory cell is an OS transistor. A NOSRAM is an abbreviation for Nonvolatile Oxide Semiconductor RAM. A structure example of a NOSRAM is described below.

Figure 14A:
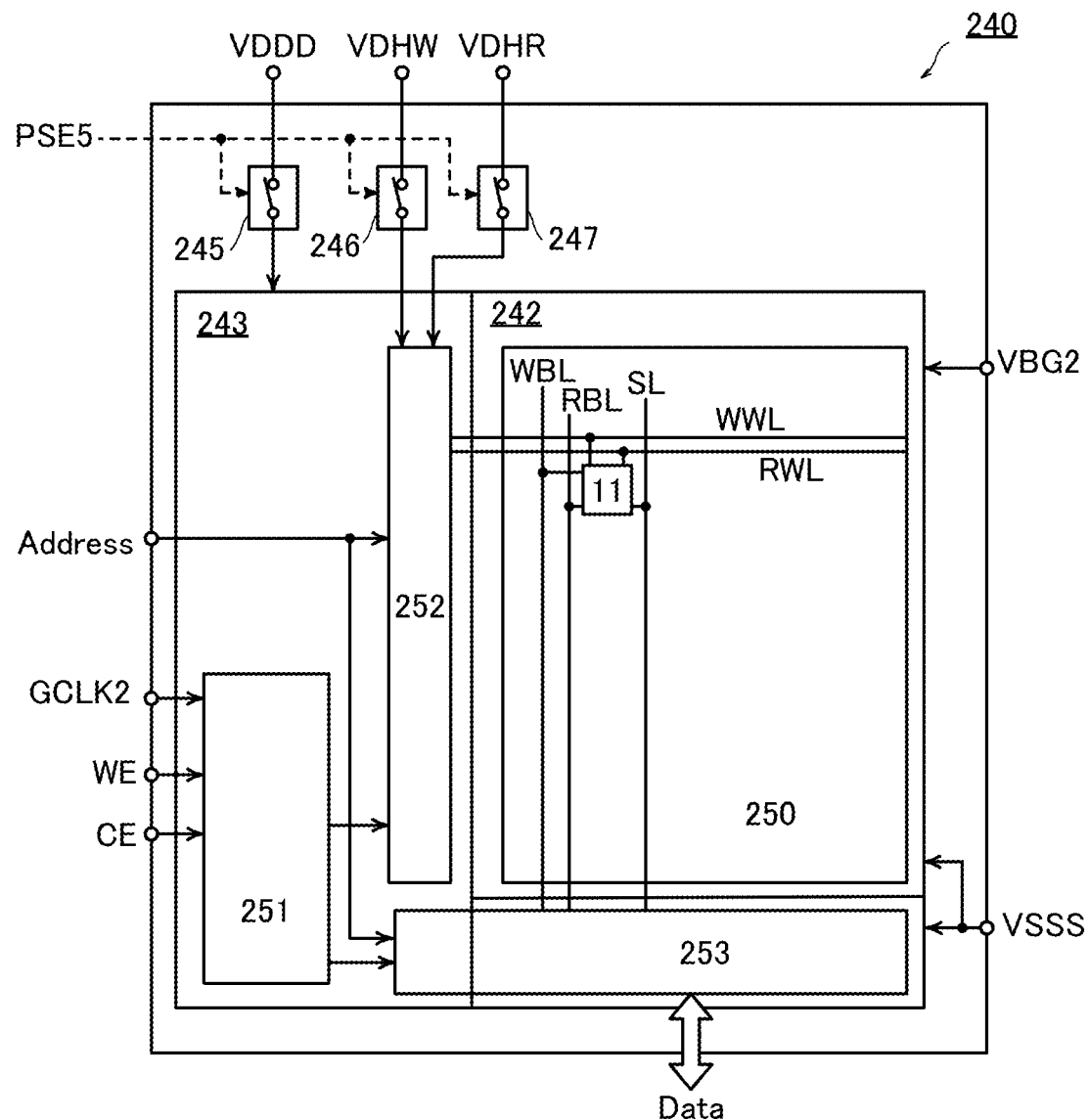
FIG. 14A is a functional block diagram showing a structure example of a NOSRAM.

FIG. 14A is a block diagram illustrating a structure example of a NOSRAM. In a NOSRAM 240, power domains 242 and 243 and power switches 245 to 247 are provided. A memory cell array 250 is provided in the power domain 242, and a peripheral circuit of the NOSRAM 240 is provided in the power domain 243. The peripheral circuit includes a control circuit 251, a row circuit 252, and a column circuit 253.

A voltage VDDD, a voltage VSSS, a voltage VDHW, a voltage VDHR, a voltage VBG2, a clock signal GCLK2, an address signal, a signal CE, a signal WE, and a signal PSES are input to the NOSRAM 240 from the outside. The signal CE and the signal WE are a chip enable signal and a write enable signal. The signal PSES controls the on/off of the power switches 245 to 247. The power switches 245 to 247 control the input of the voltage VDDD, the voltage VDHW, and the voltage VDHR, respectively, to the power domain 243.

Note that the voltages, signals, and the like input to the NOSRAM 240 are appropriately selected in accordance with the circuit structure and operation method of the NOSRAM 240. For example, the NOSRAM 240 may be provided with a power domain which is not power gated, and a power gating control circuit that generates the signal PSES may be provided.

The memory cell array 250 includes a memory cell 11, a write word line WWL, a readout word line RWL, a write bit line WBL, a readout bit line RBL, and a source line SL.

Figure 14B:
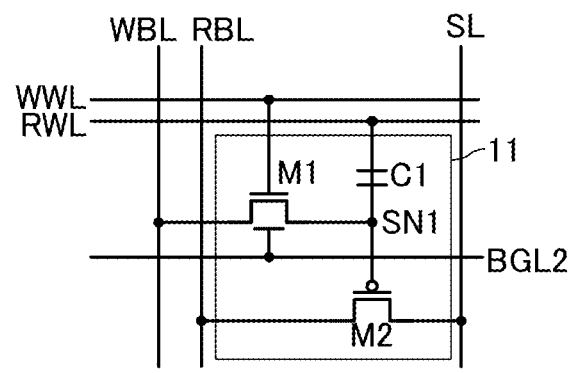
FIG. 14B is a circuit diagram illustrating a structure example of a memory cell.

As illustrated in FIG. 14B, the memory cell 11 is a 2T1C (two transistors and one capacitor) gain cell, which includes a node SN1, transistors M1 and M2, and a capacitor C1. The transistor M1 is a write transistor, which is an OS transistor having a back gate. The back gate of the transistor M1 is electrically connected to a wiring BGL2 for supplying the voltage VBG2. The transistor M2 is a readout transistor, which is a p-channel Si transistor. The capacitor C1 is a storage capacitor for retaining the voltage of the node SN1.

The voltages VDDD and VSSS are voltages representing data "1" and "0". Note that high-level voltages of the write word line WWL and the readout word line RWL are the voltage VDHW and the voltage VDHR.

Figure 15A:
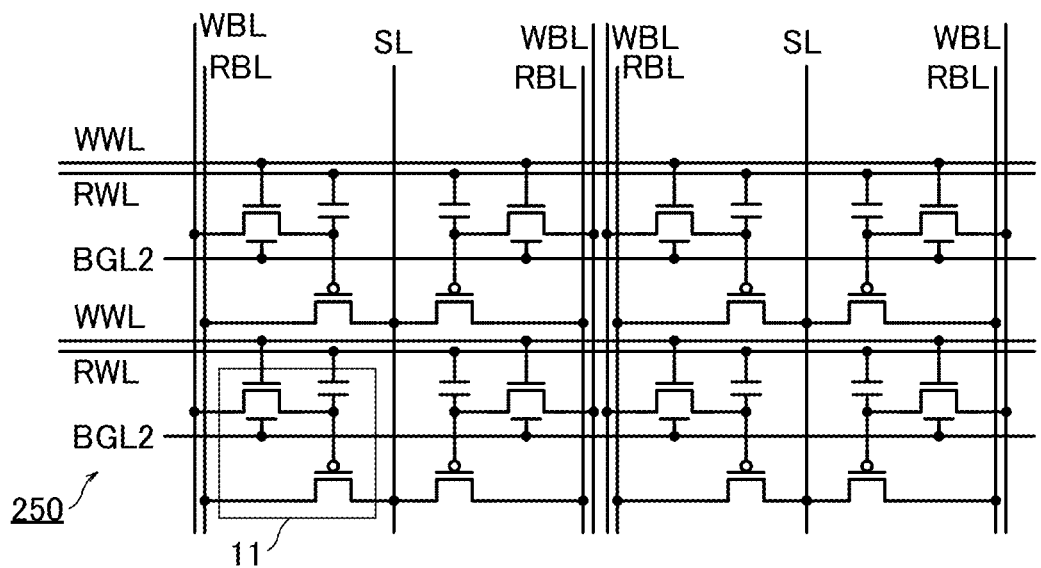
FIG. 15A is a circuit diagram illustrating a structure example of a memory cell array.

FIG. 15A shows a structure example of the memory cell array 250. In the memory cell array 250 shown in FIG. 15, one source line is supplied to the adjacent two rows.

The memory cell 11 does not have a limitation on the number of rewriting times in principle, can perform data rewriting with low energy, and does not consume power in retaining data. Since the transistor M1 is an OS transistor with an extremely low off-state current, the memory cell 11 can retain data for a long time. Thus, when a cache is formed using the NOSRAM 240, the low-power-consumption nonvolatile cache can be obtained.

Figure 15B:
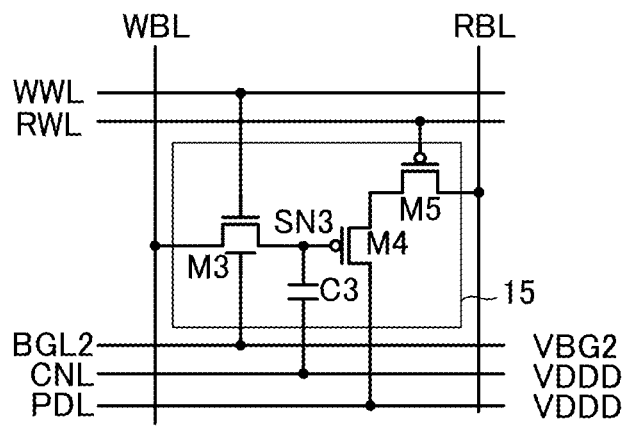
FIG. 15B and FIG. 15C are circuit diagrams illustrating structure examples of memory cells.
Figure 15C:
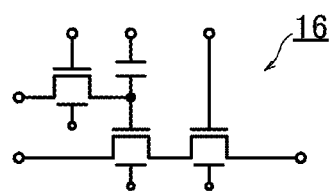

The circuit structure of the memory cell 11 is not limited to the circuit structure in FIG. 14B. For example, the readout transistor M2 may be an OS transistor having a back gate or an n-channel Si transistor. Alternatively, the memory cell 11 may be a 3T gain cell. For example, FIG. 15B and FIG. 15C show examples of a 3T gain cell. A memory cell 15 shown in FIG. 15B includes transistors M3 to M5, a capacitor C3, and a node SN3. The transistors M3 to M5 are a write transistor, a readout transistor, and a selection transistor. The transistor M3 is an OS transistor having a back gate, and the transistors M4 and M5 are p-channel Si transistors. The transistors M4 and M5 may each be an n-channel Si transistor or an OS transistor having a back gate. In a memory cell 16 shown in FIG. 15C, three transistors are OS transistors each having a back gate.

The node SN3 is a retention node. The capacitor C3 is a storage capacitor for retaining the voltage of the node SN3. The capacitor C3 may be omitted intentionally, and the storage capacitor may be formed using gate capacitance of the transistor M4, or the like. A fixed voltage (e.g., VDDD) is input to a wiring PDL. The wiring PDL is an alternative to the source line SL, and for example, the voltage VDDD is input.

The control circuit 251 has a function of controlling the entire operation of the NOSRAM 240. For example, the control circuit 251 performs a logical operation of the signal CE and the signal WE to determine whether access from the outside is write access or readout access.

The row circuit 252 has a function of selecting the write word line WWL and the readout word line in the row selected and specified by the address signal. The column circuit 253 has a function of writing data to the write bit line in the column specified by the address signal and a function of reading out data from the write bit line WBL in the column.

A DOSRAM refers to a RAM including a 1T1C memory cell and is an abbreviation for Dynamic Oxide Semiconductor RAM. A DOSRAM is described below with reference to FIG. 16.

Figure 16A:
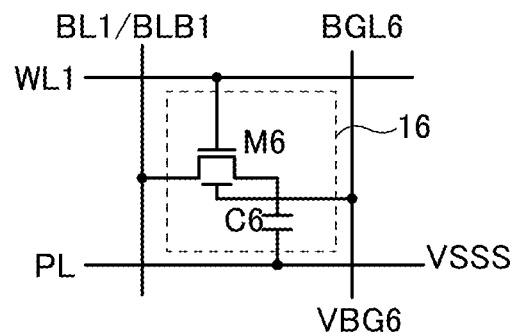
FIG. 16A is a circuit diagram illustrating a structure example of a memory cell of a DOSRAM.

As illustrated in FIG. 16A, the memory cell 16 of a DOSRAM 351 is electrically connected to a bit line BL1 (or BLB1), a word line WL1, a wiring BGL6, and a wiring PL. The bit line BLB1 is an inverted bit line. For example, a voltage VBG6 and a voltage VSSS are input to the wiring BGL6 and the wiring PL, respectively. The memory cell 16 includes a transistor M6 and a capacitor C6. The transistor M6 is an OS transistor having a back gate.

There is no limitation on the number of rewriting operations of the DOSRAM 351 in principle because data is rewritten by charging and discharging of the capacitor C6; and data can be written and read out with low energy. In addition, the memory cell 16 has a simple circuit structure, and thus the capacity can be easily increased. Since the write transistor of the memory cell 16 is an OS transistor, the retention time of the DOSRAM 351 is significantly longer than that of a DRAM. This allows less frequent refresh or makes refresh operations unnecessary; thus, the power needed for refresh operations can be reduced.

Figure 16B:
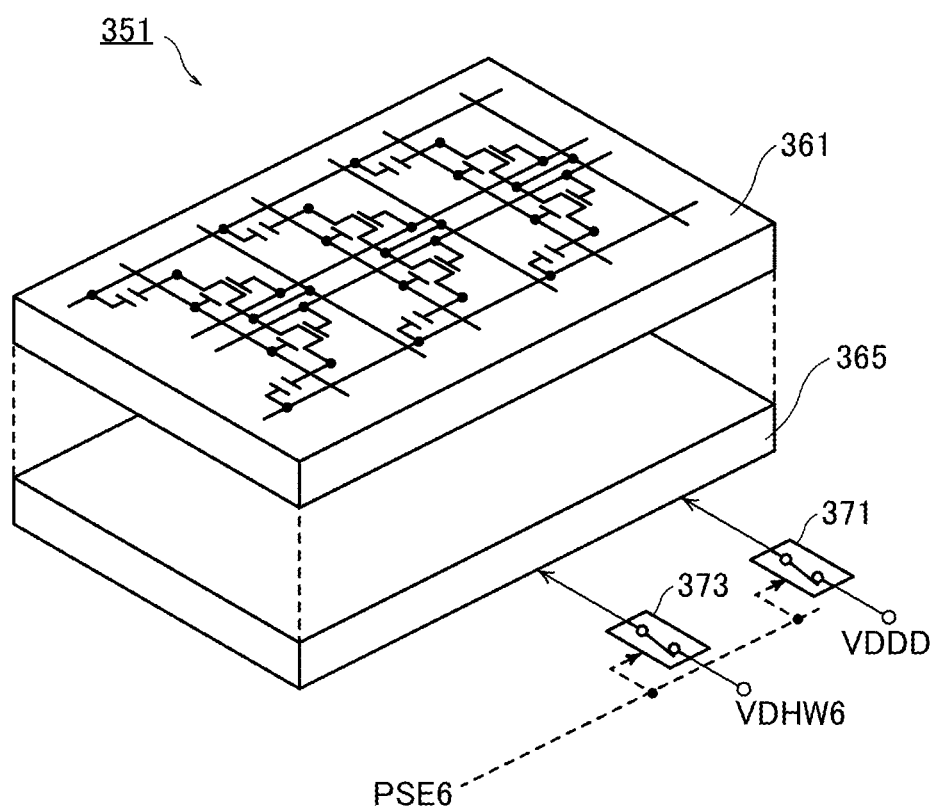
FIG. 16B is a diagram illustrating an example of a stacked-layer structure of a DOSRAM.

As illustrated in FIG. 16B, in the DOSRAM 351, a memory cell array 361 can be stacked over a peripheral circuit 365. This is because the transistor M6 of the memory cell 16 is an OS transistor.

In the memory cell array 361, a plurality of memory cells 16 are arranged in a matrix, and the bit lines BL1 and BLB1, the word line WL1, and the wirings BGL6 and PL are provided according to the arrangement of the memory cells 16. A control circuit, a row circuit, and a column circuit are provided in the peripheral circuit 365. The row circuit selects the word line WL1 that is to be accessed, for example. The column circuit performs writing and reading out of data to and from a bit line pair formed of BL1 and BLB1, for example.

Power switches 371 and 373 are provided in order to power gate the peripheral circuit 365. The power switches 371 and 373 control the input of voltages VDDD and VDHW6, respectively, to the peripheral circuit 365. Note that the voltage VDHW6 is a high-level voltage for the word line WL1. On/off of the power switches 371 and 373 is controlled with a signal PSE6.

The composition, structure, method, and the like described in this embodiment can be used in combination as appropriate with the compositions, structures, methods, and the like described in the other embodiments, Example, and the like.

Embodiment 2

In this embodiment, structures of transistors that can be used in the semiconductor device described in the above embodiment are described. As an example, a structure in which transistors having different electrical characteristics are stacked is described. With the structure, the degree of freedom in design of the semiconductor device can be increased. Stacking transistors having different electrical characteristics can increase the degree of integration of the semiconductor device.

Figure 17:
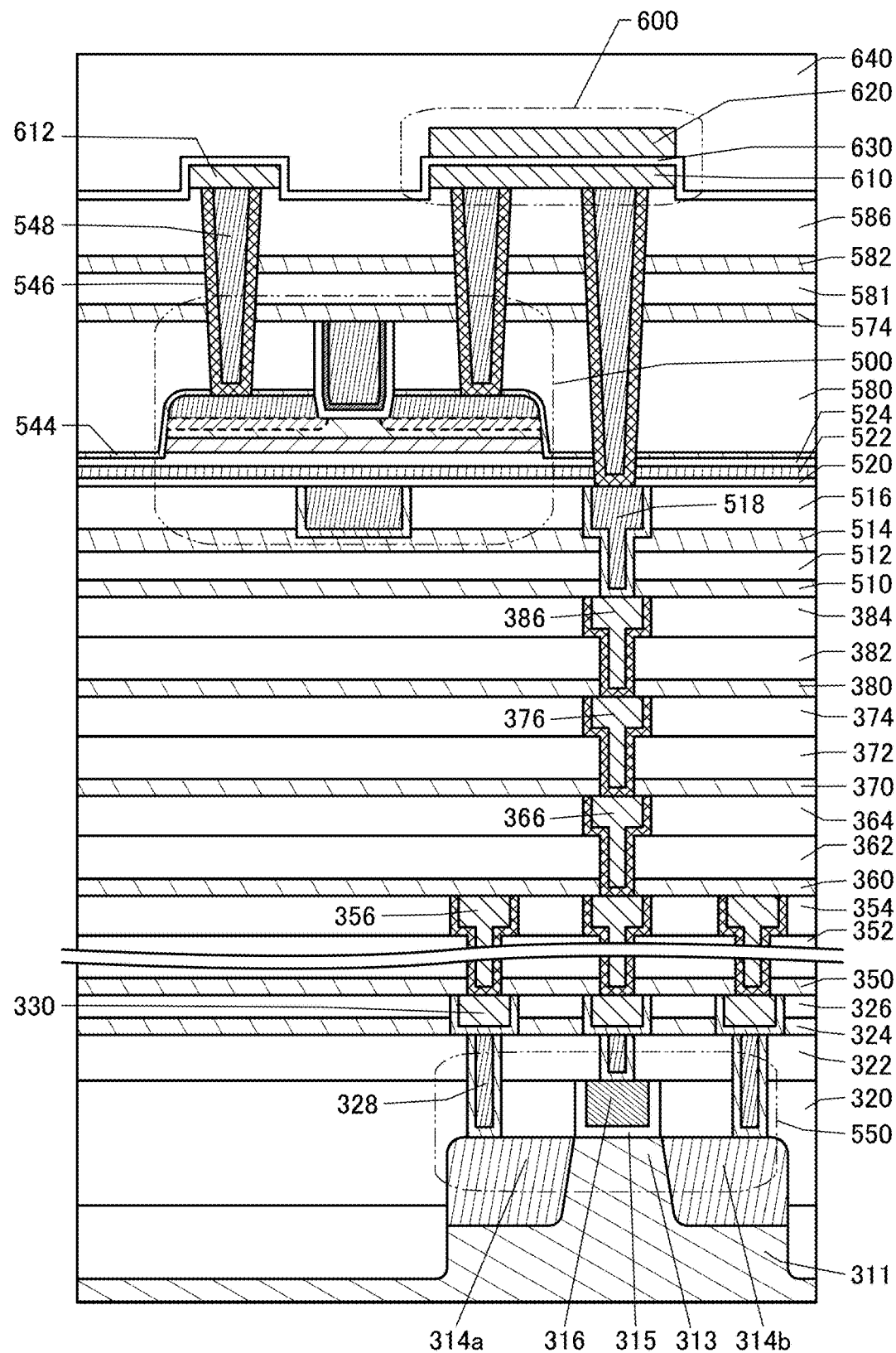
FIG. 17 is a diagram illustrating a structure example of a semiconductor device.
Figure 19A:
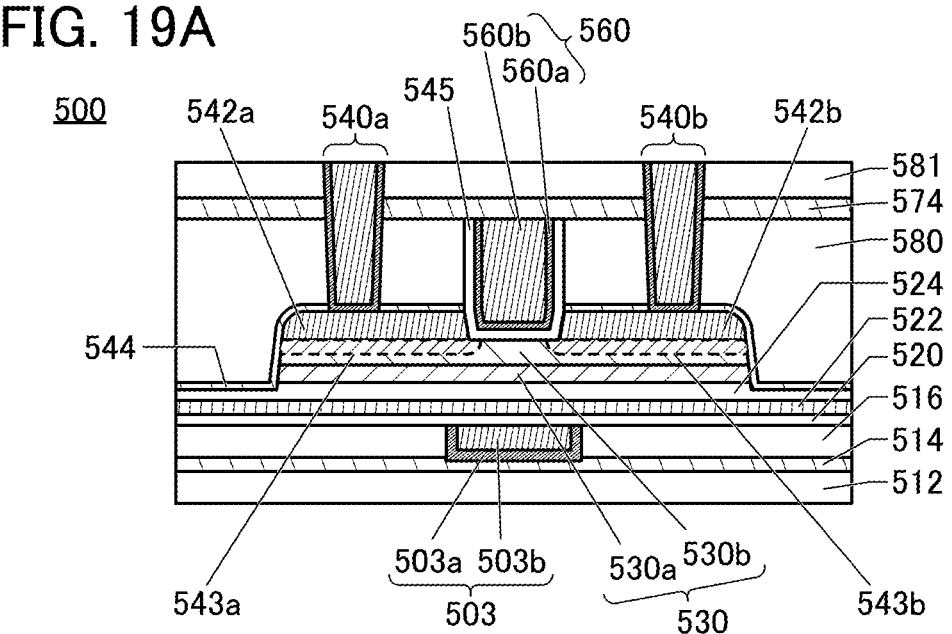
FIG. 19A to FIG. 19C are diagrams illustrating transistor structure examples.
Figure 19B:
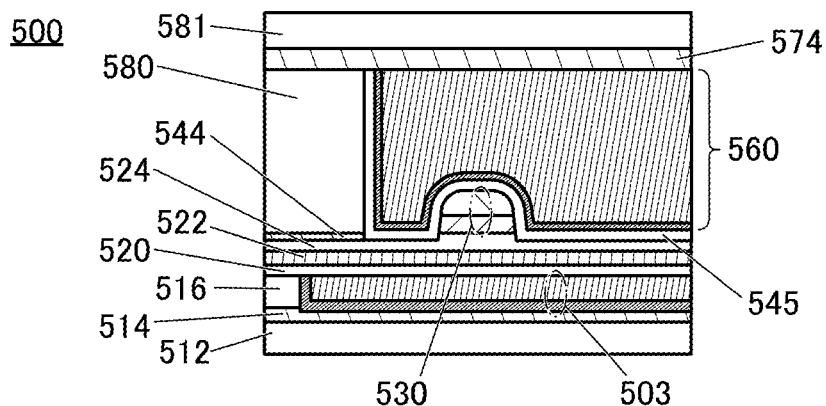
Figure 19C:
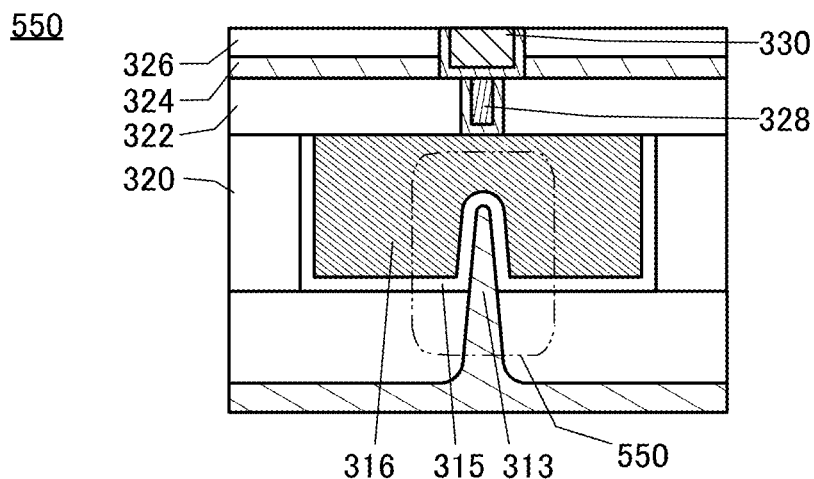

FIG. 17 illustrates part of a cross-sectional structure of a semiconductor device. The semiconductor device illustrated in FIG. 17 includes a transistor 550, a transistor 500, and a capacitor 600. FIG. 19A is a cross-sectional view of the transistor 500 in the channel length direction, FIG. 19B is a cross-sectional view of the transistor 500 in the channel width direction, and FIG. 19C is a cross-sectional view of the transistor 550 in the channel width direction.

The transistor 500 is an OS transistor. The transistor 500 has an extremely low off-state current. Accordingly, data voltage or charge written to a storage node through the transistor 500 can be retained for a long time. In other words, power consumption of the semiconductor device can be reduced because a storage node has a low frequency of refresh operation or requires no refresh operation.

In FIG. 17, the transistor 500 is provided above the transistor 550, and the capacitor 600 is provided above the transistor 550 and the transistor 500.

The transistor 550 is provided on a substrate 311 and includes a conductor 316, an insulator 315, a semiconductor region 313 that is part of the substrate 311, and a low-resistance region 314a and a low-resistance region 314b each functioning as a source region or a drain region.

As illustrated in FIG. 19C, in the transistor 550, a top surface and a side surface in the channel width direction of the semiconductor region 313 are covered with the conductor 316 with the insulator 315 therebetween. Such a Fin-type transistor 550 can have an increased effective channel width, and thus have improved on-state characteristics. In addition, since contribution of an electric field of a gate electrode can be increased, the off-state characteristics of the transistor 550 can be improved.

Note that the transistor 550 can be either a p-channel transistor or an n-channel transistor.

A region of the semiconductor region 313 where a channel is formed, a region in the vicinity thereof, the low-resistance region 314a and the low-resistance region 314b each functioning as a source region or a drain region, and the like preferably contain a semiconductor such as a silicon-based semiconductor, and preferably contain single crystal silicon.

Alternatively, the regions may be formed using a material containing Ge (germanium), SiGe (silicon germanium), GaAs (gallium arsenide), GaAlAs (gallium aluminum arsenide), or the like. A structure may be employed in which silicon whose effective mass is controlled by applying stress to the crystal lattice and changing the lattice spacing is used. Alternatively, the transistor 550 may be a HEMT with the use of GaAs and GaAlAs, or the like.

The low-resistance region 314a and the low-resistance region 314b contain an element which imparts n-type conductivity, such as arsenic or phosphorus, or an element which imparts p-type conductivity, such as boron, in addition to the semiconductor material used for the semiconductor region 313.

For the conductor 316 functioning as a gate electrode, a semiconductor material such as silicon containing the element which imparts n-type conductivity, such as arsenic or phosphorus, or the element which imparts p-type conductivity, such as boron, or a conductive material such as a metal material, an alloy material, or a metal oxide material can be used.

Note that since the work function of a conductor depends on the material of the conductor, the threshold voltage of the transistor can be adjusted by selecting the material of the conductor. Specifically, it is preferable to use a material such as titanium nitride or tantalum nitride for the conductor. Moreover, in order to ensure both conductivity and embeddability, it is preferable to use stacked layers of metal materials such as tungsten and aluminum for the conductor, and it is particularly preferable to use tungsten in terms of heat resistance.

The transistor 550 may be formed using an SOI (Silicon on Insulator) substrate, for example.

As the SOI substrate, the following substrate may be used: an SIMOX (Separation by Implanted Oxygen) substrate which is formed in such a manner that after an oxygen ion is implanted into a mirror-polished wafer, an oxide layer is formed at a certain depth from the surface and defects generated in a surface layer are eliminated by high-temperature annealing, or an SOI substrate formed by using a Smart-Cut method in which a semiconductor substrate is cleaved by utilizing growth of a minute void, which is formed by implantation of a hydrogen ion, by thermal treatment; an ELTRAN method (a registered trademark: Epitaxial Layer Transfer); or the like. A transistor formed using a single crystal substrate contains a single crystal semiconductor in a channel formation region.

Figure 18:
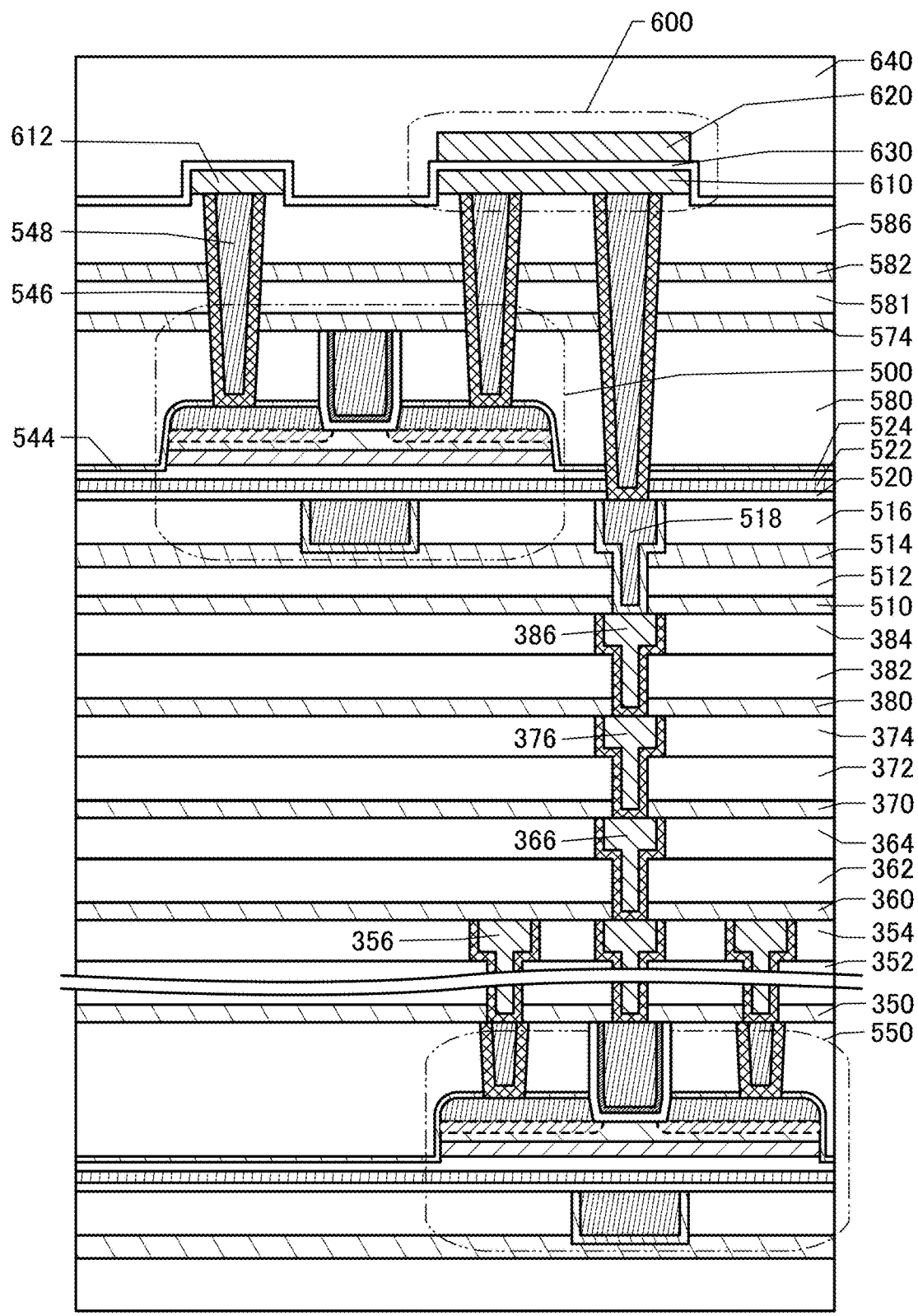
FIG. 18 is a diagram illustrating a structure example of a semiconductor device.

Note that the transistor 550 illustrated in FIG. 17 is an example and the structure is not limited thereto; an appropriate transistor can be used in accordance with a circuit structure or a driving method. For example, when the semiconductor device is a single-polarity circuit using only OS transistors (which represent transistors having the same polarity, e.g., only n-channel transistors), the transistor 550 has a structure similar to that of the transistor 500 as illustrated in FIG. 18. Note that the details of the transistor 500 are described later.

An insulator 320, an insulator 322, an insulator 324, and an insulator 326 are stacked sequentially to cover the transistor 550.

For the insulator 320, the insulator 322, the insulator 324, and the insulator 326, silicon oxide, silicon oxynitride, silicon nitride oxide, silicon nitride, aluminum oxide, aluminum oxynitride, aluminum nitride oxide, aluminum nitride, or the like can be used, for example.

Note that in this specification, silicon oxynitride refers to a material that contains oxygen at a higher proportion than nitrogen, and silicon nitride oxide refers to a material that contains nitrogen at a higher proportion than oxygen. Furthermore, in this specification, aluminum oxynitride refers to a material that contains oxygen at a higher proportion than nitrogen, and aluminum nitride oxide refers to a material that contains nitrogen at a higher proportion than oxygen.

The insulator 322 may have a function of a planarization film for eliminating a level difference caused by the transistor 550 or the like provided below the insulator 322. For example, a top surface of the insulator 322 may be planarized by planarization treatment using a chemical mechanical polishing (CMP) method or the like to increase planarity.

In addition, for the insulator 324, it is preferable to use a film having a barrier property that prevents diffusion of hydrogen or impurities from the substrate 311, the transistor 550, or the like into a region where the transistor 500 is provided.

For the film having a barrier property against hydrogen, silicon nitride formed by a CVD method can be used, for example. Here, diffusion of hydrogen into a semiconductor element including an oxide semiconductor, such as the transistor 500, degrades the characteristics of the semiconductor element in some cases. Therefore, a film that inhibits hydrogen diffusion is preferably provided between the transistor 500 and the transistor 550. The film that inhibits hydrogen diffusion is specifically a film from which a small amount of hydrogen is released.

The amount of released hydrogen can be analyzed by thermal desorption spectroscopy (TDS) or the like, for example. The amount of hydrogen released from the insulator 324 that is converted into hydrogen atoms per unit area of the insulator 324 is less than or equal to $10 \times 10^{15}$ atoms/cm$^2$, preferably less than or equal to $5 \times 10^{15}$ atoms/cm$^2$, in the TDS analysis in a film-surface temperature range of 50° C. to 500° C., for example.

Note that the permittivity of the insulator 326 is preferably lower than that of the insulator 324. For example, the relative permittivity of the insulator 326 is preferably lower than 4, further preferably lower than 3. The relative permittivity of the insulator 326 is, for example, preferably 0.7 times or less, further preferably 0.6 times or less the relative permittivity of the insulator 324. When a material with a low permittivity is used for an interlayer film, parasitic capacitance generated between wirings can be reduced.

In addition, a conductor 328, a conductor 330, and the like that are connected to the capacitor 600 or the transistor 500 are embedded in the insulator 320, the insulator 322, the insulator 324, and the insulator 326. Note that the conductor 328 and the conductor 330 each have a function of a plug or a wiring. Furthermore, a plurality of conductors functioning as plugs or wirings are collectively denoted by the same reference numeral in some cases. Moreover, in this specification and the like, a wiring and a plug connected to the wiring may be a single component. That is, there are cases where part of a conductor functions as a wiring and part of a conductor functions as a plug.

As a material for each of the plugs and wirings (the conductor 328, the conductor 330, and the like), a single layer or a stacked layer of a conductive material such as a metal material, an alloy material, a metal nitride material, or a metal oxide material can be used. It is preferable to use a high-melting-point material that has both heat resistance and conductivity, such as tungsten or molybdenum, and it is preferable to use tungsten. Alternatively, it is preferable to form the plugs and wirings with a low-resistance conductive material such as aluminum or copper. The use of a low-resistance conductive material can reduce wiring resistance.

A wiring layer may be provided over the insulator 326 and the conductor 330. For example, in FIG. 17, an insulator 350, an insulator 352, and an insulator 354 are stacked sequentially. Furthermore, a conductor 356 is formed in the insulator 350, the insulator 352, and the insulator 354. The conductor 356 has a function of a plug or a wiring that is connected to the transistor 550. Note that the conductor 356 can be provided using a material similar to those for the conductor 328 and the conductor 330.

For example, like the insulator 324, the insulator 350 is preferably formed using an insulator having a barrier property against hydrogen. Furthermore, the conductor 356 preferably contains a conductor having a barrier property against hydrogen. In particular, the conductor having a barrier property against hydrogen is formed in an opening portion of the insulator 350 having a barrier property against hydrogen. With this structure, the transistor 550 and the transistor 500 can be separated by a barrier layer, so that diffusion of hydrogen from the transistor 550 into the transistor 500 can be inhibited.

Note that for the conductor having a barrier property against hydrogen, tantalum nitride is preferably used, for example. In addition, by stacking tantalum nitride and tungsten, which has high conductivity, the diffusion of hydrogen from the transistor 550 can be inhibited while the conductivity of a wiring is kept. In that case, a structure in which a tantalum nitride layer having a barrier property against hydrogen is in contact with the insulator 350 having a barrier property against hydrogen is preferable.

A wiring layer may be provided over the insulator 354 and the conductor 356. For example, in FIG. 17, an insulator 360, an insulator 362, and an insulator 364 are stacked sequentially. Furthermore, a conductor 366 is formed in the insulator 360, the insulator 362, and the insulator 364. The conductor 366 has a function of a plug or a wiring. Note that the conductor 366 can be provided using a material similar to those for the conductor 328 and the conductor 330.

For example, like the insulator 324, the insulator 360 is preferably formed using an insulator having a barrier property against hydrogen. Furthermore, the conductor 366 preferably contains a conductor having a barrier property against hydrogen. In particular, the conductor having a barrier property against hydrogen is formed in an opening portion of the insulator 360 having a barrier property against hydrogen. With this structure, the transistor 550 and the transistor 500 can be separated by a barrier layer, so that diffusion of hydrogen from the transistor 550 into the transistor 500 can be inhibited.

A wiring layer may be provided over the insulator 364 and the conductor 366. For example, in FIG. 17, an insulator 370, an insulator 372, and an insulator 374 are stacked sequentially. Furthermore, a conductor 376 is formed in the insulator 370, the insulator 372, and the insulator 374. The conductor 376 has a function of a plug or a wiring. Note that the conductor 376 can be provided using a material similar to those for the conductor 328 and the conductor 330.

For example, like the insulator 324, the insulator 370 is preferably formed using an insulator having a barrier property against hydrogen. Furthermore, the conductor 376 preferably contains a conductor having a barrier property against hydrogen. In particular, the conductor having a barrier property against hydrogen is formed in an opening portion of the insulator 370 having a barrier property against hydrogen. With this structure, the transistor 550 and the transistor 500 can be separated by a barrier layer, so that diffusion of hydrogen from the transistor 550 into the transistor 500 can be inhibited.

A wiring layer may be provided over the insulator 374 and the conductor 376. For example, in FIG. 17, an insulator 380, an insulator 382, and an insulator 384 are stacked sequentially. Furthermore, a conductor 386 is formed in the insulator 380, the insulator 382, and the insulator 384. The conductor 386 has a function of a plug or a wiring. Note that the conductor 386 can be provided using a material similar to those for the conductor 328 and the conductor 330.

For example, like the insulator 324, the insulator 380 is preferably formed using an insulator having a barrier property against hydrogen. Furthermore, the conductor 386 preferably contains a conductor having a barrier property against hydrogen. In particular, the conductor having a barrier property against hydrogen is formed in an opening portion of the insulator 380 having a barrier property against hydrogen. With this structure, the transistor 550 and the transistor 500 can be separated by a barrier layer, so that diffusion of hydrogen from the transistor 550 into the transistor 500 can be inhibited.

Although the wiring layer including the conductor 356, the wiring layer including the conductor 366, the wiring layer including the conductor 376, and the wiring layer including the conductor 386 are described above, the semiconductor device of this embodiment is not limited thereto. Three or less wiring layers that are similar to the wiring layer including the conductor 356 may be provided, or five or more wiring layers that are similar to the wiring layer including the conductor 356 may be provided.

An insulator 510, an insulator 512, an insulator 514, and an insulator 516 are stacked sequentially over the insulator 384. A substance having a barrier property against oxygen or hydrogen is preferably used for any of the insulator 510, the insulator 512, the insulator 514, and the insulator 516.

For example, for the insulator 510 and the insulator 514, it is preferable to use a film having a barrier property against hydrogen or impurities diffused from the substrate 311, a region where the transistor 550 is provided, or the like into the region where the transistor 500 is provided. Thus, a material similar to that for the insulator 324 can be used.

For the film having a barrier property against hydrogen, silicon nitride formed by a CVD method can be used, for example. Here, diffusion of hydrogen into a semiconductor element including an oxide semiconductor, such as the transistor 500, degrades the characteristics of the semiconductor element in some cases. Therefore, a film that inhibits hydrogen diffusion is preferably provided between the transistor 500 and the transistor 550.

In addition, for the film having a barrier property against hydrogen, a metal oxide such as aluminum oxide, hafnium oxide, or tantalum oxide is preferably used for the insulator 510 and the insulator 514, for example.

In particular, aluminum oxide has an excellent blocking effect that prevents the passage of both oxygen and impurities such as hydrogen and moisture which are factors of change in electrical characteristics of the transistor. Accordingly, aluminum oxide can prevent mixing of impurities such as hydrogen and moisture into the transistor 500 in the manufacturing process and after the manufacturing of the transistor. In addition, release of oxygen from the oxide included in the transistor 500 can be inhibited. Therefore, aluminum oxide is suitably used for the protective film of the transistor 500.

In addition, for the insulator 512 and the insulator 516, a material similar to that for the insulator 320 can be used, for example. Furthermore, when a material with a comparatively low permittivity is used for these insulators, parasitic capacitance generated between wirings can be reduced. A silicon oxide film, a silicon oxynitride film, or the like can be used for the insulator 512 and the insulator 516, for example.

Furthermore, a conductor 518, a conductor included in the transistor 500 (e.g., a conductor 503), and the like are embedded in the insulator 510, the insulator 512, the insulator 514, and the insulator 516. Note that the conductor 518 has a function of a plug or a wiring that is connected to the capacitor 600 or the transistor 550. The conductor 518 can be provided using a material similar to those for the conductor 328 and the conductor 330.

In particular, the conductor 518 in a region in contact with the insulator 510 and the insulator 514 is preferably a conductor having a barrier property against oxygen, hydrogen, and water. With this structure, the transistor 550 and the transistor 500 can be separated by a layer having a barrier property against oxygen, hydrogen, and water; thus, diffusion of hydrogen from the transistor 550 into the transistor 500 can be inhibited.

The transistor 500 is provided above the insulator 516.

As illustrated in FIG. 19A and FIG. 19B, the transistor 500 includes the conductor 503 positioned to be embedded in the insulator 514 and the insulator 516; an insulator 520 positioned over the insulator 516 and the conductor 503; an insulator 522 positioned over the insulator 520; an insulator 524 positioned over the insulator 522; an oxide 530a positioned over the insulator 524; an oxide 530b positioned over the oxide 530a; a conductor 542a and a conductor 542b positioned apart from each other over the oxide 530b; an insulator 580 that is positioned over the conductor 542a and the conductor 542b and is provided with an opening formed to overlap with a region between the conductor 542a and the conductor 542b; an insulator 545 positioned on a bottom surface and a side surface of the opening; and a conductor 560 positioned on a formation surface of the insulator 545.

In addition, as illustrated in FIG. 19A and FIG. 19B, an insulator 544 is preferably positioned between the insulator 580 and the oxide 530a, the oxide 530b, the conductor 542a, and the conductor 542b. Furthermore, as illustrated in FIG. 19A and FIG. 19B, the conductor 560 preferably includes a conductor 560a provided inside the insulator 545 and a conductor 560b provided to be embedded inside the conductor 560a. Moreover, as illustrated in FIG. 19A and FIG. 19B, an insulator 574 is preferably positioned over the insulator 580, the conductor 560, and the insulator 545.

Note that in this specification and the like, the oxide 530a and the oxide 530b are sometimes collectively referred to as an oxide 530.

Note that although a structure of the transistor 500 in which two layers of the oxide 530a and the oxide 530b are stacked in a region where a channel is formed and its vicinity is illustrated, the present invention is not limited thereto. For example, it is possible to employ a structure in which a single layer of the oxide 530b or a stacked-layer structure of three or more layers is provided.

Furthermore, although the conductor 560 is illustrated to have a stacked-layer structure of two layers in the transistor 500, the present invention is not limited thereto. For example, the conductor 560 may have a single-layer structure or a stacked-layer structure of three or more layers. Note that the transistors 500 illustrated in FIG. 17, FIG. 18, and FIG. 19A are examples, and the structures are not limited thereto; an appropriate transistor can be used in accordance with a circuit structure, a driving method, or the like.

Here, the conductor 560 functions as a gate electrode of the transistor, and the conductor 542a and the conductor 542b each function as a source electrode or a drain electrode. As described above, the conductor 560 is formed to be embedded in the opening of the insulator 580 and the region between the conductor 542a and the conductor 542b. The positions of the conductor 560, the conductor 542a, and the conductor 542b with respect to the opening of the insulator 580 are selected in a self-aligned manner. That is, in the transistor 500, the gate electrode can be positioned between the source electrode and the drain electrode in a self-aligned manner. Thus, the conductor 560 can be formed without an alignment margin, resulting in a reduction in the area occupied by the transistor 500. Accordingly, miniaturization and high integration of the semiconductor device can be achieved.

In addition, since the conductor 560 is formed in the region between the conductor 542a and the conductor 542b in a self-aligned manner, the conductor 560 does not have a region overlapping with the conductor 542a or the conductor 542b. Thus, parasitic capacitance formed between the conductor 560 and each of the conductor 542a and the conductor 542b can be reduced. As a result, the switching speed of the transistor 500 can be improved, and the transistor 500 can have high frequency characteristics.

The conductor 560 sometimes functions as a first gate (also referred to as a top gate) electrode. In addition, the conductor 503 sometimes functions as a second gate (also referred to as a bottom gate) electrode. In that case, the threshold voltage of the transistor 500 can be controlled by changing a potential applied to the conductor 503 independently of a potential applied to the conductor 560. In particular, when a negative potential is applied to the conductor 503, the threshold voltage of the transistor 500 can be further increased, and the off-state current can be reduced. Thus, a drain current at the time when a potential applied to the conductor 560 is 0 V can be lower in the case where a negative potential is applied to the conductor 503 than in the case where a negative potential is not applied to the conductor 503.

The conductor 503 is positioned to overlap with the oxide 530 and the conductor 560. Thus, in the case where potentials are applied to the conductor 560 and the conductor 503, an electric field generated from the conductor 560 and an electric field generated from the conductor 503 are connected, so that a channel formation region formed in the oxide 530 can be covered.

In this specification and the like, a transistor structure in which a channel formation region is electrically surrounded by electric fields of a pair of gate electrodes (a first gate electrode and a second gate electrode) is referred to as a surrounded channel (S-channel) structure. The S-channel structure disclosed in this specification and the like is different from a Fin-type structure and a planar structure. With the S-channel structure, resistance to a short-channel effect can be enhanced, that is, a transistor in which a short-channel effect is less likely to occur can be provided.

In addition, the conductor 503 has a structure similar to that of the conductor 518; a conductor 503$a$ is formed in contact with an inner wall of an opening in the insulator 514 and the insulator 516, and a conductor 503$b$ is formed on the inner side. Note that although the transistor 500 having a structure in which the conductor 503$a$ and the conductor 503$b$ are stacked is illustrated, the present invention is not limited thereto. For example, the conductor 503 may be provided as a single layer or to have a stacked-layer structure of three or more layers.

Here, for the conductor 503$a$, a conductive material that has a function of inhibiting diffusion of impurities such as a hydrogen atom, a hydrogen molecule, a water molecule, and a copper atom (through which the impurities are unlikely to pass) is preferably used. Alternatively, it is preferable to use a conductive material that has a function of inhibiting diffusion of oxygen (e.g., at least one of an oxygen atom, an oxygen molecule, and the like) (through which oxygen is unlikely to pass). Note that in this specification, a function of inhibiting diffusion of impurities or oxygen means a function of inhibiting diffusion of any one or all of the impurities and oxygen.

For example, when the conductor 503$a$ has a function of inhibiting diffusion of oxygen, a reduction in conductivity of the conductor 503$b$ due to oxidation can be inhibited.

In addition, in the case where the conductor 503 also functions as a wiring, a conductive material with high conductivity that contains tungsten, copper, or aluminum as its main component is preferably used for the conductor 503$b$. Note that although the conductor 503 has a stacked layer of the conductor 503$a$ and the conductor 503$b$ in this embodiment, the conductor 503 may have a single-layer structure.

The insulator 520, the insulator 522, and the insulator 524 have a function of a second gate insulating film.

Here, as the insulator 524 that is in contact with the oxide 530, an insulator that contains oxygen more than oxygen in the stoichiometric composition is preferably used. Such oxygen is easily released from the film by heating. In this specification and the like, oxygen released by heating is sometimes referred to as "excess oxygen". That is, a region containing excess oxygen (also referred to as an "excess-oxygen region") is preferably formed in the insulator 524. When such an insulator containing excess oxygen is provided in contact with the oxide 530, oxygen vacancies (Vo) in the oxide 530 can be reduced and the reliability of the transistor 500 can be improved. When hydrogen enters the oxygen vacancies in the oxide 530, such defects (hereinafter, referred to as VoH in some cases) serve as donors and generate electrons serving as carriers in some cases. In other cases, bonding of part of hydrogen to oxygen bonded to a metal atom generates electrons serving as carriers. Thus, a transistor using an oxide semiconductor that contains a large amount of hydrogen is likely to have normally-on characteristics. Moreover, hydrogen in an oxide semiconductor is easily transferred by a stress such as heat or an electric field; thus, a large amount of hydrogen in an oxide semiconductor might reduce the reliability of the transistor. In one embodiment of the present invention, VoH in the oxide 530 is preferably reduced as much as possible so that the oxide 530 becomes a highly purified intrinsic or substantially highly purified intrinsic oxide. It is important to remove impurities such as moisture or hydrogen in an oxide semiconductor (sometimes referred to as "dehydration" or "dehydrogenation treatment") and to compensate for oxygen vacancies by supplying oxygen to the oxide semiconductor (sometimes referred to as "oxygen adding treatment") in order to obtain an oxide semiconductor whose VoH is sufficiently reduced. When an oxide semiconductor with sufficiently reduced impurities such as VoH is used for a channel formation region of a transistor, the transistor can have stable electrical characteristics.

As the insulator including an excess-oxygen region, specifically, an oxide material that releases part of oxygen by heating is preferably used. An oxide that releases oxygen by heating is an oxide film in which the amount of released oxygen converted into oxygen atoms is greater than or equal to $1.0 \times 10^{18}$ atoms/cm$^3$, preferably greater than or equal to $1.0 \times 10^{19}$ atoms/cm$^3$, further preferably greater than or equal to $2.0 \times 10^{19}$ atoms/cm$^3$ or greater than or equal to $3.0 \times 10^{20}$ atoms/cm$^3$ in TDS (Thermal Desorption Spectroscopy) analysis. Note that the temperature of the film surface in the TDS analysis is preferably within the range of 100° C. to 700° C., or 100° C. to 400° C.

One or more of heat treatment, microwave treatment, and RF treatment may be performed in a state in which the insulator including the excess-oxygen region and the oxide 530 are in contact with each other. By the treatment, water or hydrogen in the oxide 530 can be removed. For example, in the oxide 530, dehydrogenation can be performed when a reaction in which a bond of VoH is cut occurs, i.e., a reaction of "VoH→Vo+H" occurs. Part of hydrogen generated at this time is bonded to oxygen to be H$_2$O, and removed from the oxide 530 or an insulator near the oxide 530 in some cases. Some hydrogen may be gettered into the conductor 542 in some cases.

For the microwave treatment, for example, an apparatus including a power supply that generates high-density plasma or an apparatus including a power supply that applies RF to the substrate side is suitably used. For example, the use of an oxygen-containing gas and high-density plasma enables high-density oxygen radicals to be generated, and application of the RF to the substrate side allows the oxygen radicals generated by the high-density plasma to be efficiently introduced into the oxide 530 or an insulator in the vicinity of the oxide 530. The pressure in the microwave treatment is higher than or equal to 133 Pa, preferably higher than or equal to 200 Pa, further preferably higher than or equal to 400 Pa. As a gas introduced into an apparatus for performing the microwave treatment, for example, oxygen and argon are used and the oxygen flow rate ratio (O$_2$/(O$_2$+Ar)) is lower than or equal to 50%, preferably higher than or equal to 10% and lower than or equal to 30%.

In a manufacturing process of the transistor 500, heat treatment is preferably performed with the surface of the oxide 530 exposed. The heat treatment is performed at higher than or equal to 100° C. and lower than or equal to 450° C., preferably higher than or equal to 350° C. and lower than or equal to 400° C., for example. Note that the heat treatment is performed in a nitrogen gas or inert gas atmosphere, or an atmosphere containing an oxidizing gas at 10 ppm or more, 1% or more, or 10% or more. For example, the heat treatment is preferably performed in an oxygen atmosphere. Accordingly, oxygen can be supplied to the oxide 530 to reduce oxygen vacancies (Vo). The heat treatment may be performed under reduced pressure. Alternatively, the heat treatment may be performed in such a manner that heat treatment is performed in a nitrogen gas or inert gas atmosphere, and then another heat treatment is performed in an atmosphere containing an oxidizing gas at 10 ppm or more, 1% or more, or 10% or more in order to compensate for released oxygen. Alternatively, the heat treatment may be performed in such a manner that heat treatment is performed in an atmosphere containing an oxidizing gas at 10 ppm or more, 1% or more, or 10% or more, and then another heat treatment is successively performed in a nitrogen gas or inert gas atmosphere.

Note that the oxygen adding treatment performed on the oxide 530 can promote a reaction in which oxygen vacancies in the oxide 530 are filled with supplied oxygen, i.e., a reaction of "Vo+O→null". Furthermore, hydrogen remaining in the oxide 530 reacts with supplied oxygen, so that the hydrogen can be removed as $H_2O$ (dehydration). This can inhibit recombination of hydrogen remaining in the oxide 530 with oxygen vacancies and formation of VoH.

When the insulator 524 includes an excess-oxygen region, it is preferable that the insulator 522 have a function of inhibiting diffusion of oxygen (e.g., oxygen atoms and oxygen molecules) (or that the above oxygen be less likely to pass through the insulator 522).

When the insulator 522 has a function of inhibiting diffusion of oxygen or impurities, oxygen contained in the oxide 530 is not diffused into the insulator 520 side, which is preferable. Furthermore, the conductor 503 can be inhibited from reacting with oxygen contained in the insulator 524 or the oxide 530.

For the insulator 522, a single layer or stacked layers of an insulator containing what is called a high-k material such as aluminum oxide, hafnium oxide, an oxide containing aluminum and hafnium (hafnium aluminate), tantalum oxide, zirconium oxide, lead zirconate titanate (PZT), strontium titanate ($SrTiO_3$), or $(Ba,Sr)TiO_3$ (BST) are preferably used, for example. As miniaturization and high integration of transistors progress, a problem such as leakage current might arise because of a thinner gate insulating film. When a high-k material is used for an insulator functioning as the gate insulating film, a gate potential during transistor operation can be reduced while the physical thickness is maintained.

It is particularly preferable to use an insulator containing an oxide of one or both of aluminum and hafnium, which is an insulating material having a function of inhibiting diffusion of impurities, oxygen, and the like (through which oxygen is unlikely to pass). Aluminum oxide, hafnium oxide, an oxide containing aluminum and hafnium (hafnium aluminate), or the like is preferably used as the insulator containing an oxide of one or both of aluminum and hafnium. In the case where the insulator 522 is formed using such a material, the insulator 522 functions as a layer that inhibits release of oxygen from the oxide 530 and mixing of impurities such as hydrogen from the periphery of the transistor 500 into the oxide 530.

Alternatively, aluminum oxide, bismuth oxide, germanium oxide, niobium oxide, silicon oxide, titanium oxide, tungsten oxide, yttrium oxide, or zirconium oxide may be added to these insulators, for example. Alternatively, these insulators may be subjected to nitriding treatment. The insulator over which silicon oxide, silicon oxynitride, or silicon nitride is stacked may be used.

In addition, it is preferable that the insulator 520 be thermally stable. For example, silicon oxide and silicon oxynitride are suitable because they are thermally stable. Furthermore, the combination of an insulator that is a high-k material and silicon oxide or silicon oxynitride enables the insulator 520 to have a stacked-layer structure that has thermal stability and a high relative permittivity.

Note that in the transistor 500 in FIG. 19A and FIG. 19B, the insulator 520, the insulator 522, and the insulator 524 are illustrated as the second gate insulating film having a stacked-layer structure of three layers; however, the second gate insulating film may be a single layer or may have a stacked-layer structure of two layers or four or more layers. In such cases, without limitation to a stacked-layer structure formed of the same material, a stacked-layer structure formed of different materials may be employed.

In the transistor 500, a metal oxide functioning as an oxide semiconductor is used for the oxide 530 including a channel formation region. For example, for the oxide 530, a metal oxide such as an In-M-Zn oxide (the element M is one or more kinds selected from aluminum, gallium, yttrium, copper, vanadium, beryllium, boron, titanium, iron, nickel, germanium, zirconium, molybdenum, lanthanum, cerium, neodymium, hafnium, tantalum, tungsten, magnesium, and the like) is preferably used.

The metal oxide functioning as an oxide semiconductor may be formed by a sputtering method or an ALD (Atomic Layer Deposition) method. Note that the metal oxide functioning as an oxide semiconductor is described in detail in another embodiment.

Furthermore, the metal oxide functioning as the channel formation region in the oxide 530 preferably has a band gap of more than or equal to 2 eV, further preferably more than or equal to 2.5 eV. With the use of a metal oxide having such a wide bandgap, the off-state current of the transistor can be reduced.

When the oxide 530 includes the oxide 530a under the oxide 530b, it is possible to inhibit diffusion of impurities into the oxide 530b from the components formed below the oxide 530a.

Note that the oxide 530 preferably has a stacked-layer structure of a plurality of oxide layers that differ in the atomic ratio of metal atoms. Specifically, the atomic ratio of the element M to the constituent elements in the metal oxide used for the oxide 530a is preferably higher than the atomic ratio of the element M to the constituent elements in the metal oxide used for the oxide 530b. In addition, the atomic ratio of the element M to In in the metal oxide used for the oxide 530a is preferably higher than the atomic ratio of the element M to In in the metal oxide used for the oxide 530b. Furthermore, the atomic ratio of In to the element M in the metal oxide used for the oxide 530b is preferably higher than the atomic ratio of In to the element M in the metal oxide used for the oxide 530a.

In addition, the energy of the conduction band minimum of the oxide 530a is preferably higher than the energy of the conduction band minimum of the oxide 530b. In other words, the electron affinity of the oxide 530a is preferably smaller than the electron affinity of the oxide 530b.

Here, the energy level of the conduction band minimum gradually changes at a junction portion of the oxide 530a and the oxide 530b. In other words, the energy level of the conduction band minimum at the junction portion of the oxide 530a and the oxide 530b continuously changes or is continuously connected. To obtain this, the density of defect states in a mixed layer formed at an interface between the oxide 530a and the oxide 530b is preferably made low.

Specifically, when the oxide 530a and the oxide 530b contain a common element (as a main component) in addition to oxygen, a mixed layer with a low density of defect states can be formed. For example, in the case where the oxide 530b is an In—Ga—Zn oxide, an In—Ga—Zn oxide, a Ga—Zn oxide, gallium oxide, or the like is preferably used as the oxide 530a.

At this time, the oxide 530b serves as a main carrier path. When the oxide 530a has the above structure, the density of defect states at the interface between the oxide 530a and the oxide 530b can be made low. Thus, the influence of interface scattering on carrier conduction is small, and the transistor 500 can have a high on-state current.

The conductor 542a and the conductor 542b functioning as the source electrode and the drain electrode are provided over the oxide 530b. For the conductor 542a and conductor 542b, it is preferable to use a metal element selected from aluminum, chromium, copper, silver, gold, platinum, tantalum, nickel, titanium, molybdenum, tungsten, hafnium, vanadium, niobium, manganese, magnesium, zirconium, beryllium, indium, ruthenium, iridium, strontium, and lanthanum; an alloy containing any of the above metal elements; an alloy containing a combination of the above metal elements; or the like. For example, it is preferable to use tantalum nitride, titanium nitride, tungsten, a nitride containing titanium and aluminum, a nitride containing tantalum and aluminum, ruthenium oxide, ruthenium nitride, an oxide containing strontium and ruthenium, an oxide containing lanthanum and nickel, or the like. In addition, tantalum nitride, titanium nitride, a nitride containing titanium and aluminum, a nitride containing tantalum and aluminum, ruthenium oxide, ruthenium nitride, an oxide containing strontium and ruthenium, and an oxide containing lanthanum and nickel are preferable because they are oxidation-resistant conductive materials or materials that retain their conductivity even after absorbing oxygen. Furthermore, a metal nitride film of tantalum nitride or the like is preferable because it has a barrier property against hydrogen or oxygen.

In addition, although the conductor 542a and the conductor 542b each having a single-layer structure are illustrated in FIG. 19A, a stacked-layer structure of two or more layers may be employed. For example, it is preferable to stack a tantalum nitride film and a tungsten film. Alternatively, a titanium film and an aluminum film may be stacked. Alternatively, a two-layer structure where an aluminum film is stacked over a tungsten film, a two-layer structure where a copper film is stacked over a copper-magnesium-aluminum alloy film, a two-layer structure where a copper film is stacked over a titanium film, or a two-layer structure where a copper film is stacked over a tungsten film may be employed.

Other examples include a three-layer structure where a titanium film or a titanium nitride film is formed, an aluminum film or a copper film is stacked over the titanium film or the titanium nitride film, and a titanium film or a titanium nitride film is formed over the aluminum film or the copper film; and a three-layer structure where a molybdenum film or a molybdenum nitride film is formed, an aluminum film or a copper film is stacked over the molybdenum film or the molybdenum nitride film, and a molybdenum film or a molybdenum nitride film is formed over the aluminum film or the copper film. Note that a transparent conductive material containing indium oxide, tin oxide, or zinc oxide may be used.

In addition, as illustrated in FIG. 19A, a region 543a and a region 543b are sometimes formed as low-resistance regions at an interface between the oxide 530 and the conductor 542a (the conductor 542b) and in the vicinity of the interface. In that case, the region 543a functions as one of a source region and a drain region, and the region 543b functions as the other of the source region and the drain region. Furthermore, the channel formation region is formed in a region between the region 543a and the region 543b.

When the conductor 542a (the conductor 542b) is provided in contact with the oxide 530, the oxygen concentration in the region 543a (the region 543b) sometimes decreases. In addition, a metal compound layer that contains the metal contained in the conductor 542a (the conductor 542b) and the component of the oxide 530 is sometimes formed in the region 543a (the region 543b). In such a case, the carrier density of the region 543a (the region 543b) increases, and the region 543a (the region 543b) becomes a low-resistance region.

The insulator 544 is provided to cover the conductor 542a and the conductor 542b and inhibits oxidation of the conductor 542a and the conductor 542b. At this time, the insulator 544 may be provided to cover a side surface of the oxide 530 and to be in contact with the insulator 524.

A metal oxide containing one kind or two or more kinds selected from hafnium, aluminum, gallium, yttrium, zirconium, tungsten, titanium, tantalum, nickel, germanium, neodymium, lanthanum, magnesium, and the like can be used for the insulator 544. Alternatively, silicon nitride oxide, silicon nitride, or the like can be used for the insulator 544.

It is particularly preferable to use an insulator containing an oxide of one or both of aluminum and hafnium, such as aluminum oxide, hafnium oxide, or an oxide containing aluminum and hafnium (hafnium aluminate), for the insulator 544. In particular, hafnium aluminate has higher heat resistance than a hafnium oxide film. Therefore, hafnium aluminate is preferable because it is less likely to be crystallized by heat treatment in a later step. Note that the insulator 544 is not an essential component when the conductor 542a and the conductor 542b are oxidation-resistant materials or do not significantly lose their conductivity even after absorbing oxygen. Design is appropriately set in consideration of required transistor characteristics.

When the insulator 544 is included, diffusion of impurities such as water and hydrogen contained in the insulator 580 into the oxide 530b through the insulator 545 can be inhibited. Furthermore, oxidation of the conductor 560 due to excess oxygen contained in the insulator 580 can be inhibited.

The insulator 545 functions as a first gate insulating film. Like the insulator 524, the insulator 545 is preferably formed using an insulator that contains excess oxygen and releases oxygen by heating.

Specifically, silicon oxide containing excess oxygen, silicon oxynitride, silicon nitride oxide, silicon nitride, silicon oxide to which fluorine is added, silicon oxide to which carbon is added, silicon oxide to which carbon and nitrogen are added, or porous silicon oxide can be used. In particular, silicon oxide and silicon oxynitride are preferable because they are thermally stable.

When an insulator containing excess oxygen is provided as the insulator 545, oxygen can be effectively supplied from the insulator 545 to the channel formation region of the oxide 530b. Furthermore, as in the insulator 524, the concentration of impurities such as water or hydrogen in the insulator 545 is preferably reduced. The thickness of the insulator 545 is preferably greater than or equal to 1 nm and less than or equal to 20 nm.

Furthermore, to efficiently supply excess oxygen contained in the insulator 545 to the oxide 530, a metal oxide may be provided between the insulator 545 and the conductor 560. The metal oxide preferably inhibits diffusion of oxygen from the insulator 545 into the conductor 560. Providing the metal oxide that inhibits diffusion of oxygen inhibits diffusion of excess oxygen from the insulator 545 into the conductor 560. That is, reduction in the amount of excess oxygen supplied to the oxide 530 can be inhibited. Moreover, oxidation of the conductor 560 due to excess oxygen can be inhibited. For the metal oxide, a material that can be used for the insulator 544 is used.

Note that the insulator 545 may have a stacked-layer structure like the second gate insulating film. As miniaturization and high integration of transistors progress, a problem such as leakage current might arise because of a thinner gate insulating film. For that reason, when the insulator functioning as the gate insulating film has a stacked-layer structure of a high-k material and a thermally stable material, a gate potential during transistor operation can be reduced while the physical thickness is maintained. Furthermore, the stacked-layer structure can be thermally stable and have a high relative permittivity.

Although the conductor 560 that functions as the first gate electrode and has a two-layer structure is illustrated in FIG. 19A and FIG. 19B, a single-layer structure or a stacked-layer structure of three or more layers may be employed.

For the conductor 560a, it is preferable to use a conductive material having a function of inhibiting diffusion of impurities such as a hydrogen atom, a hydrogen molecule, a water molecule, a nitrogen atom, a nitrogen molecule, a nitrogen oxide molecule ($N_2O$, NO, $NO_2$, and the like), and a copper atom. Alternatively, it is preferable to use a conductive material having a function of inhibiting diffusion of oxygen (e.g., at least one of an oxygen atom, an oxygen molecule, and the like). When the conductor 560a has a function of inhibiting diffusion of oxygen, it is possible to inhibit a reduction in conductivity of the conductor 560b due to oxidation caused by oxygen contained in the insulator 545. As a conductive material having a function of inhibiting diffusion of oxygen, for example, tantalum, tantalum nitride, ruthenium, ruthenium oxide, or the like is preferably used. For the conductor 560a, the oxide semiconductor that can be used for the oxide 530 can be used. In that case, when the conductor 560b is deposited using a sputtering method, the conductor 560a can have a reduced value of electrical resistance to be a conductor. Such a conductor can be referred to as an OC (Oxide Conductor) electrode.

In addition, a conductive material containing tungsten, copper, or aluminum as its main component is preferably used for the conductor 560b. Furthermore, the conductor 560b also functions as a wiring and thus a conductor having high conductivity is preferably used for the conductor 560b. For example, a conductive material containing tungsten, copper, or aluminum as its main component can be used. The conductor 560b may have a stacked-layer structure, for example, a stacked-layer structure of any of the above conductive materials and titanium or titanium nitride.

The insulator 580 is provided over the conductor 542a and the conductor 542b with the insulator 544 therebetween. The insulator 580 preferably includes an excess-oxygen region. For example, the insulator 580 preferably contains silicon oxide, silicon oxynitride, silicon nitride oxide, silicon nitride, silicon oxide to which fluorine is added, silicon oxide to which carbon is added, silicon oxide to which carbon and nitrogen are added, porous silicon oxide, resin, or the like. In particular, silicon oxide and silicon oxynitride are preferable because they are thermally stable. In particular, silicon oxide and porous silicon oxide are preferable because an excess-oxygen region can be easily formed in a later step.

The insulator 580 preferably includes an excess-oxygen region. When the insulator 580 that releases oxygen by heating is provided, oxygen in the insulator 580 can be efficiently supplied to the oxide 530. Note that the concentration of impurities such as water or hydrogen in the insulator 580 is preferably reduced.

The opening of the insulator 580 is formed to overlap with the region between the conductor 542a and the conductor 542b. Accordingly, the conductor 560 is formed to be embedded in the opening of the insulator 580 and the region between the conductor 542a and the conductor 542b.

The gate length needs to be short for miniaturization of the semiconductor device, but it is necessary to prevent a reduction in conductivity of the conductor 560. When the conductor 560 is made thick to achieve this, the conductor 560 might have a shape with a high aspect ratio. In this embodiment, the conductor 560 is provided to be embedded in the opening of the insulator 580; thus, even when the conductor 560 has a shape with a high aspect ratio, the conductor 560 can be formed without collapsing during the process.

The insulator 574 is preferably provided in contact with a top surface of the insulator 580, a top surface of the conductor 560, and a top surface of the insulator 545. When the insulator 574 is deposited using a sputtering method, excess-oxygen regions can be provided in the insulator 545 and the insulator 580. Accordingly, oxygen can be supplied from the excess-oxygen regions to the oxide 530.

For example, a metal oxide containing one kind or two or more kinds selected from hafnium, aluminum, gallium, yttrium, zirconium, tungsten, titanium, tantalum, nickel, germanium, magnesium, and the like can be used for the insulator 574.

In particular, aluminum oxide has a high barrier property, and even a thin aluminum oxide film having a thickness of greater than or equal to 0.5 nm and less than or equal to 3.0 nm can inhibit diffusion of hydrogen and nitrogen. Accordingly, aluminum oxide deposited by a sputtering method serves as an oxygen supply source and can also have a function of a barrier film against impurities such as hydrogen.

In addition, an insulator 581 functioning as an interlayer film is preferably provided over the insulator 574. As in the insulator 524 or the like, the concentration of impurities such as water or hydrogen in the insulator 581 is preferably reduced.

Furthermore, a conductor 540a and a conductor 540b are positioned in openings formed in the insulator 581, the insulator 574, the insulator 580, and the insulator 544. The conductor 540a and the conductor 540b are provided to face each other with the conductor 560 therebetween. The structures of the conductor 540a and the conductor 540b are similar to a structure of a conductor 546 and a conductor 548 that are described later.

An insulator 582 is provided over the insulator 581. A substance having a barrier property against oxygen or hydrogen is preferably used for the insulator 582. Therefore, a material similar to that for the insulator 514 can be used for the insulator 582. For the insulator 582, a metal oxide such as aluminum oxide, hafnium oxide, or tantalum oxide is preferably used, for example.

In particular, aluminum oxide has an excellent blocking effect that prevents the passage of both oxygen and impurities such as hydrogen and moisture which are factors of change in electrical characteristics of the transistor. Accordingly, aluminum oxide can prevent mixing of impurities such as hydrogen and moisture into the transistor 500 in the manufacturing process and after the manufacturing of the transistor. In addition, release of oxygen from the oxide included in the transistor 500 can be inhibited. Therefore, aluminum oxide is suitably used for the protective film of the transistor 500.

In addition, an insulator 586 is provided over the insulator 582. For the insulator 586, a material similar to that for the insulator 320 can be used. Furthermore, when a material with a comparatively low permittivity is used for these insulators, parasitic capacitance generated between wirings can be reduced. A silicon oxide film, a silicon oxynitride film, or the like can be used for the insulator 586, for example.

Furthermore, the conductor 546, the conductor 548, and the like are embedded in the insulator 520, the insulator 522, the insulator 524, the insulator 544, the insulator 580, the insulator 574, the insulator 581, the insulator 582, and the insulator 586.

The conductor 546 and the conductor 548 have functions of plugs or wirings that are connected to the capacitor 600, the transistor 500, or the transistor 550. The conductor 546 and the conductor 548 can be provided using materials similar to those for the conductor 328 and the conductor 330.

After the transistor 500 is formed, an opening may be formed to surround the transistor 500 and an insulator having a high barrier property against hydrogen or water may be formed to cover the opening. Surrounding the transistor 500 with the insulator having a high barrier property can prevent entry of moisture and hydrogen from the outside. Alternatively, a plurality of transistors 500 may be collectively surrounded by the insulator having a high barrier property against hydrogen or water. When an opening is formed to surround the transistor 500, for example, the formation of an opening reaching the insulator 522 or the insulator 514 and the formation of the insulator having a high barrier property in contact with the insulator 522 or the insulator 514 are suitable because these formation steps can also serve as part of the manufacturing steps of the transistor 500. The insulator having a high barrier property against hydrogen or water is formed using a material similar to that for the insulator 522 or the insulator 514, for example.

Next, the capacitor 600 is provided above the transistor 500. The capacitor 600 includes a conductor 610, a conductor 620, and an insulator 630.

In addition, a conductor 612 may be provided over the conductor 546 and the conductor 548. The conductor 612 has a function of a plug or a wiring that is connected to the transistor 500. The conductor 610 has a function of an electrode of the capacitor 600. Note that the conductor 612 and the conductor 610 can be formed at the same time.

For the conductor 612 and the conductor 610, a metal film containing an element selected from molybdenum, titanium, tantalum, tungsten, aluminum, copper, chromium, neodymium, and scandium; a metal nitride film containing the above element as its component (a tantalum nitride film, a titanium nitride film, a molybdenum nitride film, or a tungsten nitride film); or the like can be used. Alternatively, it is possible to use a conductive material such as indium tin oxide, indium oxide containing tungsten oxide, indium zinc oxide containing tungsten oxide, indium oxide containing titanium oxide, indium tin oxide containing titanium oxide, indium zinc oxide, or indium tin oxide to which silicon oxide is added.

Although the conductor 612 and the conductor 610 each having a single-layer structure are shown in this embodiment, the structure is not limited thereto; a stacked-layer structure of two or more layers may be employed. For example, between a conductor having a barrier property and a conductor having high conductivity, a conductor that is highly adhesive to the conductor having a barrier property and the conductor having high conductivity may be formed.

The conductor 620 is provided to overlap with the conductor 610 with the insulator 630 therebetween. Note that a conductive material such as a metal material, an alloy material, or a metal oxide material can be used for the conductor 620. It is preferable to use a high-melting-point material that has both heat resistance and conductivity, such as tungsten or molybdenum, and it is particularly preferable to use tungsten. In addition, in the case where the conductor 620 is formed concurrently with another component such as a conductor, Cu (copper), Al (aluminum), or the like, which is a low-resistance metal material, is used.

An insulator 640 is provided over the conductor 620 and the insulator 630. The insulator 640 can be provided using a material similar to that for the insulator 320. In addition, the insulator 640 may function as a planarization film that covers an uneven shape therebelow.

With the use of this structure, a semiconductor device using a transistor including an oxide semiconductor can be miniaturized or highly integrated.

Examples of a substrate that can be used for the semiconductor device of one embodiment of the present invention include a glass substrate, a quartz substrate, a sapphire substrate, a ceramic substrate, a metal substrate (e.g., a stainless steel substrate, a substrate including stainless steel foil, a tungsten substrate, and a substrate including tungsten foil), a semiconductor substrate (e.g., a single crystal semiconductor substrate, a polycrystalline semiconductor substrate, and a compound semiconductor substrate), and an SOI (Silicon on Insulator) substrate. Alternatively, a plastic substrate having heat resistance to the processing temperature in this embodiment may be used. Examples of a glass substrate include a barium borosilicate glass substrate, an aluminosilicate glass substrate, an aluminoborosilicate glass substrate, and a soda lime glass substrate. Alternatively, crystallized glass or the like can be used.

Alternatively, a flexible substrate, an attachment film, paper including a fibrous material, a base film, or the like can be used as the substrate. As examples of the flexible substrate, the attachment film, the base material film, and the like, the following can be given. Examples include plastics typified by polyethylene terephthalate (PET), polyethylene naphthalate (PEN), polyether sulfone (PES), and polytetrafluoroethylene (PTFE). Another example is a synthetic resin such as acrylic. Other examples are polypropylene, polyester, polyvinyl fluoride, and polyvinyl chloride. Other examples are polyamide, polyimide, an aramid resin, an epoxy resin, an inorganic vapor deposition film, and paper. In particular, the use of a semiconductor substrate, a single crystal substrate, an SOI substrate, or the like enables the manufacture of small-sized transistors with a small variation in characteristics, size, shape, or the like and with high current capability. When a circuit is formed with such transistors, lower power consumption of the circuit or higher integration of the circuit can be achieved.

A flexible substrate may be used as the substrate, and a transistor, a resistor, a capacitor, and/or the like may be formed directly over the flexible substrate. Alternatively, a separation layer may be provided between the substrate and the transistor, the resistor, the capacitor, and/or the like. After part or the whole of a semiconductor device is completed over the separation layer, the separation layer can be used for separation from the substrate and transfer to another substrate. In such a case, the transistor, the resistor, the capacitor, and/or the like can be transferred to a substrate having low heat resistance or a flexible substrate. As the separation layer, a stack of inorganic films, namely a tungsten film and a silicon oxide film, an organic resin film of polyimide or the like formed over a substrate, or a silicon film containing hydrogen can be used, for example.

That is, a semiconductor device may be formed over one substrate and then transferred to another substrate. Examples of a substrate to which a semiconductor device is transferred include, in addition to the above-described substrates over which transistors can be formed, a paper substrate, a cellophane substrate, an aramid film substrate, a polyimide film substrate, a stone substrate, a wood substrate, a cloth substrate (including a natural fiber (silk, cotton, or hemp), a synthetic fiber (nylon, polyurethane, or polyester), a regenerated fiber (acetate, cupro, rayon, or regenerated polyester), or the like), a leather substrate, and a rubber substrate. With the use of any of these substrates, a flexible semiconductor device or a highly durable semiconductor device can be manufactured, high heat resistance can be provided, or a reduction in weight or thickness can be achieved.

Providing a semiconductor device over a flexible substrate can suppress an increase in weight and can produce a non-breakable semiconductor device.

<Modification Example 1 of Transistor>

Figure 20A:
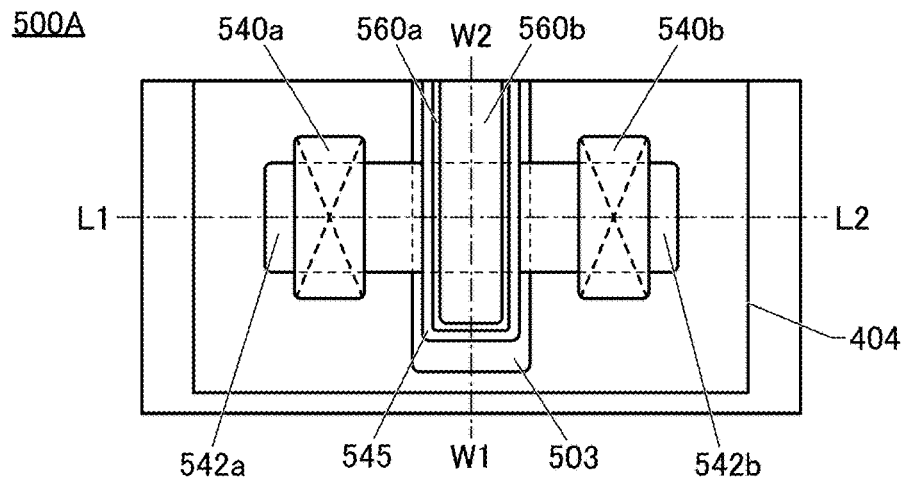
FIG. 20A to FIG. 20C are diagrams illustrating a transistor structure example.
Figure 20B:
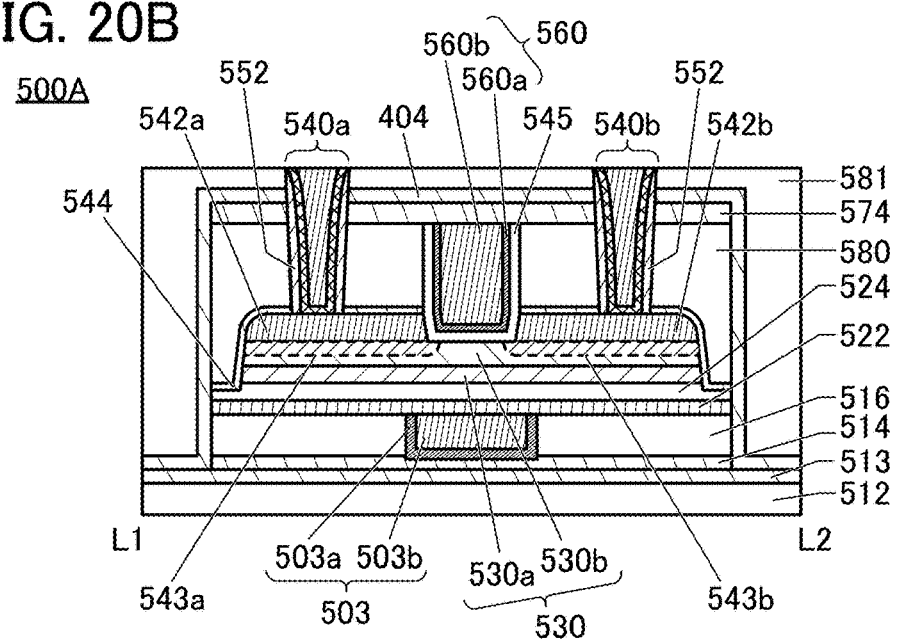
Figure 20C:
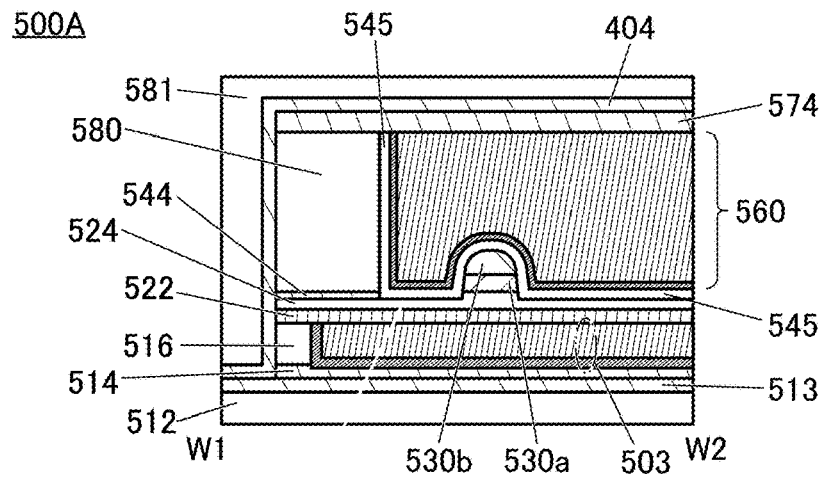

A transistor 500A illustrated in FIG. 20A, FIG. 20B, and FIG. 20C is a modification example of the transistor 500 having the structure illustrated in FIG. 19A and FIG. 19B. FIG. 20A is a top view of the transistor 500A, FIG. 20B is a cross-sectional view of the transistor 500A in the channel length direction, and FIG. 20C is a cross-sectional view of the transistor 500A in the channel width direction. Note that for clarity of the drawing, some components are not illustrated in the top view of FIG. 20A. The structure illustrated in FIG. 20A, FIG. 20B, and FIG. 20C can also be used for other transistors such as the transistor 550 included in the semiconductor device of one embodiment of the present invention.

The transistor 500A having the structure illustrated in FIG. 20A, FIG. 20B, and FIG. 20C is different from the transistor 500 having the structure illustrated in FIG. 19A and FIG. 19B in that an insulator 552, an insulator 513, and an insulator 404 are included. Furthermore, the transistor 500A is different from the transistor 500 having the structure illustrated in FIG. 19A and FIG. 19B in that the insulator 552 is provided in contact with a side surface of the conductor 540a and a side surface of the conductor 540b. Moreover, the transistor 500A is different from the transistor 500 having the structure illustrated in FIG. 19A and FIG. 19B in that the insulator 520 is not included.

In the transistor 500A having the structure illustrated in FIG. 20A, FIG. 20B, and FIG. 20C, the insulator 513 is provided over the insulator 512. The insulator 404 is provided over the insulator 574 and the insulator 513.

In the transistor 500A having the structure illustrated in FIG. 20A, FIG. 20B, and FIG. 20C, the insulator 514, the insulator 516, the insulator 522, the insulator 524, the insulator 544, the insulator 580, and the insulator 574 are patterned and covered with the insulator 404. That is, the insulator 404 is in contact with a top surface of the insulator 574, a side surface of the insulator 574, a side surface of the insulator 580, a side surface of the insulator 544, a side surface of the insulator 524, a side surface of the insulator 522, a side surface of the insulator 516, a side surface of the insulator 514, and a top surface of the insulator 513. Thus, the oxide 530 and the like are isolated from the outside by the insulator 404 and the insulator 513.

The insulator 513 and the insulator 404 preferably have high capability of inhibiting diffusion of hydrogen (e.g., at least one of a hydrogen atom, a hydrogen molecule, and the like) or a water molecule. For example, for the insulator 513 and the insulator 404, silicon nitride or silicon nitride oxide, which is a material having a high hydrogen barrier property, is preferably used. This can inhibit diffusion of hydrogen or the like into the oxide 530, thereby suppressing the degradation of the characteristics of the transistor 500A. Consequently, the reliability of the semiconductor device of one embodiment of the present invention can be increased.

The insulator 552 is provided in contact with the insulator 581, the insulator 404, the insulator 574, the insulator 580, and the insulator 544. The insulator 552 preferably has a function of inhibiting diffusion of hydrogen or water molecules. For example, for the insulator 552, an insulator such as silicon nitride, aluminum oxide, or silicon nitride oxide, which is a material having a high hydrogen barrier property, is preferably used. In particular, it is preferable to use silicon nitride for the insulator 552 because of its high hydrogen barrier property. The use of a material having a high hydrogen barrier property for the insulator 552 can inhibit diffusion of impurities such as water and hydrogen from the insulator 580 and the like into the oxide 530 through the conductor 540a and the conductor 540b. Furthermore, oxygen contained in the insulator 580 can be inhibited from being absorbed by the conductor 540a and the conductor 540b. As described above, the reliability of the semiconductor device of one embodiment of the present invention can be increased.

<Modification Example 2 of Transistor>

Figure 21A:
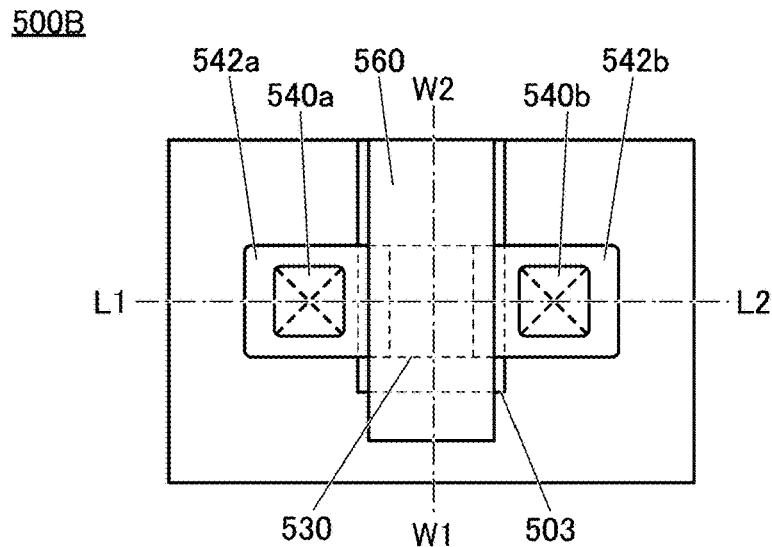
FIG. 21A to FIG. 21C are diagrams illustrating a transistor structure example.
Figure 21B:
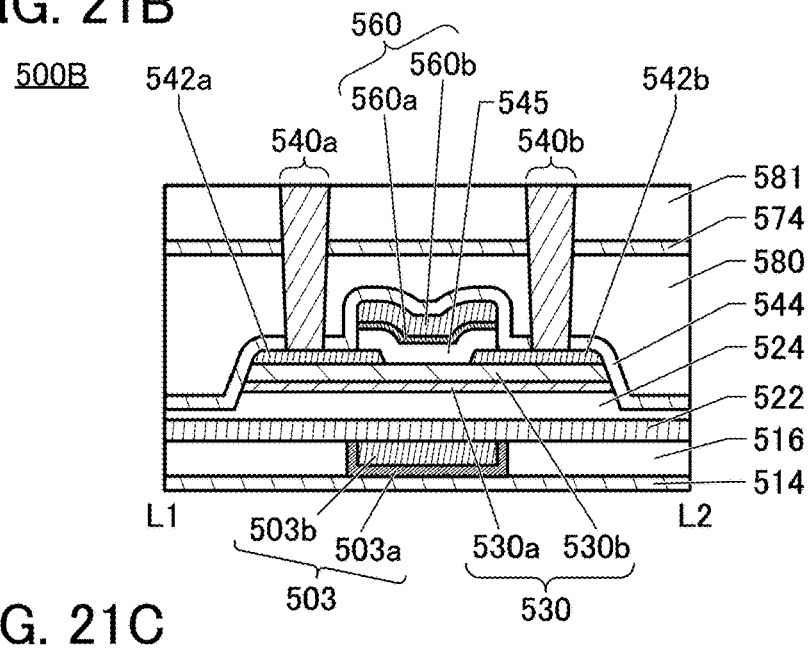
Figure 21C:
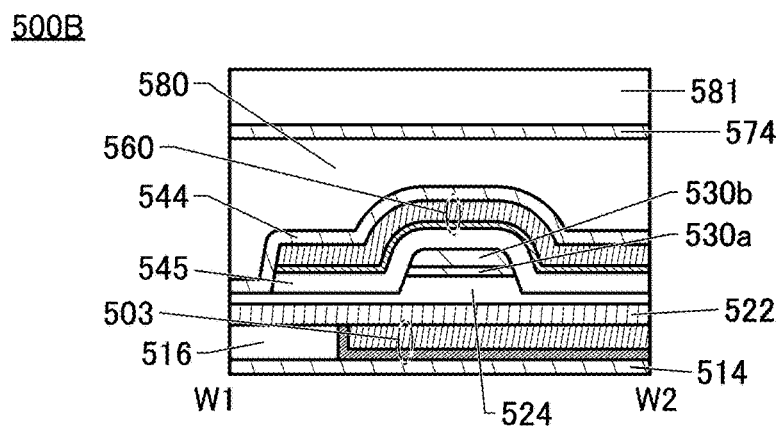

A structure example of a transistor 500B is described with reference to FIG. 21A, FIG. 21B, and FIG. 21C. FIG. 21A is a top view of the transistor 500B. FIG. 21B is a cross-sectional view of a portion indicated by dashed-dotted line L1-L2 in FIG. 21A. FIG. 21C is a cross-sectional view of a portion indicated by dashed-dotted line W1-W2 in FIG. 21A. Note that for clarity of the drawing, some components are not illustrated in the top view of FIG. 21A.

The transistor 500B is a modification example of the transistor 500 and can be replaced with the transistor 500. Accordingly, in order to avoid repeated description, differences of the transistor 500B from the transistor 500 are mainly described.

The conductor 560 functioning as a first gate electrode includes the conductor 560a and the conductor 560b over the conductor 560a. For the conductor 560a, a conductive material that has a function of inhibiting diffusion of impurities such as a hydrogen atom, a hydrogen molecule, a water molecule, and a copper atom is preferably used. Alternatively, it is preferable to use a conductive material having a function of inhibiting diffusion of oxygen (e.g., at least one of an oxygen atom, an oxygen molecule, and the like).

When the conductor 560a has a function of inhibiting diffusion of oxygen, the range of choices for the material of the conductor 560b can be extended. That is, the conductor 560a inhibits oxidation of the conductor 560b, thereby preventing the decrease in conductivity.

The insulator 544 is preferably provided to cover the top surface and a side surface of the conductor 560 and a side surface of the insulator 545. For the insulator 544, an insulating material having a function of inhibiting diffusion of oxygen and impurities such as water and hydrogen is preferably used. For example, aluminum oxide or hafnium oxide is preferably used. Moreover, it is possible to use, for example, a metal oxide such as magnesium oxide, gallium oxide, germanium oxide, yttrium oxide, zirconium oxide, lanthanum oxide, neodymium oxide, or tantalum oxide or silicon nitride oxide, silicon nitride, or the like.

Providing the insulator 544 can inhibit oxidation of the conductor 560. Moreover, the insulator 544 can inhibit diffusion of impurities such as water and hydrogen contained in the insulator 580 into the transistor 500B.

The transistor 500B has the conductor 560 overlapping part of the conductor 542a and part of the conductor 542b, and thus tends to have larger parasitic capacitance than the transistor 500. Consequently, the transistor 500B tends to have a lower operating frequency than the transistor 500. However, the transistor 500B does not require steps of providing an opening in the insulator 580 and the like and embedding the conductor 560, the insulator 545, and the like in the opening; hence, the productivity of the transistor 500B is higher than that of the transistor 500.

The composition, structure, method, and the like described in this embodiment can be used in combination as appropriate with the compositions, structures, methods, and the like described in the other embodiments, Example, and the like.

Embodiment 3

In this embodiment, an oxide semiconductor which is a kind of metal oxides is described.

The metal oxide preferably contains at least indium or zinc. In particular, indium and zinc are preferably contained. In addition, aluminum, gallium, yttrium, tin, or the like is preferably contained. Furthermore, one kind or two or more kinds selected from boron, silicon, titanium, iron, nickel, germanium, zirconium, molybdenum, lanthanum, cerium, neodymium, hafnium, tantalum, tungsten, magnesium, cobalt, and the like may be contained.

<Classification of Crystal Structure>

First, classifications of the crystal structures of an oxide semiconductor are described with reference to FIG. 22A. FIG. 22A is a diagram showing classifications of crystal structures of an oxide semiconductor, typically IGZO (metal oxide containing In, Ga, and Zn).

As shown in FIG. 22A, an oxide semiconductor is roughly classified into "Amorphous", "Crystalline", and "Crystal". The term "Amorphous" includes completely amorphous. The term "Crystalline" includes CAAC (c-axis-aligned crystalline), nc (nanocrystalline), and CAC (cloud-aligned composite). Note that the term "Crystalline" excludes single crystal, poly crystal, and completely amorphous. The term "Crystal" includes single crystal and poly crystal.

Note that the structures in the thick frame in FIG. 22A are in an intermediate state between "Amorphous" and "Crystal", and belong to a new boundary region (new crystalline phase). That is, these structures are completely different from "Amorphous", which is energetically unstable, and "Crystal".

A crystal structure of a film or a substrate can be analyzed with an X-ray diffraction (XRD) spectrum. Here, FIG. 22B shows an XRD spectrum, which is obtained by GIXD (Grazing-Incidence XRD) measurement, of a CAAC-IGZO film classified into "Crystalline". Note that a GIXD method is also referred to as a thin film method or a Seemann-Bohlin method. The XRD spectrum that is shown in FIG. 22B and obtained by GIXD measurement is hereinafter simply referred to as an XRD spectrum. The CAAC-IGZO film shown in FIG. 22B has a composition in the neighborhood of In:Ga:Zn=4:2:3 [atomic ratio]. The CAAC-IGZO film shown in FIG. 22B has a thickness of 500 nm.

As shown in FIG. 22B, a clear peak indicating crystallinity is detected in the XRD spectrum of the CAAC-IGZO film. Specifically, a peak indicating c-axis alignment is detected at 2θ of around 31° in the XRD spectrum of the CAAC-IGZO film. As shown in FIG. 22B, the peak at 2θ of around 31° is asymmetric with respect to the axis of the angle at which the peak intensity is detected.

A crystal structure of a film or a substrate can also be evaluated with a diffraction pattern obtained by a nanobeam electron diffraction (NBED) method (such a pattern is also referred to as a nanobeam electron diffraction pattern). FIG. 22C shows a diffraction pattern of the CAAC-IGZO film. FIG. 22C shows a diffraction pattern obtained with NBED in which an electron beam is incident in the direction parallel to the substrate. The CAAC-IGZO film in FIG. 22C has a composition in the neighborhood of In:Ga:Zn=4:2:3 [atomic ratio]. In the nanobeam electron diffraction method, electron diffraction is performed with a probe diameter of 1 nm.

As shown in FIG. 22C, a plurality of spots indicating c-axis alignment are observed in the diffraction pattern of the CAAC-IGZO film.

<<Structure of Oxide Semiconductor>>

Oxide semiconductors might be classified in a manner different from that in FIG. 22A when classified in terms of the crystal structure. Oxide semiconductors are classified into a single crystal oxide semiconductor and a non-single-crystal oxide semiconductor, for example. Examples of the non-single-crystal oxide semiconductor include the above-described CAAC-OS and nc-OS. Other examples of the non-single-crystal oxide semiconductor include a polycrystalline oxide semiconductor, an amorphous-like oxide semiconductor (a-like OS), and an amorphous oxide semiconductor.

Here, the above-described CAAC-OS, nc-OS, and a-like OS are described in detail.

[CAAC-OS]

The CAAC-OS is an oxide semiconductor that has a plurality of crystal regions each of which has c-axis alignment in a particular direction. Note that the particular direction refers to the film thickness direction of a CAAC-OS film, the normal direction of the surface where the CAAC-OS film is formed, or the normal direction of the surface of the CAAC-OS film. The crystal region refers to a region having a periodic atomic arrangement. When an atomic arrangement is regarded as a lattice arrangement, the crystal region also refers to a region with a uniform lattice arrangement. The CAAC-OS has a region where a plurality of crystal regions are connected in the a-b plane direction, and the region has distortion in some cases. Note that the distortion refers to a portion where the direction of a lattice arrangement changes between a region with a uniform lattice arrangement and another region with a uniform lattice arrangement in a region where a plurality of crystal regions are connected. That is, the CAAC-OS is an oxide semiconductor having c-axis alignment and having no clear alignment in the a-b plane direction.

Note that each of the plurality of crystal regions is formed of one or more fine crystals (crystals each of which has a maximum diameter of less than 10 nm). In the case where the crystal region is formed of one fine crystal, the maximum diameter of the crystal region is less than 10 nm. In the case where the crystal region is formed of a large number of fine crystals, the size of the crystal region may be approximately several tens of nanometers.

In the case of an In-M-Zn oxide (the element M is one kind or two or more kinds selected from aluminum, gallium, yttrium, tin, titanium, and the like), the CAAC-OS tends to have a layered crystal structure (also referred to as a layered structure) in which a layer containing indium (In) and oxygen (hereinafter, an In layer) and a layer containing the element M, zinc (Zn), and oxygen (hereinafter, an (M,Zn) layer) are stacked. Indium and the element M can be replaced with each other. Therefore, indium may be contained in the (M,Zn) layer. In addition, the element M may be contained in the In layer. Note that Zn may be contained in the In layer. Such a layered structure is observed as a lattice image in a high-resolution TEM image, for example.

When the CAAC-OS film is subjected to structural analysis by out-of-plane XRD measurement with an XRD apparatus using θ/2θ scanning, for example, a peak indicating c-axis alignment is detected at 2θ of 31° or around 31°. Note that the position of the peak indicating c-axis alignment (the value of 2θ) may change depending on the kind, composition, or the like of the metal element contained in the CAAC-OS.

For example, a plurality of bright spots are observed in the electron diffraction pattern of the CAAC-OS film. Note that one spot and another spot are observed point-symmetrically with a spot of the incident electron beam passing through a sample (also referred to as a direct spot) as the symmetric center.

When the crystal region is observed from the particular direction, a lattice arrangement in the crystal region is basically a hexagonal lattice arrangement; however, a unit lattice is not always a regular hexagon and is a non-regular hexagon in some cases. A pentagonal lattice arrangement, a heptagonal lattice arrangement, and the like are included in the distortion in some cases. Note that a clear grain boundary cannot be observed even in the vicinity of the distortion in the CAAC-OS. That is, formation of a crystal grain boundary is inhibited by the distortion of lattice arrangement. This is probably because the CAAC-OS can tolerate distortion owing to a low density of arrangement of oxygen atoms in the a-b plane direction, an interatomic bond distance changed by substitution of a metal atom, and the like.

A crystal structure in which a clear grain boundary is observed is what is called polycrystal. It is highly probable that the grain boundary becomes a recombination center and captures carriers and thus decreases the on-state current and field-effect mobility of a transistor, for example. Thus, the CAAC-OS in which no clear grain boundary is observed is one of crystalline oxides having a crystal structure suitable for a semiconductor layer of a transistor. Note that Zn is preferably contained to form the CAAC-OS. For example, an In—Zn oxide and an In—Ga—Zn oxide are suitable because they can inhibit generation of a grain boundary as compared with an In oxide.

The CAAC-OS is an oxide semiconductor with high crystallinity in which no clear grain boundary is observed. Thus, in the CAAC-OS, a reduction in electron mobility due to the grain boundary is unlikely to occur. Moreover, since the crystallinity of an oxide semiconductor might be decreased by entry of impurities, formation of defects, or the like, the CAAC-OS can be regarded as an oxide semiconductor that has small amounts of impurities and defects (e.g., oxygen vacancies). Thus, an oxide semiconductor including the CAAC-OS is physically stable. Therefore, the oxide semiconductor including the CAAC-OS is resistant to heat and has high reliability. In addition, the CAAC-OS is stable with respect to high temperature in the manufacturing process (what is called thermal budget). Accordingly, the use of the CAAC-OS for the OS transistor can extend the degree of freedom of the manufacturing process.

[nc-OS]

In the nc-OS, a microscopic region (e.g., a region with a size greater than or equal to 1 nm and less than or equal to 10 nm, in particular, a region with a size greater than or equal to 1 nm and less than or equal to 3 nm) has a periodic atomic arrangement. In other words, the nc-OS includes a fine crystal. Note that the size of the fine crystal is, for example, greater than or equal to 1 nm and less than or equal to 10 nm, particularly greater than or equal to 1 nm and less than or equal to 3 nm; thus, the fine crystal is also referred to as a nanocrystal. Furthermore, there is no regularity of crystal orientation between different nanocrystals in the nc-OS. Thus, the orientation in the whole film is not observed. Accordingly, the nc-OS cannot be distinguished from an a-like OS or an amorphous oxide semiconductor with some analysis methods. For example, when an nc-OS film is subjected to structural analysis using out-of-plane XRD measurement with an XRD apparatus using θ/2θ scanning, a peak indicating crystallinity is not detected. Furthermore, a diffraction pattern like a halo pattern is observed when the nc-OS film is subjected to electron diffraction (also referred to as selected-area electron diffraction) using an electron beam with a probe diameter larger than the diameter of a nanocrystal (e.g., larger than or equal to 50 nm). Meanwhile, in some cases, a plurality of spots in a ring-like region with a direct spot as the center are observed in the obtained electron diffraction pattern when the nc-OS film is subjected to electron diffraction (also referred to as nanobeam electron diffraction) using an electron beam with a probe diameter nearly equal to or smaller than the diameter of a nanocrystal (e.g., 1 nm or larger and 30 nm or smaller).

[a-like OS]

The a-like OS is an oxide semiconductor having a structure between those of the nc-OS and the amorphous oxide semiconductor. The a-like OS includes a void or a low-density region. That is, the a-like OS has low crystallinity as compared with the nc-OS and the CAAC-OS. Moreover, the a-like OS has a higher hydrogen concentration in the film than the nc-OS and the CAAC-OS.

<<Structure of Oxide Semiconductor>>

Next, the above-described CAC-OS is described in detail. Note that the CAC-OS relates to the material composition.

[CAC-OS]

The CAC-OS refers to one composition of a material in which elements constituting a metal oxide are unevenly distributed with a size greater than or equal to 0.5 nm and less than or equal to 10 nm, preferably greater than or equal to 1 nm and less than or equal to 3 nm, or a similar size, for example. Note that a state in which one or more metal elements are unevenly distributed and regions including the metal element(s) are mixed with a size greater than or equal to 0.5 nm and less than or equal to 10 nm, preferably greater than or equal to 1 nm and less than or equal to 3 nm, or a similar size in a metal oxide is hereinafter referred to as a mosaic pattern or a patch-like pattern.

In addition, the CAC-OS has a composition in which materials are separated into a first region and a second region to form a mosaic pattern, and the first regions are distributed in the film (this composition is hereinafter also referred to as a cloud-like composition). That is, the CAC-OS is a composite metal oxide having a composition in which the first regions and the second regions are mixed.

Note that the atomic ratios of In, Ga, and Zn to the metal elements contained in the CAC-OS in an In—Ga—Zn oxide are denoted with [In], [Ga], and [Zn], respectively. For example, the first region in the CAC-OS in the In—Ga—Zn oxide has [In] higher than that in the composition of the CAC-OS film. Moreover, the second region has [Ga] higher than that in the composition of the CAC-OS film. For example, the first region has higher [In] and lower [Ga] than the second region. Moreover, the second region has higher [Ga] and lower [In] than the first region.

Specifically, the first region includes indium oxide, indium zinc oxide, or the like as its main component. The second region includes gallium oxide, gallium zinc oxide, or the like as its main component. That is, the first region can be referred to as a region containing In as its main component. The second region can be referred to as a region containing Ga as its main component.

Note that a clear boundary between the first region and the second region cannot be observed in some cases.

For example, energy dispersive X-ray spectroscopy (EDX) is used to obtain EDX mapping, and according to the EDX mapping, the CAC-OS in the In—Ga—Zn oxide has a structure in which the region containing In as its main component (the first region) and the region containing Ga as its main component (the second region) are unevenly distributed and mixed.

In the case where the CAC-OS is used for a transistor, a switching function (on/off switching function) can be given to the CAC-OS owing to the complementary action of the conductivity derived from the first region and the insulating property derived from the second region. The CAC-OS has a conducting function in part of the material and has an insulating function in another part of the material; as a whole, the CAC-OS has a function of a semiconductor. Separation of the conducting function and the insulating function can maximize each function. Accordingly, when the CAC-OS is used for a transistor, high on-state current (Ion), high field-effect mobility ($\mu$), and excellent switching operation can be achieved.

An oxide semiconductor has various structures with different properties. Two or more kinds among the amorphous oxide semiconductor, the polycrystalline oxide semiconductor, the a-like OS, the CAC-OS, the nc-OS, and the CAAC-OS may be included in an oxide semiconductor of one embodiment of the present invention.

<Transistor Including Oxide Semiconductor>

Next, the case where the above oxide semiconductor is used for a transistor is described.

When the above oxide semiconductor is used for a transistor, a transistor with high field-effect mobility can be achieved. In addition, a transistor having high reliability can be fabricated.

An oxide semiconductor with a low carrier concentration is preferably used for the transistor. For example, the carrier concentration of an oxide semiconductor is lower than or equal to $1\times10^{17}$ cm$^{-3}$, preferably lower than or equal to $1\times10^{15}$ cm$^{-3}$, further preferably lower than or equal to $1\times10^{13}$ cm$^{-3}$, still further preferably lower than or equal to $1\times10^{11}$ cm$^{-3}$, yet further preferably lower than $1\times10^{10}$ cm$^{-3}$, and higher than or equal to $1\times10^{-9}$ cm$^{-3}$. In order to reduce the carrier concentration of an oxide semiconductor film, the impurity concentration in the oxide semiconductor film is reduced so that the density of defect states can be reduced. In this specification and the like, a state with a low impurity concentration and a low density of defect states is referred to as a highly purified intrinsic or substantially highly purified intrinsic state. Note that an oxide semiconductor having a low carrier concentration may be referred to as a highly purified intrinsic or substantially highly purified intrinsic oxide semiconductor.

A highly purified intrinsic or substantially highly purified intrinsic oxide semiconductor film has a low density of defect states and thus has a low density of trap states in some cases.

Electric charge trapped by the trap states in the oxide semiconductor takes a long time to disappear and might behave like fixed electric charge. Thus, a transistor whose channel formation region is formed in an oxide semiconductor with a high density of trap states has unstable electrical characteristics in some cases.

Accordingly, in order to obtain stable electrical characteristics of a transistor, reducing the impurity concentration in an oxide semiconductor is effective. In order to reduce the impurity concentration in the oxide semiconductor, it is preferable that the impurity concentration in an adjacent film be also reduced. Examples of impurities include hydrogen, nitrogen, an alkali metal, an alkaline earth metal, iron, nickel, and silicon.

<Impurity>

Here, the influence of each impurity in the oxide semiconductor is described.

When silicon or carbon, which is one of Group 14 elements, is contained in the oxide semiconductor, defect states are formed in the oxide semiconductor. Thus, the concentration of silicon or carbon in the oxide semiconductor and the concentration of silicon or carbon in the vicinity of an interface with the oxide semiconductor (the concentration obtained by secondary ion mass spectrometry (SIMS)) are each set lower than or equal to $2\times10^{18}$ atoms/cm$^3$, preferably lower than or equal to $2\times10^{17}$ atoms/cm$^3$.

When the oxide semiconductor contains an alkali metal or an alkaline earth metal, defect states are formed and carriers are generated in some cases. Thus, a transistor using an oxide semiconductor that contains an alkali metal or an alkaline earth metal is likely to have normally-on characteristics. Thus, the concentration of an alkali metal or an alkaline earth metal in the oxide semiconductor, which is obtained using SIMS, is lower than or equal to $1\times10^{18}$ atoms/cm$^3$, preferably lower than or equal to $2\times10^{16}$ atoms/cm$^3$.

Furthermore, when the oxide semiconductor contains nitrogen, the oxide semiconductor easily becomes n-type because of generation of electrons serving as carriers and an increase in carrier concentration. As a result, a transistor using an oxide semiconductor containing nitrogen as a semiconductor is likely to have normally-on characteristics. When nitrogen is contained in the oxide semiconductor, a trap state is sometimes formed. This might make the electrical characteristics of the transistor unstable. Therefore, the concentration of nitrogen in the oxide semiconductor, which is obtained using SIMS, is set lower than $5\times10^{19}$ atoms/cm$^3$, preferably lower than or equal to $5\times10^{18}$ atoms/cm$^3$, further preferably lower than or equal to $1\times10^{18}$ atoms/cm$^3$, still further preferably lower than or equal to $5\times10^{17}$ atoms/cm$^3$.

Hydrogen contained in the oxide semiconductor reacts with oxygen bonded to a metal atom to be water, and thus forms an oxygen vacancy in some cases. Entry of hydrogen into the oxygen vacancy generates an electron serving as a carrier in some cases. Furthermore, bonding of part of hydrogen to oxygen bonded to a metal atom causes generation of an electron serving as a carrier in some cases. Thus, a transistor using an oxide semiconductor containing hydrogen is likely to have normally-on characteristics. Accordingly, hydrogen in the oxide semiconductor is preferably reduced as much as possible. Specifically, the hydrogen concentration in the oxide semiconductor, which is obtained using SIMS, is set lower than $1\times10^{20}$ atoms/cm$^3$, preferably lower than $1\times10^{19}$ atoms/cm$^3$, further preferably lower than $5\times10^{18}$ atoms/cm$^3$, still further preferably lower than $1\times10^{18}$ atoms/cm$^3$.

When an oxide semiconductor with sufficiently reduced impurities is used for the channel formation region of the transistor, stable electrical characteristics can be given.

The composition, structure, method, and the like described in this embodiment can be used in combination as appropriate with the compositions, structures, methods, and the like described in the other embodiments, Example, and the like.

Embodiment 4

In this embodiment, application examples of the above-described semiconductor device are described.

[Semiconductor Wafer and Chip]

Figure 23A:
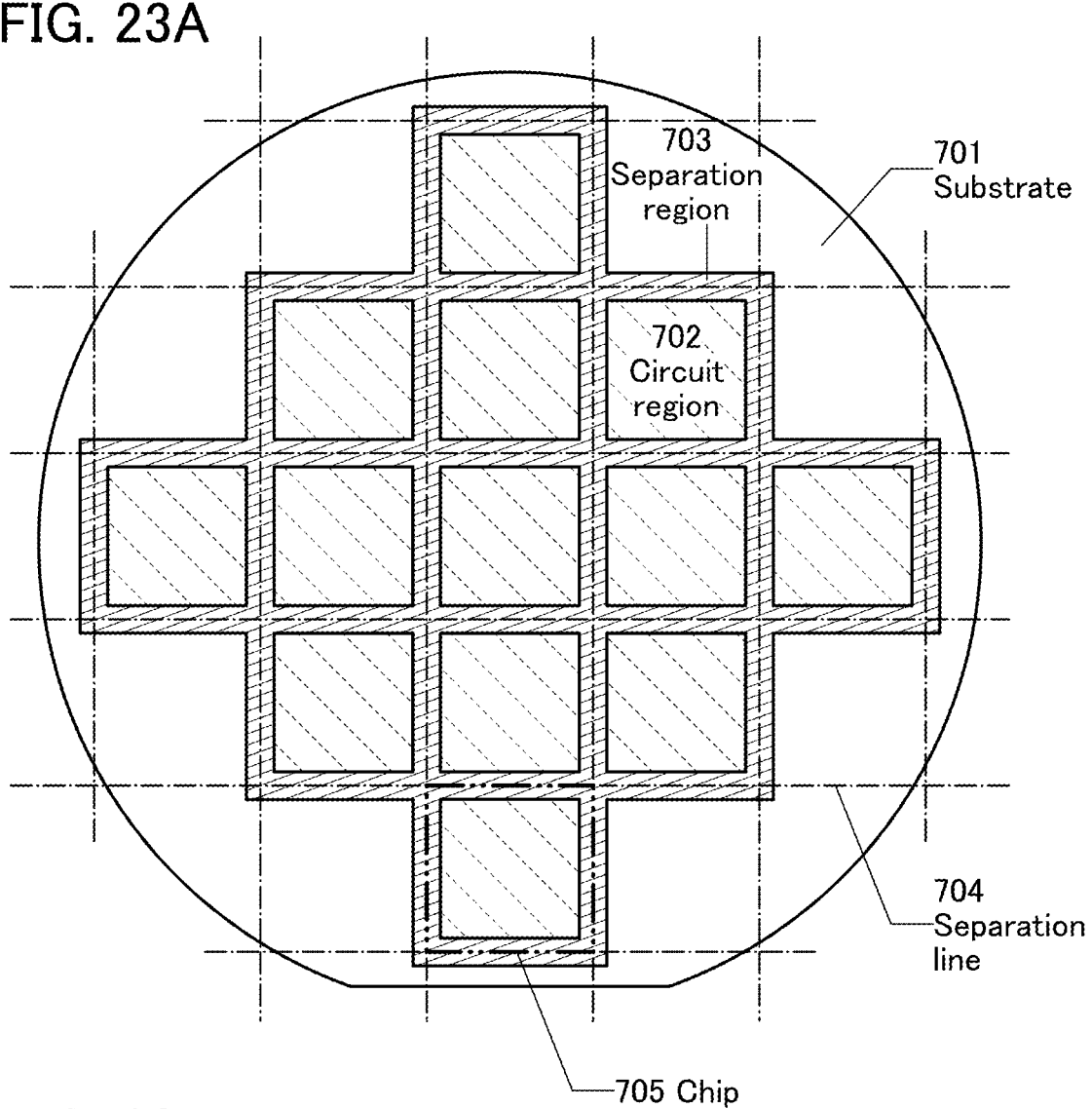
FIG. 23A is a top view of a semiconductor wafer.

FIG. 23A is a top view of a substrate 701 before dicing treatment. As the substrate 701, a semiconductor substrate (also referred to as a "semiconductor wafer") can be used, for example. A plurality of circuit regions 702 are provided over the substrate 701. A semiconductor device, a CPU, an RF tag, an image sensor, or the like of one embodiment of the present invention can be provided in the circuit region 702.

Figure 23B:
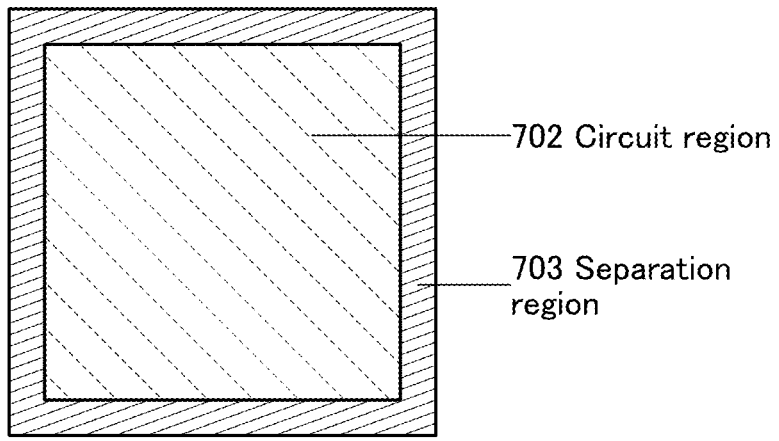
FIG. 23B is a top view of a chip.

The plurality of circuit regions 702 are each surrounded by a separation region 703. Separation lines (also referred to as "dicing lines") 704 are set at a position overlapping with the separation region 703. The substrate 701 can be cut along the separation lines 704 into chips 705 including the circuit regions 702. FIG. 23B is an enlarged view of the chip 705.

A conductive layer or a semiconductor layer may be provided in the separation region 703. Providing a conductive layer or a semiconductor layer in the separation region 703 relieves ESD that might be caused in a dicing step, preventing a decrease in the yield of the dicing step. A dicing step is generally performed while pure water whose specific resistance is decreased by dissolution of a carbonic acid gas or the like is supplied to a cut portion, in order to cool down a substrate, remove swarf, and prevent electrification, for example. Providing a conductive layer or a semiconductor layer in the separation region 703 allows a reduction in the usage of the pure water. Therefore, the cost of manufacturing semiconductor devices can be reduced. Moreover, semiconductor devices can be manufactured with improved productivity.

For a semiconductor layer provided in the separation region 703, a material having a band gap of 2.5 eV or more and 4.2 eV or less, preferably 2.7 eV or more and 3.5 eV or less is preferably used. The use of such a material allows accumulated charges to be released slowly; thus, the rapid move of charges due to ESD can be suppressed and electrostatic breakdown is less likely to occur.

[Electronic Component]

Figure 24A:
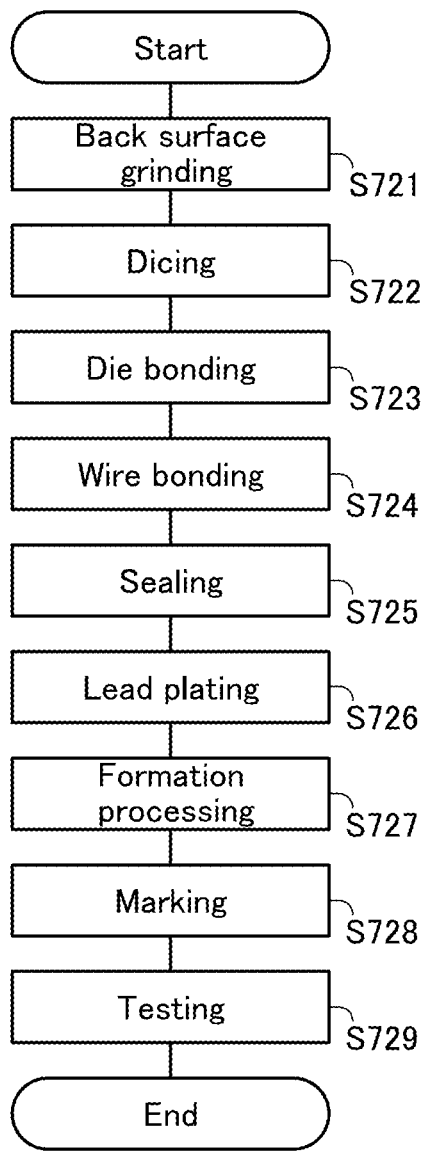
FIG. 24A is a flow chart showing an example of a process for manufacturing an electronic component.

An example in which the chip 705 is used in an electronic component is described with reference to FIG. 24A and FIG. 24B. Note that the electronic component is also referred to as a semiconductor package or an IC package. This electronic component has a plurality of standards and names depending on a terminal extraction direction and a terminal shape.

The electronic component is completed when the semiconductor device described in the above embodiment is combined with components other than the semiconductor device in an assembly process (post-process).

The post-process is described with reference to a flow chart shown in FIG. 24A. After an element substrate including the semiconductor device described in the above embodiment is completed in a pre-process, a "back surface grinding step" in which a back surface (a surface where a semiconductor device and the like are not formed) of the element substrate is ground is performed (Step S721). When the element substrate is thinned by grinding, warpage or the like of the element substrate is reduced, so that the size of the electronic component can be reduced.

Next, the element substrate is divided into a plurality of chips (chips 705) in a "dicing step" (Step S722). Then, the divided chips are separately picked up to be bonded to a lead frame in a "die bonding step" (Step S723). To bond a chip and a lead frame in the die bonding step, a method such as resin bonding or bonding with a tape is selected as appropriate depending on products. Note that the chip may be bonded to an interposer substrate instead of the lead frame.

Next, a "wire bonding step" of electrically connecting a lead of the lead frame and an electrode on the chip through a metal fine line (wire) is performed (Step S724). A silver line or a gold line can be used as the metal fine line. Ball bonding or wedge bonding can be used as the wire bonding.

The wire-bonded chip is subjected to a "sealing step (molding step)" of sealing the chip with an epoxy resin or the like (Step S725). Through the sealing step, the inside of the electronic component is filled with a resin, so that a circuit portion incorporated in the chip and a wire for connecting the chip to the lead can be protected from external mechanical force, and deterioration of characteristics (a decrease in reliability) due to moisture or dust can be reduced.

Subsequently, the lead of the lead frame is plated in a "lead plating step" (Step S726). This plating process prevents rust of the lead and enables more reliable soldering at the time of mounting the electronic component on a printed circuit board in a later step. Then, the lead is cut and processed in a "formation step" (Step S727).

Next, a "printing (marking) step" is performed on a surface of the package (Step S728). After a "testing step" (Step S729) for checking whether an external shape is good and whether there is a malfunction, for example, the electronic component is completed.

Figure 24B:
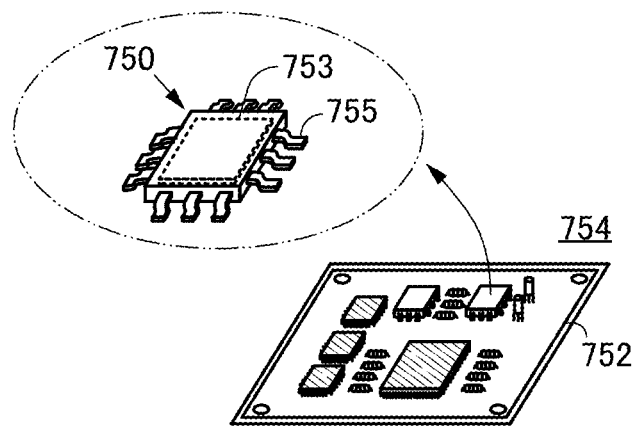
FIG. 24B is a schematic perspective view of an electronic component.

FIG. 24B is a schematic perspective view of a completed electronic component. FIG. 24B is a schematic perspective view illustrating a quad flat package (QFP) as an example of the electronic component. In an electronic component 750 in FIG. 24B, a lead 755 and a semiconductor device 753 are shown. As the semiconductor device 753, the semiconductor device described in the above embodiment, or the like, can be used.

The electronic component 750 shown in FIG. 24B is mounted on a printed circuit board 752, for example. A plurality of electronic components 750 are combined and electrically connected to each other over the printed circuit board 752; thus, a substrate on which the electronic components are mounted (a circuit board 754) is completed. The completed circuit board 754 is used in an electronic device or the like.

The composition, structure, method, and the like described in this embodiment can be used in combination as appropriate with the compositions, structures, methods, and the like described in the other embodiments, Example, and the like.

Embodiment 5

In this embodiment, application examples of embodiments of the present invention are described.

One embodiment of the present invention can be applied to, for example, a variety of electronic devices (e.g., information terminals, computers, smartphones, e-book readers, digital still cameras, video cameras, video recording/reproducing devices, navigation systems, and game machines). One embodiment of the present invention can also be applied to image sensors, IoT (Internet of Things) terminal devices, healthcare devices, and the like. Here, computers refer not only to tablet computers, laptop computers, and desktop computers, but also to large computers such as server systems.

Examples of electronic devices in which the control device of one embodiment of the present invention is used are described below.

Figure 25A:
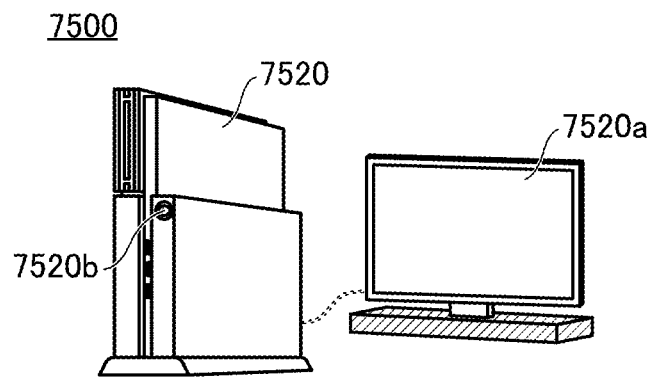
FIG. 25A is a diagram illustrating an application example of one embodiment of the present invention.

FIG. 25A illustrates an example of a stationary home game console. The electronic device of one embodiment of the present invention is not limited thereto. Examples of the electronic device of one embodiment of the present invention include an arcade game machine installed in an entertainment facility (e.g., a game center and an amusement park) and a throwing machine for batting practice, installed in sports facilities.

A stationary game console 7500 illustrated in FIG. 25A includes a controller 7522 and a main body 7520.

As the controller 7522, the control device of one embodiment of the present invention can be used; for example, the control device 700 described in the above embodiment can be used. The controller 7522 includes a semiconductor chip 4700 on which a processing unit and the like are mounted. As the processing unit mounted on the semiconductor chip 4700, the processing unit 21 described in the above embodiment can be used, for example.

The control device includes an input unit. As the input unit, the input unit 301 and the input unit 301b described in the above embodiment can be used, for example. The control device includes, as the input unit, a sensor chip 4701 on which one or more selected from an acceleration sensor, an angular velocity sensor, and a magnetic sensor are mounted, for example. The control device includes a button 7522b as the input unit, for example.

As the main body 7520, the data processing unit of one embodiment of the present invention can be used; for example, the data processing unit 799 described in the above embodiment can be used. The main body 7520 illustrated in FIG. 25A can transmit image data to a display unit 7520a so that an image can be displayed.

Figure 25B:
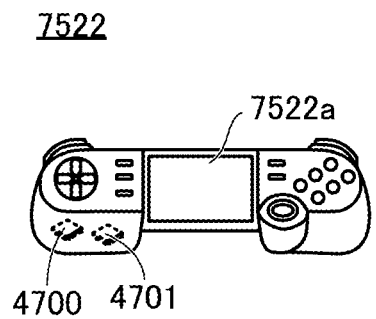
FIG. 25B is a diagram illustrating an application example of one embodiment of the present invention.

The controller 7522 may include a display unit 7522a as illustrated in FIG. 25B. The display unit 7522a may include a region functioning as a touch sensor.

The main body 7520 may include a camera 7520b. The camera 7520b can shoot an image of the controller 7522 and its surrounding environment.

Although FIG. 25A illustrates the example where the main body 7520 includes the data processing unit, the controller 7522 may incorporate the data processing unit. For example, in the case where the controller 7522 in FIG. 25B incorporates the data processing unit, image data is transmitted from the data processing unit to the display unit 7522a. Incorporating the data processing unit, the controller 7522 can serve as a portable game console.

The controller 7522 can also include, as an input unit, an input interface besides a button, such as a touch panel, a stick, a rotating knob, and a sliding knob. The shape of the controller 7522 is not limited to that in FIG. 25A and the like, and the shape of the controller 7522 may be changed variously in accordance with the genres of games. For example, in a shooting game such as an FPS (First Person Shooter) game, a gun-shaped controller having a trigger button can be used. For another example, in a music game or the like, a controller having a shape of a musical instrument, audio equipment, or the like can be used. Furthermore, the stationary game machine may include a camera, a depth sensor, a microphone, and the like so that the game player can play a game using a gesture and/or a voice instead of a controller.

Figure 25C:
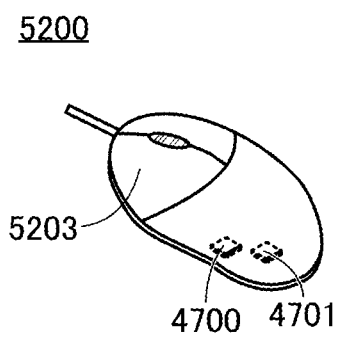
FIG. 25C is a diagram illustrating an application example of one embodiment of the present invention.

As illustrated in FIG. 25C, a mouse 5200 may be used as a controller of the game console. The mouse 5200 can move a position and transmit a signal of moving distance or moving direction to the main body 7520 and the like. The mouse 5200 includes a button 5203 functioning as an input unit, and the like. The mouse 5200 includes the semiconductor chip 4700 and the sensor chip 4701, for example. When the tilt of the mouse 5200 is changed, the sensor chip 4701 detects a change in the tilt and transmits a signal to the main body 7520.

Figure 25D:
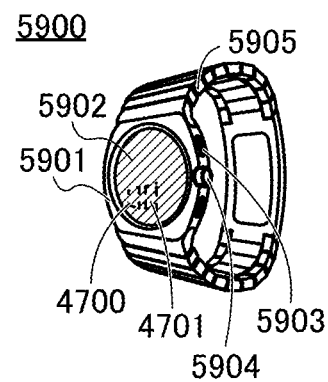
FIG. 25D is a diagram illustrating an application example of one embodiment of the present invention.

FIG. 25D illustrates an information terminal 5900 as an example of a wearable terminal. The information terminal 5900 can be used instead of the controller 7522 illustrated in FIG. 25A. The information terminal 5900 includes a housing 5901, a band 5905, and the like. The control device and the data processing unit are provided in the housing 5901.

FIG. 25D illustrates the semiconductor chip 4700 and the sensor chip 4701 provided inside the housing 5901, as an example of a structure of the control device. The information terminal 5900 is a wearable terminal; a user can wear it and thus can easily perform actions such as moving the position and changing the tilt. Furthermore, damage due to a drop can be prevented.

Furthermore, the information terminal 5900 includes, as input units, an operation switch 5903 and an operation switch 5904. The information terminal 5900 also includes a display unit 5902. Provided with a region functioning as a touch sensor, the display unit can function as an input unit. A variety of images can be displayed on the display unit; for example, the display unit can display an input screen of setting used for a game, set values used for the game, and the like. Image data may be generated using data detected by sensors included in the input unit and displayed on the display unit.

The composition, structure, method, and the like described in this embodiment can be used in combination as appropriate with the compositions, structures, methods, and the like described in the other embodiments, Example, and the like.

Embodiment 6

Figure 26A:
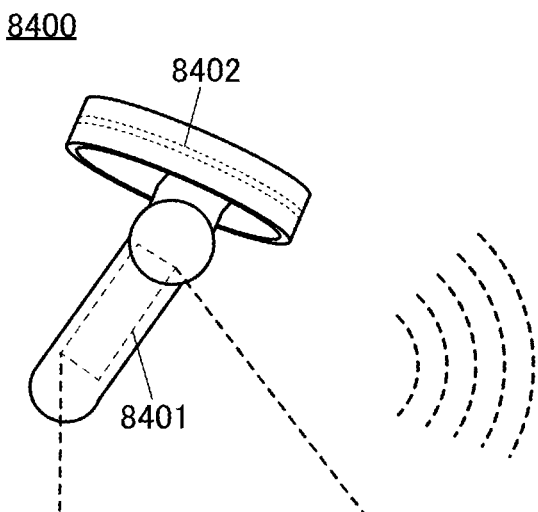
FIG. 26A is a diagram illustrating an example of a controller.
Figure 26B:
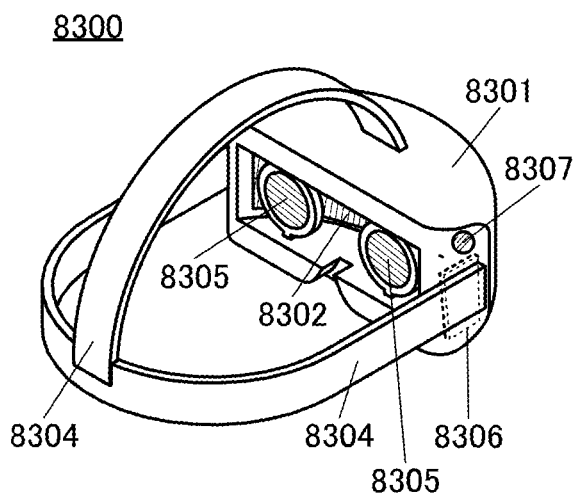
FIG. 26B is a diagram illustrating an example of a head-mounted display.

FIG. 26A illustrates the appearance of a controller 8400 to which the control device of one embodiment of the present invention is applied. FIG. 26B illustrates the appearance of a head-mounted display 8300. The controller 8400 has a function of supplying a control signal to the head-mounted display 8300. FIG. 26D and FIG. 26E are views of the head-mounted display 8300 in FIG. 26B seen from different directions.

The controller 8400 has a function of transmitting and receiving a signal to/from the head-mounted display 8300. The controller 8400 preferably has a function of wirelessly communicating with the head-mounted display 8300.

The controller 8400 includes a housing, a circuit board 8401, and a light-emitting device 8402. At least part of each of the circuit board 8401 and the light-emitting device 8402 is positioned inside the housing.

The light-emitting device 8402 is a device that emits electromagnetic waves, for example. The light-emitting device 8402 has a function of emitting one or more selected from visible light, infrared light, ultraviolet light, and radio waves, for example. As the light-emitting device 8402, a device that emits sound waves may be used.

Figure 26C:
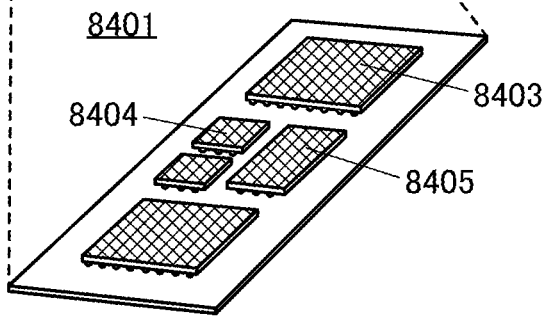
FIG. 26C is a diagram illustrating a structure of one embodiment of the present invention.
Figure 26D:
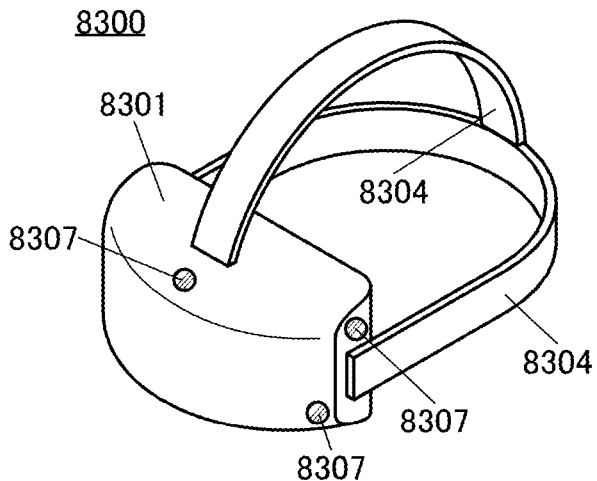
FIG. 26D and FIG. 26E are diagrams illustrating an example of a head-mounted display.
Figure 26E:
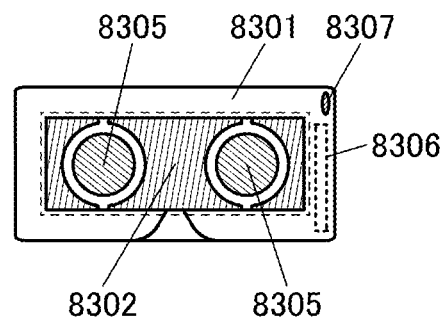

The circuit board 8401 illustrated in FIG. 26C includes a chip 8403 including a processing unit and a chip 8404 including a control unit.

The control unit of the chip 8404 has a function of controlling the light-emitting device 8402. The chip 8404 controls the emission period of electromagnetic waves from the light-emitting device 8402, the intensity of electromagnetic waves, and the like, for example.

The circuit board 8401 also includes an input unit 8405. For the input unit 8405 and components of the input unit, the description of the above embodiment can be referred to, and the input unit 8405 includes a sensor element, a sensing unit, and a determination circuit, for example.

The input unit 8405 includes one or more selected from an acceleration sensor, an angular velocity sensor, and a magnetic sensor. The controller 8400 has a function of acquiring position data with the use of one or more selected from an acceleration sensor, an angular velocity sensor, and a magnetic sensor included in the input unit 8405.

For the processing unit included in the chip 8403, the processing unit described in the above embodiment can be referred to. As described in the above embodiment, the processing unit conforms to a variety of developed communication standards, for example. With the processing unit described in the above embodiment, the controller 8400 can be brought into a resting state when a user suspends the use of the controller 8400, when there is no motion or little motion of the controller 8400, or when no input to the controller 8400 is detected, for example. Thus, power consumption can be significantly reduced.

Next, the head-mounted display of one embodiment of the present invention is described with reference to FIG. 26B, FIG. 26D, and FIG. 26E. The head-mounted display 8300 includes a housing 8301, a display unit 8302, a band-shaped fixing unit 8304, and a pair of lenses 8305.

As illustrated in FIG. 26B, FIG. 26D, and FIG. 26E, the head-mounted display 8300 preferably includes a circuit unit 8306 and an imaging device 8307.

The circuit unit 8306 includes a driver circuit of the display unit 8302, for example. The driver circuit has a function of supplying image data to the display unit 8302, a function of supplying a control signal to the display unit 8302, and the like.

The circuit unit 8306 preferably includes a driver circuit of the imaging device 8307.

The head-mounted display 8300 preferably includes at least part of a structure included in the data processing unit described in the above embodiment. For example, the head-mounted display 8300 includes at least part of a structure of the processing unit described in the above embodiment.

The display unit 8302 included in the head-mounted display 8300 is supplied with image data (hereinafter referred to as image data A1). The image data A1 contains image data generated by the circuit unit 8306 included in the head-mounted display 8300 (hereinafter, image data B1) and data generated by the data processing unit (hereinafter, data C1). Alternatively, the image data B1 may be generated by an external circuit outside the head-mounted display 8300. The data C1 is data on the controller 8400, which is updated as needed when the user operates the controller 8400.

The image data B1 is combined with the data C1 updated as needed to generate the image data A1 and the image data A1 is displayed on the display unit 8302 of the head-mounted display 8300, whereby the head-mounted display 8300 can be used as a VR (Virtual Reality) device, an AR (Augmented Reality) device, an MR (Mixed Reality) device, or the like.

The head-mounted display 8300 may include an eye-gaze input device. In generating the image data A1, the data processing unit may use a signal detected by the eye-gaze input device in addition to the image data B1 and the data C1.

The eye-gaze input device can perform eye tracking. Eye tracking can be performed by sensing the iris or the pupil of a human. Eye tracking can also be performed by sensing the movement of eyeballs or eyelids. Furthermore, eye tracking can also be performed in such a manner that an electrode is provided so as to be in contact with a user and a current flowing through the electrode with the movement of the eyeballs is sensed.

The image data A1 and sound data can be combined with each other to generate video data. The display unit 8302 has a function of displaying the video data.

The head-mounted display 8300 preferably includes a sensor element having a function of receiving electromagnetic waves emitted from the light-emitting device 8402. Here, as a structure including a sensor element having a function of receiving electromagnetic waves emitted from the light-emitting device 8402, the imaging device 8307 can be used.

The imaging device 8307 has a function of receiving electromagnetic waves emitted from the light-emitting device 8402 included in the controller 8400. The user of the head-mounted display 8300 may use the controller 8400, moving it over a wide range. Even in such a case, when the imaging devices 8307 or the light-receiving units of the imaging device 8307 are provided at a plurality of positions over right, left, upper, and lower portions of the head-mounted display 8300 as illustrated in FIG. 26D, for example, an image of the surroundings of the user of the head-mounted display 8300 can be widely captured; thus, the head-mounted display 8300 can easily receive electromagnetic waves emitted from the light-emitting device 8402.

Data acquired by capturing an image by the imaging device 8307 of the head-mounted display 8300 is preferably analyzed using the data processing unit described in the above embodiment.

The data processing unit has a function of generating the data C1 with the use of the data acquired by capturing an image by the imaging device 8307. The data C1 is, for example, data on the position of the controller 8400, data on components such as an object displayed on the display unit 8302, or the like. In generating the data C1, the data processing unit preferably uses data acquired by the sensor element included in the controller 8400 in addition to the data acquired by capturing an image by the imaging device 8307. In addition to these data, data stored in a register, a storage device, or the like provided in the processing unit 21 included in the controller 8400 may also be used.

For generation of the data C1, the data processing unit can use an arithmetic circuit. The arithmetic circuit may be provided in the circuit unit 8306 or an external circuit outside the head-mounted display 8300.

In the head-mounted display 8300, a user can view display on the display unit 8302 through the lenses 8305. It is suitable that the display unit 8302 be curved and placed. When the display unit 8302 is curved and placed, a user can feel a high realistic sensation.

When the display unit is curved around an arc with an approximate center at the user's eye, a certain distance is kept between the user's eye to a display surface of the display unit, so that the user can view a more natural image. Even when the luminance or chromaticity of light from the display unit is changed depending on the angle at which the user sees it, since the user's eye is positioned in a normal direction of the display surface of the display unit, the influence of the change can be substantially negligible and thus a more realistic image can be displayed.

When another image displayed in a different region of the display unit 8302 is viewed through the lenses 8305, three-dimensional display using parallax or the like can also be performed.

Note that although the structure in which one display unit 8302 is provided is described as an example in this embodiment, the structure is not limited thereto, and a structure in which two display units 8302 are provided may also be employed. In that case, a user can see one display unit with one eye. Thus, a high-resolution image can be displayed even when a three-dimensional display using parallax or the like is performed.

A variety of display devices can be used for the display device included in the display unit 8302. The display unit 8302 having a high-resolution structure can display a more realistic image because even when an image is magnified using the lenses 8305 as shown in FIG. 26E, the user does not perceive pixels. For example, a display unit having a high resolution of 1000 ppi or more, 2000 ppi or more, or 5000 ppi or more is used.

In the case where an EL (electroluminescence) device (an EL device including an organic substance and an inorganic substance, an organic EL device, or an inorganic EL device) is used as the display device, the weight of the head-mounted display 8300 can be reduced; thus, the user can wear it comfortably. Furthermore, providing the EL device over a flexible substrate allows the display unit to be bendable.

Examples of the flexible substrate include plastics typified by polyethylene terephthalate (PET), polyethylene naphthalate (PEN), polyether sulfone (PES), and polytetrafluoroethylene (PTFE). Another example is a synthetic resin such as acrylic. Other examples include polypropylene, polyester, polyvinyl fluoride, and polyvinyl chloride. Other examples include polyamide, polyimide, aramid, an epoxy resin, an inorganic vapor deposition film, and paper. The use of such a substrate enables light weight and durability of the display unit.

The head-mounted display may include a speaker. The head-mounted display may include an audio output terminal for outputting sound to headphones, earphones, or the like.

It is preferable that a human body sensor such as a pulse sensor or a temperature sensor be provided in at least one of the head-mounted display 8300 and the controller 8400. The human body sensor allows determination of the user's condition; thus, an image, sound, video, or the like can be provided according to the user's condition.

Figure 27:
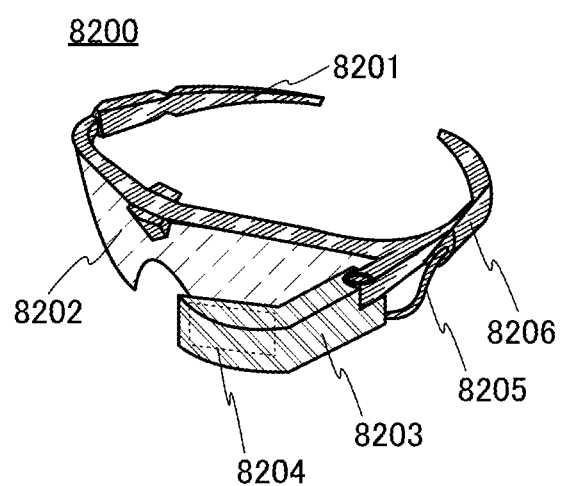
FIG. 27 is a diagram illustrating an example of a head-mounted display.

The head-mounted display 8200 illustrated in FIG. 27 includes a mounting portion 8201, a lens 8202, a main body 8203, a display unit 8204, a cable 8205, and the like. A battery 8206 is incorporated in the mounting portion 8201.

The cable 8205 supplies electric power from the battery 8206 to the main body 8203. The main body 8203 includes a wireless receiver or the like and can display an image, a video, or the like corresponding to the received image data, video data, or the like on the display unit 8204. The movement of the eyeballs and the eyelids of the user is captured by a camera provided in the main body 8203 and then the coordinates of the sight line of the user are calculated using the information to utilize the sight line of the user as an input means.

A plurality of electrodes may be provided in the mounting portion 8201 at a position in contact with the user. The main body 8203 may have a function of sensing a current flowing through the electrodes along with the movement of the user's eyeballs to recognize the user's sight line. The main body 8203 may have a function of sensing a current flowing through the electrodes to monitor the user's pulse. The mounting portion 8201 may include various sensors such as a temperature sensor, a pressure sensor, and an acceleration sensor to have a function of displaying the user's biological information on the display unit 8204. The main body 8203 may sense the movement of the user's head or the like to change an image and a video displayed on the display unit 8204 in synchronization with the movement.

The composition, structure, method, and the like described in this embodiment can be used in combination as appropriate with the compositions, structures, methods, and the like described in the other embodiments, Example, and the like. [Example 1]

Application examples of the control device of one embodiment of the present invention are described below.

Figure 28A:
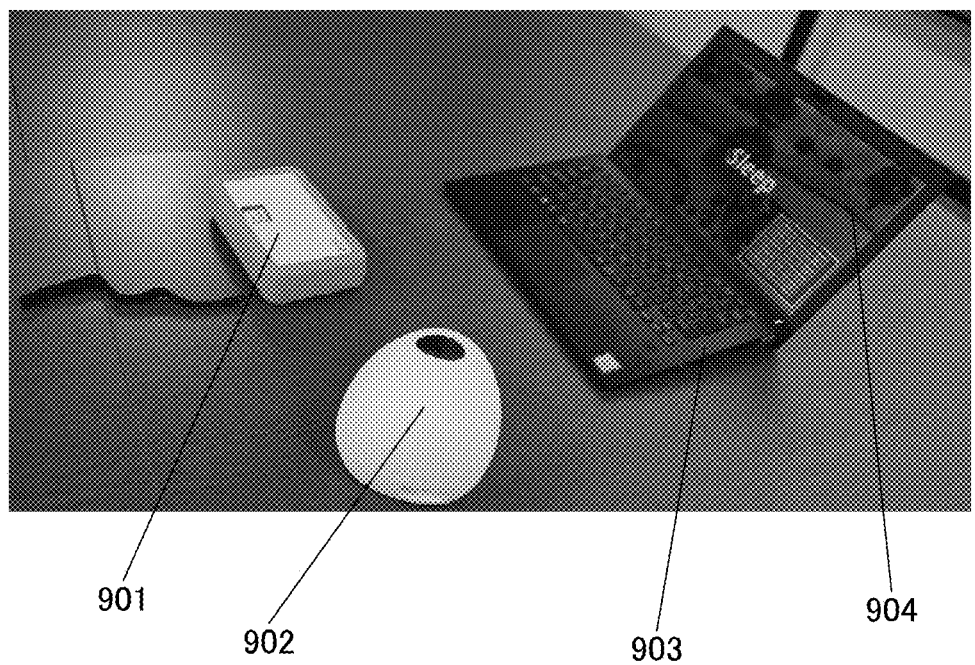
FIG. 28A is a view for describing Example.

FIG. 28A illustrates an example of a game system of one embodiment of the present invention. FIG. 28A illustrates a controller 901 and a controller 902 as a structure to which the control device of the above embodiment is applied. FIG. 28A illustrates a personal computer 903 as a structure to which the data processing unit of the above embodiment is applied. A monitor 904 displays an image signal supplied from the personal computer 903.

In FIG. 28A, the controller 901 and the controller 902 are not operated by a user, that is, they are in a resting state. At this time, a player object in a game screen displayed on the monitor 904 is also in a resting state.

Figure 28B:
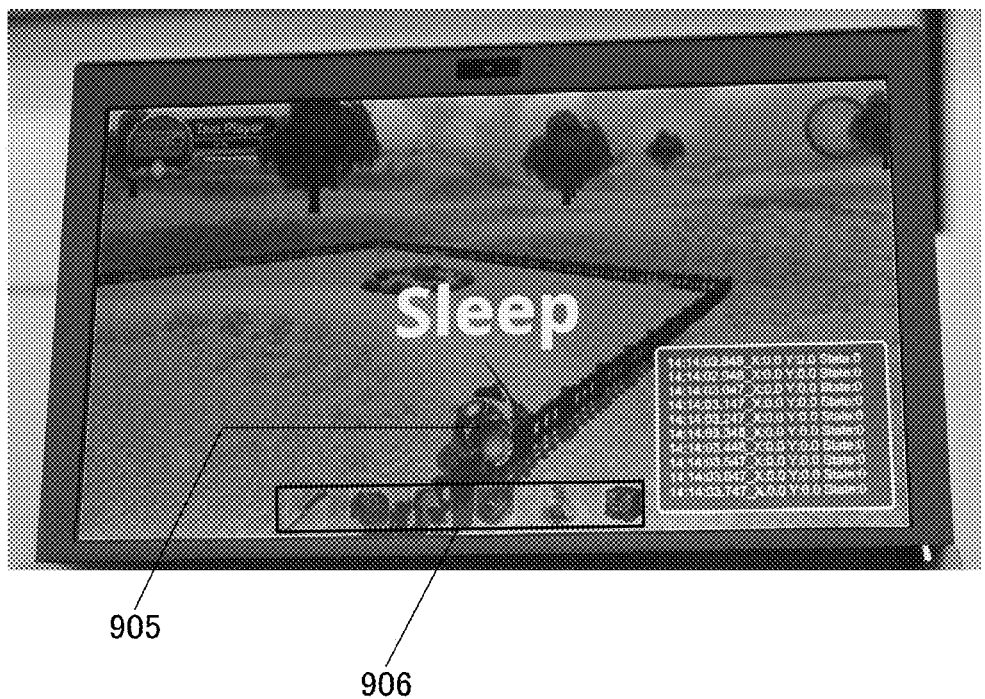
FIG. 28B is a view for describing Example.

FIG. 28B is an enlarged view showing the monitor 904 in a resting state. A player object 905 is in a resting state. Although only one player object is displayed in FIG. 28B, two objects, specifically, a player object corresponding to the controller 901 and a player object corresponding to the controller 902 can be placed in a virtual space displayed on the monitor 904.

The player object 905 is bearing equipment such as a weapon and an armor. An equipment list 906 is displayed on the monitor 904. Any of the items is selected from the equipment list 906, and data on whether to bear the equipment is stored in a storage device (e.g., a NOSRAM included in a processor unit 907 shown in FIG. 29A, which is described later) included in the controller for the corresponding player object.

Figure 29A:
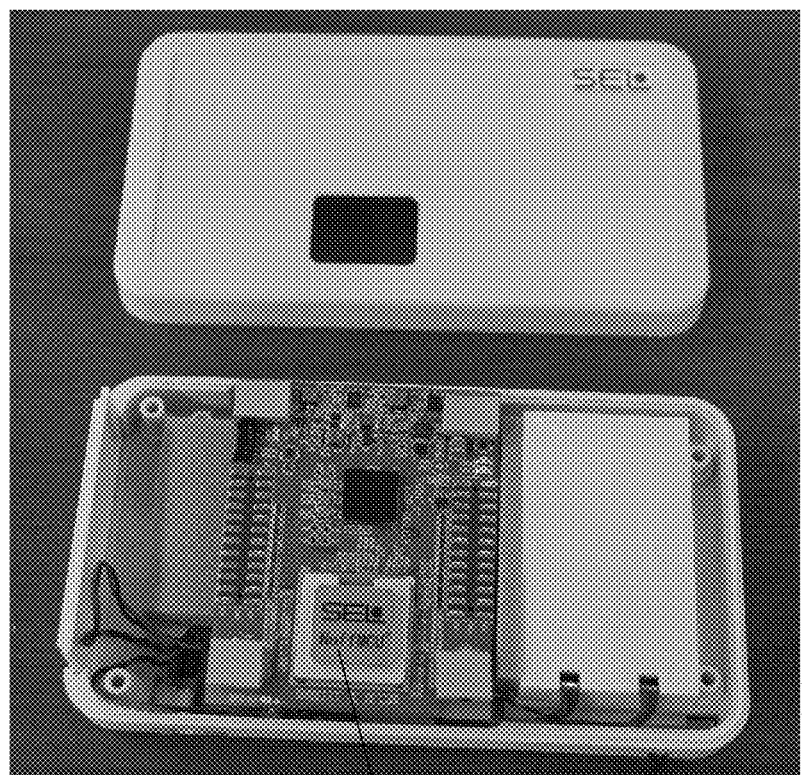
FIG. 29A is a view for describing Example.
Figure 29B:
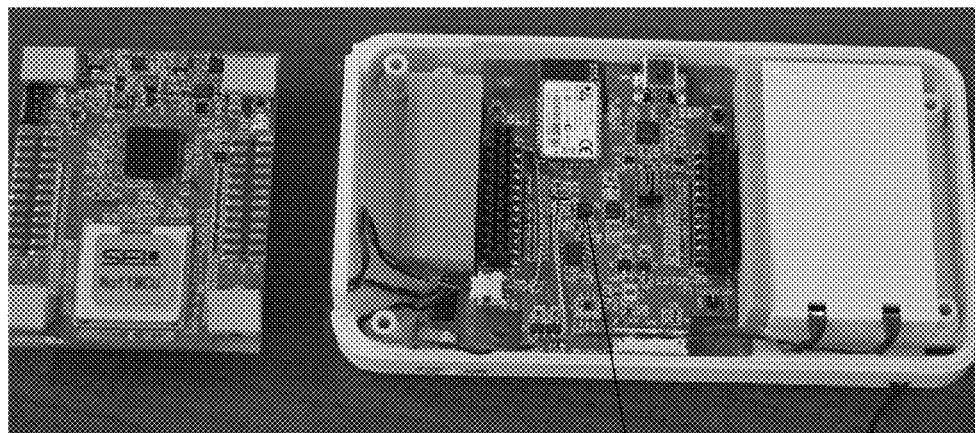
FIG. 29B is a view for describing Example.

FIG. 29A illustrates the state in which a housing of the controller 901 is opened. FIG. 29B shows the state in which a first-stage printed circuit board of stacked printed circuit boards is removed for easy viewing of the inside structure of the controller 901.

As shown in FIG. 29A, the controller 901 includes the processor unit 907. The processor unit 907 has a structure to which the processing unit 20 described in the above embodiment is applied, and includes the NOSRAM described in the above embodiment as a storage device. The NOSRAM can perform writing and reading-out at extremely higher speed than a flash memory and perform writing at lower voltage than a flash memory, is less likely to deteriorate due to rewriting, and can retain data even after power supply is stopped; thus, an excellent nonvolatile memory that operates at high speed and consumes low power can be obtained.

As illustrated in FIG. 29B, the controller 901 includes a sensor chip 908. In this example, ADXL362 manufactured by ANALOG DEVICES was used as the sensor chip 908, for example. ADXL362 is a circuit including a MEMS acceleration sensor. In addition, ADXL362 includes a 12-bit analog-digital converter circuit. Data sensed by the acceleration sensor is processed by the analog-digital converter circuit or the like of the sensor circuit and then supplied to the processor unit 907.

A battery is provided in the controller 901.

The data acquired by the sensor chip 908 is supplied to the processor unit 907. The data supplied to the processor unit 907 is converted by multiplying parameters stored in a cache of the processor unit 907. The value obtained by the conversion is supplied to the personal computer 903 through Bluetooth (registered trademark).

Figure 30A:
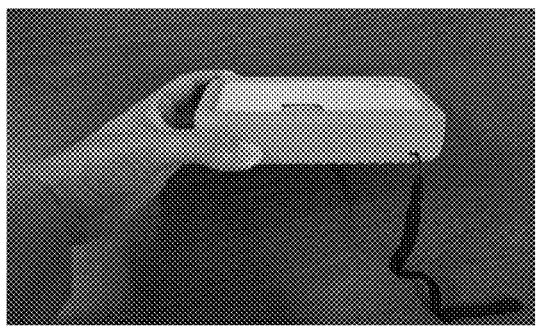
FIG. 30A is a view for describing Example.
Figure 30B:
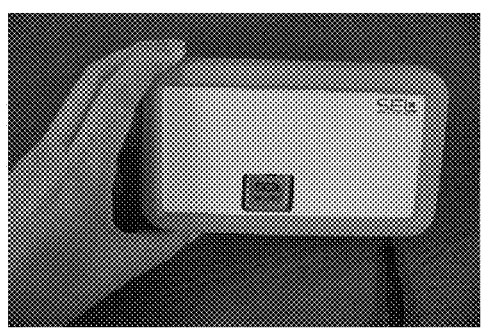
FIG. 30B is a view for describing Example.
Figure 30C:
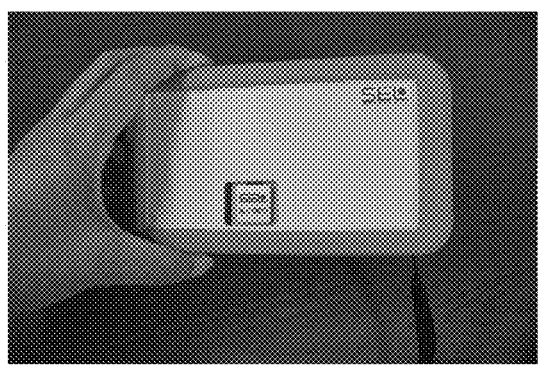
FIG. 30C is a view for describing Example.
Figure 30D:
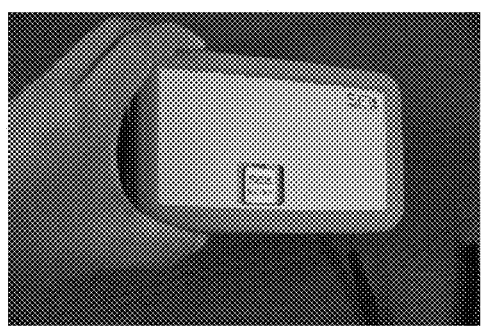
FIG. 30D is a view for describing Example.
Figure 30E:
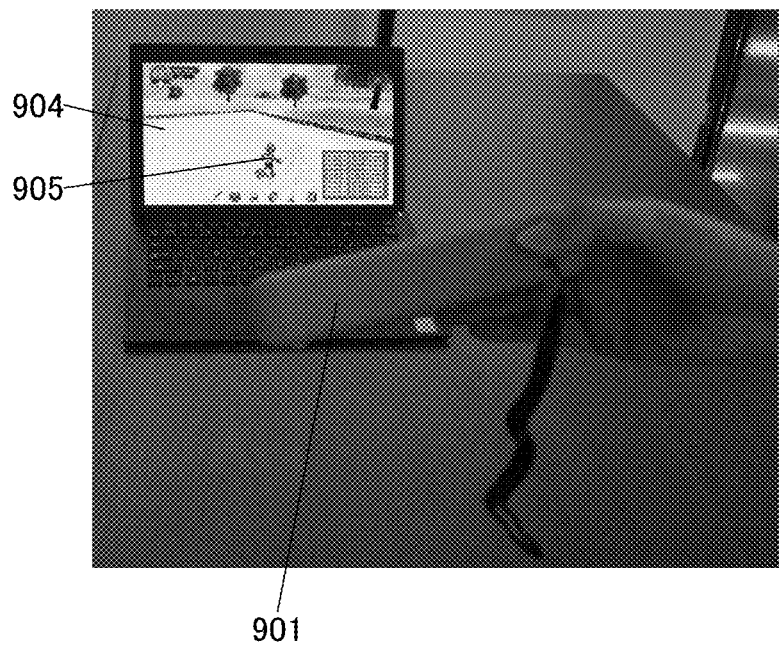
FIG. 30E is a view for describing Example.

When the controller 901 is tilted, the sensor chip 908 senses the orientation and the degree of the tilt and outputs a signal. For example, when the controller 901 is tilted backward as shown in FIG. 30A, the player object 905 moves forward, and the speed of the movement can be controlled by the tilt degree. When the controller 901 is tilted forward as shown in FIG. 30B, the player object 905 moves backward. When the controller 901 is tilted leftward as shown in FIG. 30C, the player object 905 rotates counterclockwise, and when the controller 901 is tilted rightward as shown in FIG. 30D, the player object 905 rotates clockwise. As shown in FIG. 30E, the player object 905 placed in a virtual space displayed on the monitor 904 moves by operation of the controller 901.

Figure 31A:
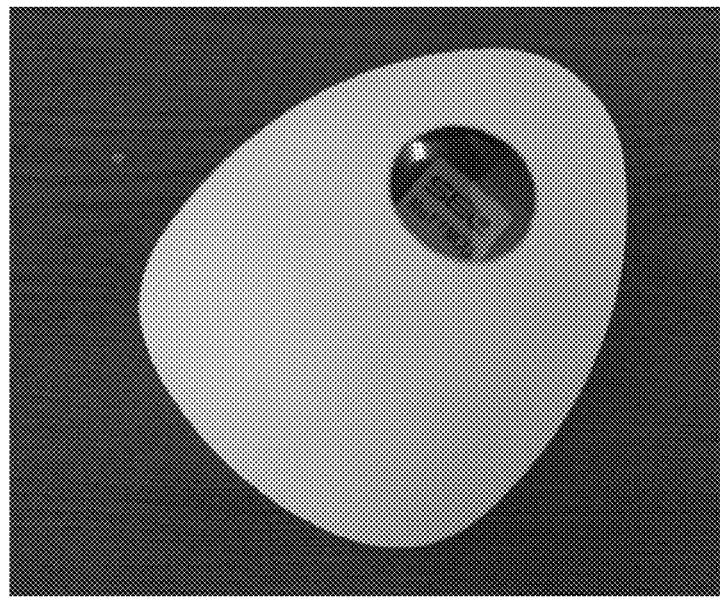
FIG. 31A is a view for describing Example.
Figure 31B:
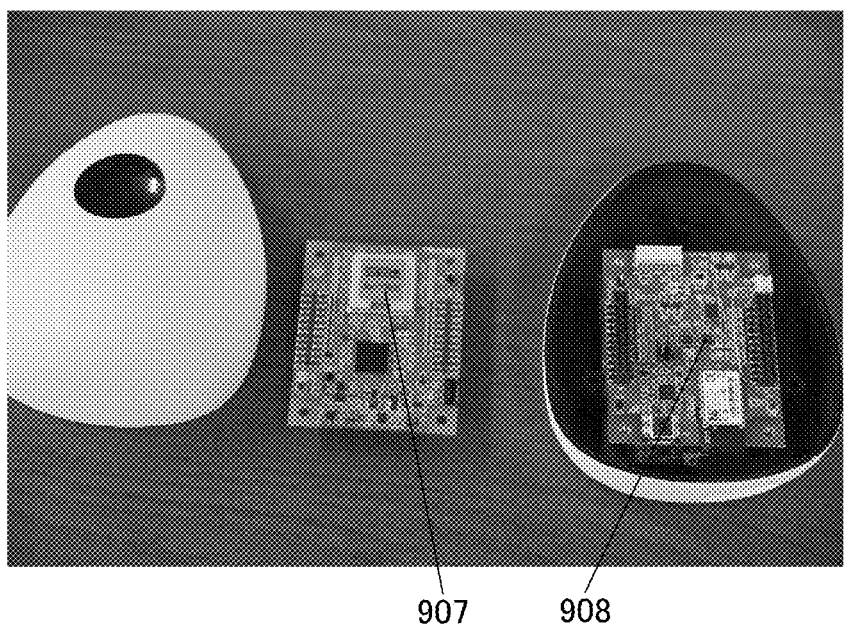
FIG. 31B is a view for describing Example.

FIG. 31A shows an enlarged photograph of the controller 902. A housing of the controller 902 has a mouse shape. As shown in FIG. 31B, the controller 902 includes the processor unit 907 and the sensor chip 908.

When the operation of the controller 901 or the controller 902 is suspended, the potential of an interrupt signal supplied from the sensor chip 908 to the processor unit 907 becomes a low potential, so that the processor unit 907 is brought into a resting state, resulting in a reduction in power consumption of the processor unit 907. Thus, the life of the battery provided in the controller can be increased.

When the controller 901 is operated, the sensor chip 908 senses the operation and then supplies a high-potential interrupt signal to the processor unit 907, so that the processor unit 907 returns to a normal state.

As described above, the operation of the game system using one embodiment of the present invention was examined.

REFERENCE NUMERALS

BGL2: wiring, BGL6: wiring, BKC1: circuit, BKC2: circuit, BKC10: circuit, BKC20: circuit, BL: wiring, BLB: wiring, BL1: bit line, BLB1: bit line, BRL: wiring, C1: capacitor, C3: capacitor, C6: capacitor, CB1: capacitor, CB2: capacitor, CB11: capacitor, CB12: capacitor, INV1: inverter circuit, INV2: inverter circuit, INV3: inverter circuit, INV4: inverter circuit, INV21: inverter circuit, INV22: inverter circuit, M1: transistor, M2: transistor, M3: transistor, M4: transistor, M5: transistor, M6: transistor, MA1: transistor, MC1: transistor, MC2: transistor, MemC1: circuit, MemC2: circuit, MR1: transistor, MW1: transistor, MW2: transistor, MW11: transistor, MW12: transistor, PCC10: circuit, PDL: wiring, PL: wiring, RBL: bit line, RWL: word line, RTC10: circuit, SMC20: circuit, WBL: bit line, WL: wiring, WL1: word line, WWL: word line, 10: power supply circuit, 11: memory cell, 15: memory cell, 16: memory cell, 17A: image, 20: processing unit, 21: processing unit, 21a: arithmetic circuit, 21b: power management unit, 21c: storage device, 22: register, 23A: player object, 24A: equipment, 25A: equipment list, 26A: direction, 26B: direction, 26C: direction, 26D: direction, 30: processor core, 31: storage circuit, 32: circuit, 35: power supply line, 40: cache, 41: memory array, 42: peripheral circuit, 43: control circuit, 45: memory cell, 60: PMU, 61: circuit, 65: clock control circuit, 70: PSW, 71: PSW, 80: terminal, 81: terminal, 82: terminal, 83: terminal, 96: sensor element, 97: display unit, 99: processing unit, 100: storage circuit, 110: FF, 120: memory cell, 130: processor core, 131: control device, 132: program counter, 133: pipeline register, 134: pipeline register, 135: register file, 136: ALU, 137: data bus, 240: NOSRAM, 242: power domain, 243: power domain, 245: power switch, 247: power switch, 250: memory cell array, 251: control circuit, 252: row circuit, 253: column circuit, 301: input unit, 301b: input unit, 311: substrate, 313: semiconductor region, 314a: low-resistance region, 314b: low-resistance region, 315: insulator, 316: conductor, 320: insulator, 322: insulator, 324: insulator, 326: insulator, 328: conductor, 330: conductor, 350: insulator, 351: DOSRAM, 352: insulator, 354: insulator, 356: conductor, 360: insulator, 361: memory cell array, 362: insulator, 364: insulator, 365: peripheral circuit, 366: conductor, 370: insulator, 371: power switch, 372: insulator, 373: power switch, 374: insulator, 376: conductor, 380: insulator, 382: insulator, 384: insulator, 386: conductor, 404: insulator, 500: transistor, 500A: transistor, 500B: transistor, 503: conductor, 503a: conductor, 503b: conductor, 510: insulator, 512: insulator, 513: insulator, 514: insulator, 516: insulator, 518: conductor, 520: insulator, 522: insulator, 524: insulator, 526: insulator, 530: oxide, 530a: oxide, 530b: oxide, 540a: conductor, 540b: conductor, 542: conductor, 542a: conductor, 542b: conductor, 543a: region, 543b: region, 544: insulator, 545: insulator, 546: conductor, 548: conductor, 550: transistor, 552: insulator, 560: conductor, 560a: conductor, 560b: conductor, 574: insulator, 580: insulator, 581: insulator, 582: insulator, 586: insulator, 600: capacitor, 610: conductor, 612: conductor, 620: conductor, 630: insulator, 640: insulator, 700: control device, 701: substrate, 702: circuit region, 703: separation region, 704: separation line, 705: chip, 710: sensor element, 710b: sensor element, 711: sensing unit, 711b: sensing unit, 712: determination circuit, 712b: determination circuit, 750: electronic component, 752: printed circuit board, 753: semiconductor device, 754: circuit board, 755: lead, 799: data processing unit, 901: controller, 902: controller, 903: personal computer, 904: monitor, 905: player object, 906: equipment list, 907: processor unit, 908: sensor chip, 4700: semiconductor chip, 4701: sensor chip, 5200: mouse, 5203: button, 5900: information terminal, 5901: housing, 5902: display unit, 5903: operation switch, 5904: operation switch, 5905: band, 7500: type game console, 7520: main body, 7520a: display unit, 7520b: camera, 7522: controller, 7522a: display unit, 7522b: button, 8200: head-mounted display, 8201: mounting portion, 8202: lens, 8203: main body, 8204: display unit, 8205: cable, 8206: battery, 8300: head-mounted display, 8301: housing, 8302: display unit, 8304: fixing unit, 8305: lens, 8306: circuit unit, 8307: imaging device, 8400: controller, 8401: circuit board, 8402: light-emitting device, 8403: chip, 8404: chip, 8405: input unit

The invention claimed is:

1. A data processing system comprising:
a first housing, a second housing, an arithmetic circuit including a register and a cache for an arithmetic operation, an input unit including a sensor element, a power management unit, and a data processing unit,
wherein the arithmetic circuit, the input unit, and the power management unit are each at least partly positioned inside the first housing,
wherein the data processing unit is at least partly positioned inside the second housing,
wherein the power management unit is configured to control supply and shutdown of power to the arithmetic circuit,
wherein the sensor element includes one or more selected from an acceleration sensor, an angular velocity sensor, and a magnetic sensor,
wherein the register includes a first circuit and a second circuit,
wherein the register is configured to write first data in the first circuit in a first period during which the power management unit supplies power to the arithmetic circuit,
wherein the register is configured to write the first data in the second circuit in a second period during which the power management unit stops power supply to the arithmetic circuit,
wherein the second circuit is configured to retain the first data when supply of a clock signal is stopped,
wherein the arithmetic circuit is configured to generate second data with use of signal data output from the sensor element and the first data,
wherein the cache is configured to store and retain third data in the second period during which the power management unit stops power supply to the arithmetic circuit,
wherein the arithmetic circuit is configured to wirelessly transmit the second data and the third data to the data processing unit, and
wherein the data processing unit is configured to generate image data with use of the second data and the third data.

2. The data processing system according to claim 1, further comprising a flexible display unit,
wherein the flexible display unit is positioned along a surface of the first housing, and
wherein the flexible display unit includes a region functioning as a touch sensor.

3. The data processing system according to claim 2, wherein the flexible display unit includes a first flexible substrate, a second flexible substrate, and a plurality of light-emitting devices between the first flexible substrate and the second flexible substrate.

4. The data processing system according to claim 1, comprising a third housing,
wherein the third housing includes a display unit, and
wherein the display unit is configured to display the image data.

* * * * *